US010007648B2

(12) United States Patent
Hamahata et al.

(10) Patent No.: US 10,007,648 B2
(45) Date of Patent: *Jun. 26, 2018

(54) MANUAL CREATION FOR A PROGRAM PRODUCT

(71) Applicant: INTERNATIONAL BUSINESS MACHINES CORPORATION, Armonk, NY (US)

(72) Inventors: Kenji Hamahata, Kanagawa-Ken (JP); Shingo Kawai, Tokyo (JP); Tadayuki Yoshida, Kanagawa-Ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/201,719

(22) Filed: Jul. 5, 2016

(65) Prior Publication Data
US 2016/0314105 A1 Oct. 27, 2016

Related U.S. Application Data

(63) Continuation of application No. 14/262,125, filed on Apr. 25, 2014, now Pat. No. 9,436,680.

(30) Foreign Application Priority Data

Aug. 8, 2013 (JP) .................................. 2013-165147

(51) Int. Cl.
G06F 17/24 (2006.01)
G06F 17/28 (2006.01)
(Continued)

(52) U.S. Cl.
CPC .......... G06F 17/24 (2013.01); G06F 3/04842 (2013.01); G06F 17/218 (2013.01);
(Continued)

(58) Field of Classification Search
CPC ........................... G06F 17/2881; G06F 9/4448
See application file for complete search history.

(56) References Cited

U.S. PATENT DOCUMENTS

2003/0004704 A1* 1/2003 Baron ................... G06F 9/4448
704/8
2006/0195831 A1* 8/2006 Bossom ............... G06F 9/4448
717/162

FOREIGN PATENT DOCUMENTS

JP 0728799 A 1/1995
JP 09259125 A 10/1997
(Continued)

OTHER PUBLICATIONS

Kenji Hamahata et al., "Manual Creation for a Program Product", U.S. Appl. No. 14/262,125, filed Apr. 25, 2014.
(Continued)

Primary Examiner — Ibrahim Siddo
(74) Attorney, Agent, or Firm — Cantor Colburn LLP; Maeve Carpenter

(57) ABSTRACT

Embodiments relate to supporting creation of a manual of a program product. An aspect includes recording into a recording medium that can be accessed by the computer a screen character string, a translated character string where the screen character string has been translated to another language, or an identifier associated with the screen character string or the translated character string, displayed on a display device by the program product. Another aspect includes recording into the recording medium attribute information of the screen character string or the translated character string. Yet another aspect includes maintaining consistency between the screen character string or the translated character string and a character string that is displayed on a display device by an application for creating the manual, using the screen character string, the translated
(Continued)

character string or identifier recorded on the recording medium and the attribute information.

20 Claims, 46 Drawing Sheets

(51) Int. Cl.
*G06F 3/0484* (2013.01)
*G06F 17/21* (2006.01)
*G06F 17/22* (2006.01)

(52) U.S. Cl.
CPC .......... *G06F 17/2288* (2013.01); *G06F 17/28* (2013.01); *G06F 17/2881* (2013.01)

(56) References Cited

FOREIGN PATENT DOCUMENTS

| | | | |
|---|---|---|---|
| JP | 2004280275 | A | 10/2004 |
| JP | 2006221581 | A | 8/2006 |
| JP | 2008097215 | A | 4/2008 |
| JP | 2009529746 | A | 8/2009 |
| JP | 2011076213 | | 4/2011 |

OTHER PUBLICATIONS

List of IBM Patents or Patent Applications Treated as Related; (Appendix P), Filed Jan. 16, 2017; 2 pages.

* cited by examiner

4. REGISTER IN SCREEN CHARACTER STRING CONTROL TABLE

| Master ID | Language ID | Character String | Category Information | Appearance Positional Information in the Program Product | Appearance Positional Information in the Application |
|---|---|---|---|---|---|
| Key_199 | English | Defect | | | |
| Key_200 | English | Task | | | |
| Key_201 | English | Project Change Request | | | |
| Key_202 | English | Plan Item | | | |
| Key_203 | English | Risk | | | |
| Key_204 | English | Risk Action | | | |
| Key_205 | English | Issue | | | |
| Key_206 | English | Milestone | | | |

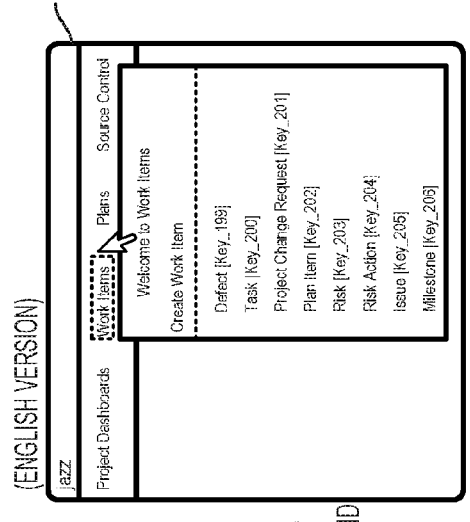

5. CREATE BUILD WHERE MASTER ID IS ADDED
(ENGLISH VERSION)

ADDITION OF MASTER ID

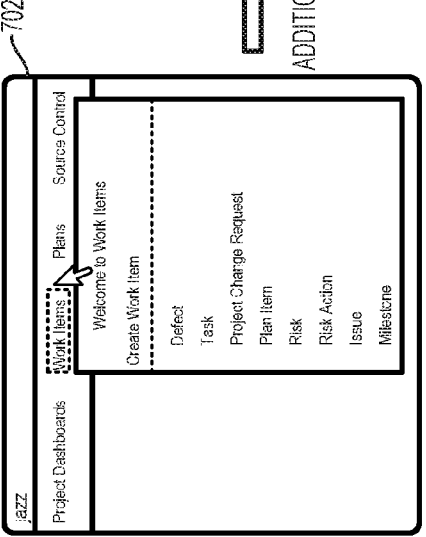

FIG. 7B

6. EDITING MANUAL (ENGLISH VERSION) IN THE EDITOR
(ENGLISH VERSION)

<li><UICONTROL id="012"> Defect <Resource_ID></Resource_ID></UICONTROL>: Identifies a bug</li>
<li><UICONTROL id="013"> Task<Resource_ID>Key_200</Resource_ID></UICONTROL>: Describes a specific piece of work</li>
<li><UICONTROL id="014"> Project Change Request<Resource_ID>Key_201</Resource_ID> </UICONTROL>:
Provides a formal mechanism to renegotiate key project parameters, such as scope, timeline, or resources</li>   — 706

7. UPDATE OF SCREEN CHARACTER STRING CONTROL TABLE DURING THE AFOREMENTIONED EDITING   — 707

| Master ID | Language ID | Character String | Category Information | Appearance Positional Information in the Program Product | Appearance Positional Information in the Application |
|---|---|---|---|---|---|
| Key_199 | English | Defect | Menu | (50,120);(200,160) | XYZ0012;/com/ibm/foo/bar/WorkItem.Dita;UICONTROL_012 |
| Key_200 | English | Task | Menu | (50,170);(200,210) | XYZ0012;/com/ibm/foo/bar/WorkItem.Dita;UICONTROL_013 |
| Key_201 | English | Project Change Request | Menu | (50,220);(200,260) | XYZ0012;/com/ibm/foo/bar/WorkItem.Dita;UICONTROL_014 |
| Key_202 | English | Plan Item | | | |
| Key_203 | English | Risk | | | |
| Key_204 | English | Risk Action | | | |
| Key_205 | English | Issue | | | |
| Key_206 | English | Milestone | | | |

8. INPUT START TAG <UICONTROL> FOR TRANSITIONING TO SCREEN INFORMATION ACQUISITION MODE IN THE EDITOR
(ENGLISH VERSION)

<li><UICONTROL id="012"> Defect <Resource_ID>Key_199</Resource_ID></UICONTROL>: Identifies a bug</li>
<li><UICONTROL id="013"> Task<Resource_ID>Key_200</Resource_ID></UICONTROL>: Describes a specific piece of work</li>
<li><UICONTROL id="014"> Project Change Request<Resource_ID>Key_201</Resource_ID> </UICONTROL>:
Provides a formal mechanism to renegotiate key project parameters, such as scope, timeline, or resources</li>
<li><UICONTROL id="015">   — 708

FIG. 7C

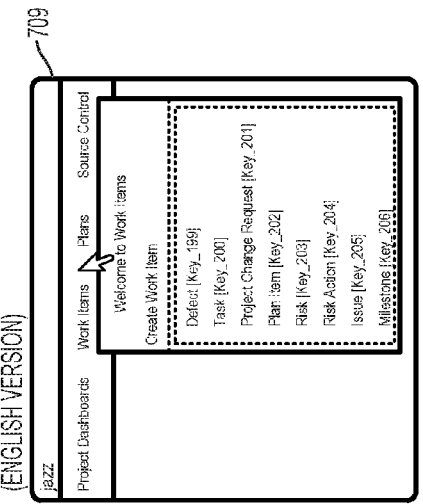
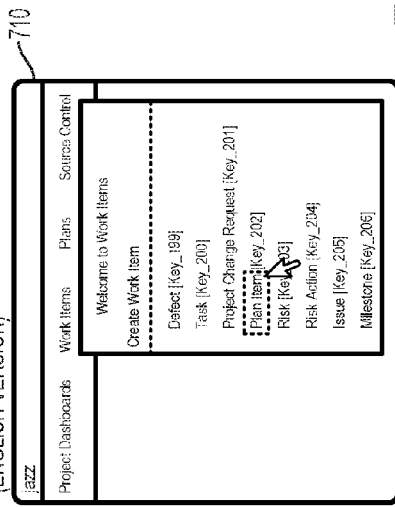
FIG. 7D

13. INPUT END TAG </UICONTROL> TO DEACTIVATE SCREEN INFORMATION ACQUISITION MODE ON THE EDITOR
(ENGLISH VERSION)

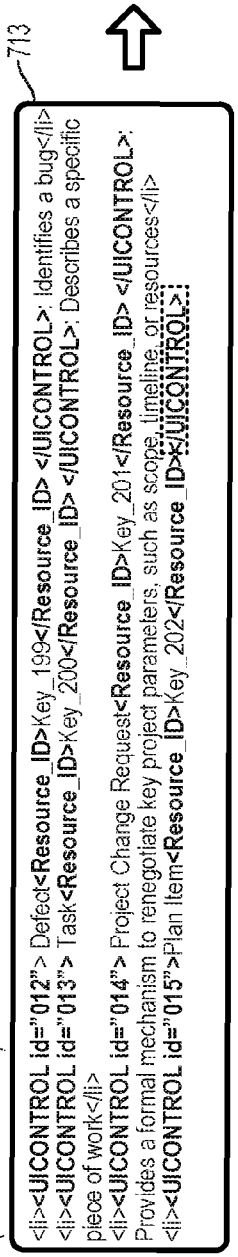

<li><UICONTROL id="012"> Defect<Resource_ID>Key_199</Resource_ID> </UICONTROL> Identifies a bug</li>
<li><UICONTROL id="013"> Task<Resource_ID>Key_200</Resource_ID> </UICONTROL> Describes a specific piece of work</li>
<li><UICONTROL id="014"> Project Change Request<Resource_ID>Key_201</Resource_ID> </UICONTROL> Provides a formal mechanism to renegotiate key project parameters, such as scope, timeline, or resources</li>
<li><UICONTROL id="015">Plan Item<Resource_ID>Key_202</Resource_ID></UICONTROL>:

14. DEACTIVATION OF SCREEN INFORMATION ACQUISITION MODE
(ENGLISH VERSION)

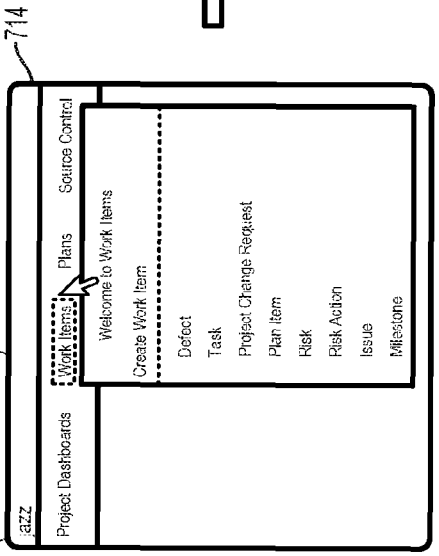

TRANSITION

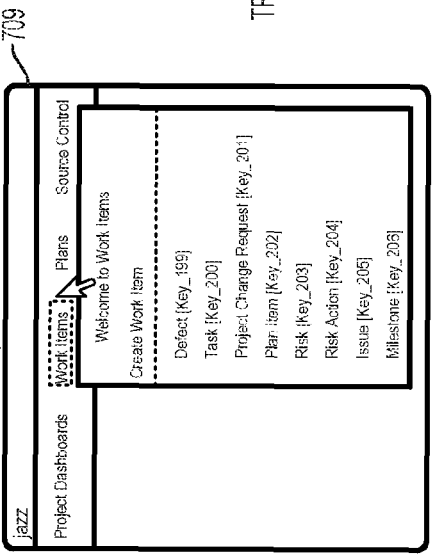

(ENGLISH VERSION)

FIG. 7F

15. DESCRIBE EXPLANATION OF "PLAN ITEM" IN THE EDITOR. (ENGLISH VERSION)

```
<li><UICONTROL id="012"> Defect<Resource_ID>Key_199</Resource_ID> Identifies a bug</li>
<li><UICONTROL id="013"> Task<Resource_ID>Key_200</Resource_ID>: Describes a specific piece of work</li>
<li><UICONTROL id="014"> Project Change Request<Resource_ID>Key_201<Resource_ID> <UICONTROL>: Provides a formal mechanism to renegotiate key project parameters, such as scope, timeline, or resources</li>
<li><UICONTROL id="015">Plan Item<Resource_ID>Key_202</Resource_ID></UICONTROL>Records commitments that the development team makes to the business organization</li>
```
— 715

16. SCREEN CHARACTER STRING CONTROL TABLE CREATED BY REPEATING OPERATIONS STEP 8. TO 15.

| Master ID | Language ID | Character String | Category Information | Appearance Positional Information in the Program Product | Appearance Positional Information in the Application |
|---|---|---|---|---|---|
| Key_199 | English | Defect | Menu | (50,120),(200,160) | XYZ0012:/com/ibm/foo/bar/Workitem.Dita:UICONTROL_012 |
| Key_200 | English | Task | Menu | (50,170),(200,210) | XYZ0012:/com/ibm/foo/bar/Workitem.Dita:UICONTROL_013 |
| Key_201 | English | Project Change Request | Menu | (50,220),(200,260) | XYZ0012:/com/ibm/foo/bar/Workitem.Dita:UICONTROL_014 |
| Key_202 | English | Plan Item | Menu | (50,270),(200,310) | XYZ0012:/com/ibm/foo/bar/Workitem.Dita:UICONTROL_015 |
| Key_203 | English | Risk | Menu | (50,320),(200,360) | XYZ0012:/com/ibm/foo/bar/Workitem.Dita:UICONTROL_016 |
| Key_204 | English | Risk Action | Menu | (50,370),(200,410) | XYZ0012:/com/ibm/foo/bar/Workitem.Dita:UICONTROL_017 |
| Key_205 | English | Issue | Menu | (50,420),(200,460) | XYZ0012:/com/ibm/foo/bar/Workitem.Dita:UICONTROL_018 |
| Key_206 | English | Milestone | Menu | (50,470),(200,510) | XYZ0012:/com/ibm/foo/bar/Workitem.Dita:UICONTROL_019 |

17. EDITOR SCREEN DISPLAY CREATED BY REPEATING OPERATIONS STEP 8. TO 15.
(ENGLISH VERSION)

<li><UICONTROL id="012"> Defect<Resource_ID>Key_199</Resource_ID> </UICONTROL>: Identifies a bug</li>
<li><UICONTROL id="013"> Task<Resource_ID>Key_200</Resource_ID> </UICONTROL>: Describes a specific piece of work</li>
<li><UICONTROL id="014"> Project Change Request<Resource_ID>Key_201</Resource_ID> </UICONTROL>: Provides a formal mechanism to renegotiate key project parameters, such as scope, timeline, or resources</li>
<li><UICONTROL id="015">Plan Item<ResOurce_ID>Key_202</ResOurce_ID></UICONTROL>Records commitments that the development team makes to the business organization</li>
<li><UICONTROL id="016">Risk<ResOurce_ID>Key_203</ResOurce_ID></UICONTROL>Describes project risks, and provides a matrix to calculate the risk probability and impact</li>
<li><UICONTROL id="017">Risk Action<ResOurce_ID>Key_204</Resource_ID></UICONTROL>Describes specific actions to counter or mitigate a risk</li>
<li><UICONTROL id="018">Issue<ResOurce_ID>Key_205</Resource_ID></UICONTROL>Identifies and describes a potential problem for which no concrete solution is proposed. Issues can be created from risks that do not have a proposed solution. </li>
<li><UICONTROL id="019">Milestone<ResOurce_ID>Key_206</Resource_ID></UICONTROL>Identifies a significant event in the project plan or a phase plan</li>

18. CREATED MANUAL
(ENGLISH VERSION)

Defect: Identifies a bug

Task: Describes a specific piece of work

Project Change Request: Provides a formal mechanism to renegotiate key project parameters, such as scope, timeline, or resources Plan Item: Records commitments that the development team makes to the business organization Risk: Describes project risks, and provides a matrix to calculate the risk probability and impact Risk Action: Describes specific actions to counter or mitigate a risk Issue: Identifies and describes a potential problem for which no concrete solution is proposed. Issues can be created from risks that do not have a proposed solution.

Milestone: Identifies a significant event in the project plan or a phase plan

FIG. 7H

22. UPDATE CORRESPONDING DESCRIPTION ON EDITOR BASED ON UPDATED SCREEN CHARACTER STRING CONTROL TABLE
(ENGLISH VERSION)

```
<li><UICONTROL id="012"> Defect<Resource_ID>Key_199</Resource_ID> </UICONTROL>: Identifies a bug</li>
<li><UICONTROL id="013"> Task<Resource_ID>Key_200</Resource_ID> </UICONTROL>: Describes a specific piece of work</li>
<li><UICONTROL id="014"> Project Change Request<Resource_ID>Key_201</Resource_ID> </UICONTROL>: Provides a formal mechanism to renegotiate key project parameters, such as scope, timeline, or resources</li>
<li><UICONTROL id="015">BusinessNeeds<ResOurce_ID>Key_202</Resource_ID></UICONTROL>Records commitments that the development team makes to the business organization</li>
<li><UICONTROL id="016">Risk<ResOurce_ID>Key_203</Resource_ID></UICONTROL>Describes project risks, and provides a matrix to calculate the risk probability and impact</li>
<li><UICONTROL id="017">Risk Action<ResOurce_ID>Key_204</Resource_ID></UICONTROL>Describes specific actions to counter or mitigate a risk</li>
<li><UICONTROL id="018">Issue<ResOurce_ID>Key_205</Resource_ID></UICONTROL>Identifies and describes a potential problem for which no concrete solution is proposed. Issues can be created from risks that do not have a proposed solution. </li>
<li><UICONTROL id="019">Milestone<ResOurce_ID>Key_206</Resource_ID></UICONTROL>Identifies a significant event in the project plan or a phase plan</li>
```

23. UPDATED MANUAL
(ENGLISH VERSION)

Defect: Identifies a bug
Task: Describes a specific piece of work
Project Change Request: Provides a formal mechanism to renegotiate key project parameters, such as scope, timeline, or resources
BusinessNeeds: Records commitments that the development team makes to the business organization
Risk: Describes project risks, and provides a matrix to calculate the risk probability and impact
Risk Action: Describes specific actions to counter or mitigate a risk
Issue: Identifies and describes a potential problem for which no concrete solution is proposed. Issues can be created from risks that do not have a proposed solution.
Milestone: Identifies a significant event in the project plan or a phase plan

FIG. 7J

22. DISPLAY AUTOMATICALLY-UPDATED TERM ON EDITOR SO AS TO ALLOW USER TO VIEW, AND SELECT THE TERM BY USER (ENGLISH VERSION)

<li><UICONTROL id="012"> Defect<Resource_ID>Key_199</Resource_ID> </UICONTROL>: Identifies a bug</li>
<li><UICONTROL id="013"> Task<Resource_ID>Key_200</Resource_ID> </UICONTROL>: Describes a specific piece of work</li>
<li><UICONTROL id="014"> Project Change Request<Resource_ID>Key_201</Resource_ID> </UICONTROL>: Provides a formal mechanism to renegotiate key project parameters, such as scope, timeline, or resources</li>
<li><UICONTROL id="015"> BusinessNeeds<ResOurce_ID>Key_202</Resource_ID></UICONTROL>Records commitments that the development team makes to the business organization</li>
<li><UICONTROL id="016">Risk<ReSource_ID>Key_203</Resource_ID></UICONTROL>Describes project risks, and provides a matrix to calculate the risk probability and impact</li>
<li><UICONTROL id="017">Risk Action<ResOurce_ID>Key_204</Resource_ID></UICONTROL>Describes specific actions to counter or mitigate a risk</li>
<li><UICONTROL id="018">Issue<ResOurce_ID>Key_205</Resource_ID></UICONTROL>Identifies and describes a potential problem for which no concrete solution is proposed. Issues can be created from risks that do not have a proposed solution. </li>
<li><UICONTROL id="019">Milestone<ResOurce_ID>Key_206</Resource_ID></UICONTROL>Identifies a significant event in the project plan or a phase plan</li>

— 724

25. DISPLAY SELECTED TERM ON SCREEN DISPLAY OF PROGRAM PRODUCT SO AS TO ALLOW USER TO VIEW (ENGLISH VERSION)

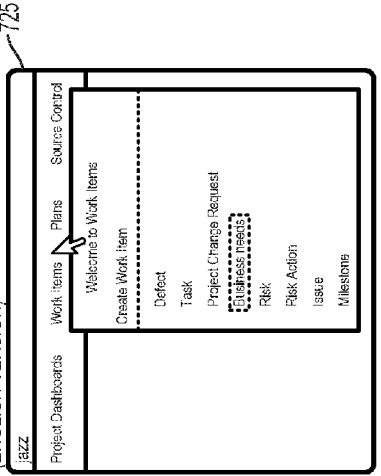

6. EDITING MANUAL (JAPANESE VERSION) IN THE EDITOR
(ENGLISH VERSION)

```
<li><UICONTROL id="012"> 障害 <Resource_ID>Key_199</Resource_ID></UICONTROL>:バグを特定します。</li>
<li><UICONTROL id="013"> タスク <Resource_ID>Key_200</Resource_ID></UICONTROL>:特定の作業部分を記述します。</li>
<li><UICONTROL id="014"> プロジェクト変更要求 <Resource_ID>Key_201</Resource_ID></UICONTROL>:
主要なプロジェクト・パラメーター(範囲、予定表、リソース)を再ネゴシエーションする公式メカニズムを提供します。</li>
```
← 806

7. SCREEN CHARACTER STRING CONTROL TABLE AFTER EDITING ← 807

| Master ID | Language ID | Character String | Category Information | Appearance Positional Information in the Program Product | Appearance Positional Information in the Application |
|---|---|---|---|---|---|
| Key_199 | English | Defect | Menu | (50,120),(200,160) | XYZ0012:/com/ibm/foo/bar/WorkItem.Dita:UICONTROL_012 |
| Key_199 | Japanese | 障害 | Menu | (50,120),(200,160) | XYZ0012:/com/ibm/foo/bar/WorkItem.Dita:UICONTROL_012 |
| Key_200 | English | task | Menu | (50,170),(200,210) | XYZ0012:/com/ibm/foo/bar/WorkItem.Dita:UICONTROL_013 |
| Key_200 | Japanese | タスク | Menu | (50,170),(200,210) | XYZ0012:/com/ibm/foo/bar/WorkItem.Dita:UICONTROL_013 |
| Key_201 | English | Project Change Request | Menu | (50,220),(200,260) | XYZ0012:/com/ibm/foo/bar/WorkItem.Dita:UICONTROL_014 |
| Key_201 | Japanese | プロジェクト変更要求 | Menu | (50,220),(200,260) | XYZ0012:/com/ibm/foo/bar/WorkItem.Dita:UICONTROL_014 |
| Key_202 | English | Plan Item | | | |
| Key_202 | Japanese | 計画項目 | | | |
| Key_203 | English | Risk | | | |
| Key_203 | Japanese | リスク | | | |
| Key_204 | English | Risk Action | | | |
| Key_204 | Japanese | リスク・アクション | | | |
| Key_205 | English | Issue | | | |
| Key_205 | Japanese | 課題 | | | |
| Key_206 | English | Milestone | | | |
| Key_206 | Japanese | マイルストーン | | | |

8. INPUT START TAG <UICONTROL> FOR TRANSITIONING TO SCREEN INFORMATION ACQUISITION MODE IN THE EDITOR
(JAPANESE VERSION)

```
<li><UICONTROL id="012"> 障害 <Resource_ID>Key_199</Resource_ID></UICONTROL>:バグを特定します。</li>
<li><UICONTROL id="013"> タスク <Resource_ID>Key_200</Resource_ID></UICONTROL>:特定の作業部分を記述します。</li>
<li><UICONTROL id="014"> プロジェクト変更要求 <Resource_ID>Key_201</Resource_ID></UICONTROL>:
主要なプロジェクト・パラメーター(範囲、予定表、リソース)を再ネゴシエーションする公式メカニズムを提供します。</li>
<UICONTROL id="015">
```
← 808

FIG. 8C

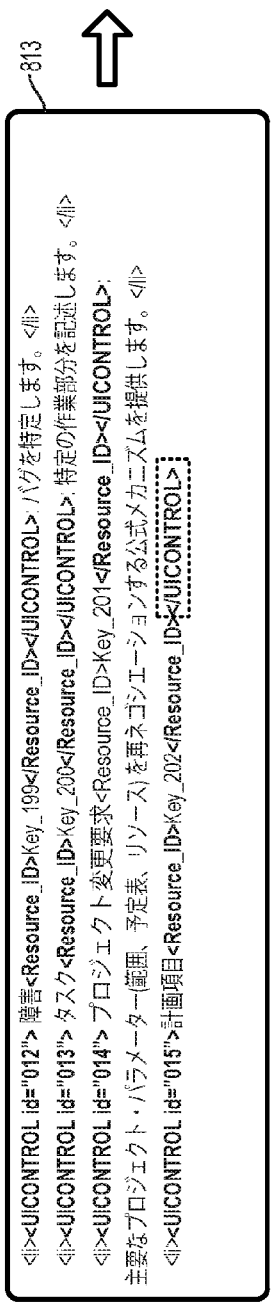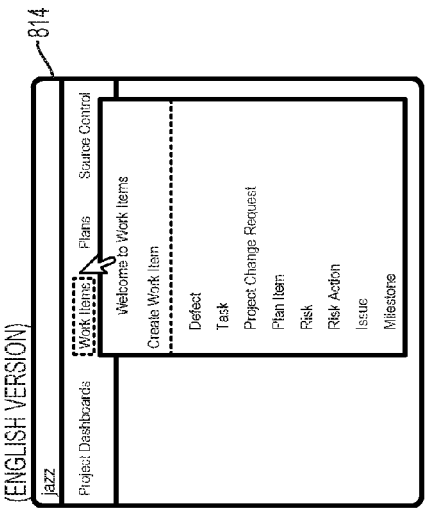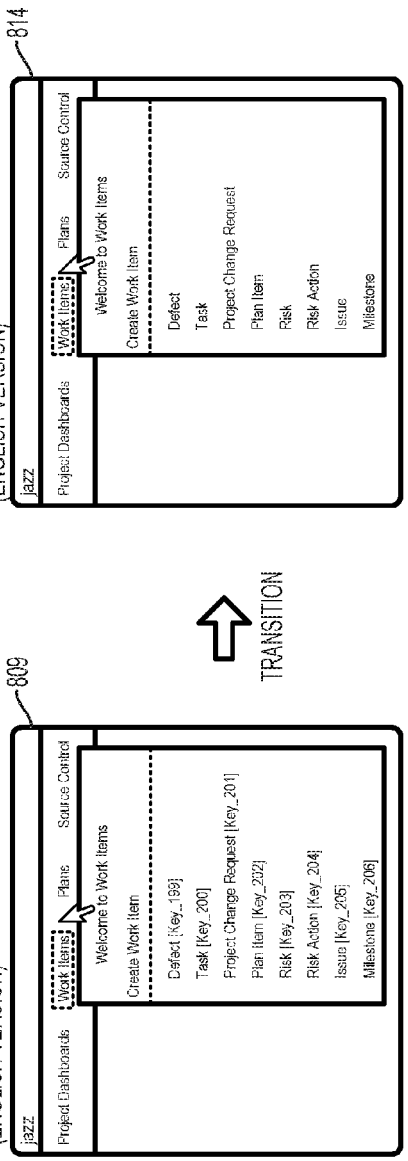
FIG. 8F

15. DESCRIBE EXPLANATION (JAPANESE) OF "PLAN ITEM" (JAPANESE VERSION) IN THE EDITOR.

```
<li><UICONTROL id="012"> 障害<Resource_ID>Key_199</Resource_ID></UICONTROL>: バグを特定します。 </li>
<li><UICONTROL id="013"> タスク<Resource_ID>Key_200</Resource_ID></UICONTROL>: 特定の作業部分を記述します。 </li>
<li><UICONTROL id="014"> プロジェクト変更要求<Resource_ID>Key_201</Resource_ID></UICONTROL>:
主要なプロジェクト・パラメーター (範囲、予定表、リソース) を再ネゴシエーションする公式メカニズムを提供します。 </li>
<li><UICONTROL id="015">計画項目<Resource_ID>Key_202</Resource_ID></UICONTROL>開発チームによるビジネス組織に
対するコミットメントを記録します。 </li>
```
— 815

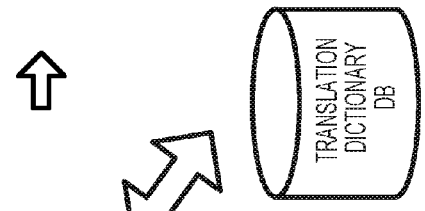

16. SCREEN CHARACTER STRING CONTROL TABLE CREATED BY REPEATING OPERATIONS STEP 8. TO 15. — 816

| Master ID | Language ID | Character String | Category Information | Appearance Positional Information in the Program Product | Appearance Positional Information in the Application |
|---|---|---|---|---|---|
| Key_199 | English | Defect | Menu | (50,120),(200,160) | XYZ0012:/com/ibm/foo/bar/WorkItem.D!a:UICONTROL_012 |
| Key_199 | Japanese | 障害 | Menu | (50,120),(200,160) | XYZ0012:/com/ibm/foo/bar/WorkItem.D!a:UICONTROL_012 |
| Key_200 | English | Task | Menu | (50,170),(200,210) | XYZ0012:/com/ibm/foo/bar/WorkItem.D!a:UICONTROL_013 |
| Key_200 | Japanese | タスク | Menu | (50,170),(200,210) | XYZ0012:/com/ibm/foo/bar/WorkItem.D!a:UICONTROL_013 |
| Key_201 | English | Project Change Request | Menu | (50,220),(200,260) | XYZ0012:/com/ibm/foo/bar/WorkItem.D!a:UICONTROL_014 |
| Key_201 | Japanese | プロジェクト変更要求 | Menu | (50,220),(200,260) | XYZ0012:/com/ibm/foo/bar/WorkItem.D!a:UICONTROL_014 |
| Key_202 | English | Plan Item | Menu | (50,270),(200,310) | XYZ0012:/com/ibm/foo/bar/WorkItem.D!a:UICONTROL_015 |
| Key_202 | Japanese | 計画項目 | Menu | (50,270),(200,310) | XYZ0012:/com/ibm/foo/bar/WorkItem.D!a:UICONTROL_015 |
| Key_203 | English | Risk | Menu | (50,320),(200,360) | XYZ0012:/com/ibm/foo/bar/WorkItem.D!a:UICONTROL_016 |
| Key_203 | Japanese | リスク | Menu | (50,320),(200,360) | XYZ0012:/com/ibm/foo/bar/WorkItem.D!a:UICONTROL_016 |
| Key_204 | English | Risk Action | Menu | (50,370),(200,410) | XYZ0012:/com/ibm/foo/bar/WorkItem.D!a:UICONTROL_017 |
| Key_204 | Japanese | リスク・アクション | Menu | (50,370),(200,410) | XYZ0012:/com/ibm/foo/bar/WorkItem.D!a:UICONTROL_017 |
| Key_205 | English | Issue | Menu | (50,420),(200,460) | XYZ0012:/com/ibm/foo/bar/WorkItem.D!a:UICONTROL_018 |
| Key_205 | Japanese | 課題 | Menu | (50,420),(200,460) | XYZ0012:/com/ibm/foo/bar/WorkItem.D!a:UICONTROL_018 |
| Key_206 | English | Milestone | Menu | (50,470),(200,510) | XYZ0012:/com/ibm/foo/bar/WorkItem.D!a:UICONTROL_019 |
| Key_206 | Japanese | マイルストーン | Menu | (50,470),(200,510) | XYZ0012:/com/ibm/foo/bar/WorkItem.D!a:UICONTROL_019 |

FIG. 8G

17. EDITOR SCREEN DISPLAY CREATED BY REPEATING OPERATIONS STEP 8. TO 15.
(JAPANESE VERSION)

```
<i><UICONTROL id="012">障害<Resource_ID>Key_199</Resource_ID></UICONTROL>:バグを特定します。</i>
<i><UICONTROL id="013">タスク<Resource_ID>Key_200</Resource_ID></UICONTROL>:特定の作業部分を記述します。</i>
<i><UICONTROL id="014">プロジェクト変更要求<Resource_ID>Key_201</Resource_ID></UICONTROL>:
主要なプロジェクト・パラメーター(範囲、予定表、リソース)を再ネゴシエーションする公式メカニズムを提供します。</i>
<i><UICONTROL id="015">計画項目<Resource_ID>Key_202</Resource_ID></UICONTROL>開発チームによるビジネス組織に対するコミットメントを記録します。</i>
<i><UICONTROL id="016">リスク<Resource_ID>Key_203</Resource_ID></UICONTROL>リスクを記述し、リスクの確率および影響を計算するマトリックスを提供します。</i>
<i><UICONTROL id="017">リスク・アクション<Resource_ID>Key_204</Resource_ID></UICONTROL>具体的なソリューションが提案されているいないリスクから作成することができます。</i>
<i><UICONTROL id="018">課題<Resource_ID>Key_205</Resource_ID></UICONTROL>ソリューションが提案されていない潜在的な問題を特定し、記述します。問題は、ソリューションが提案されている特定のアクションに対処するリスクまたはフェーズ計画における重要なイベントを特定します。</i>
<i><UICONTROL id="019">マイルストーン<Resource_ID>Key_206</Resource_ID></UICONTROL>プロジェクト計画における重要なイベントを特定します。</i>
```

18. CREATED MANUAL
(JAPANESE VERSION)

22. UPDATE OF CORRESPONDING DESCRIPTION ON EDITOR BASED ON UPDATED SCREEN CHARACTER STRING CONTROL TABLE (JAPANESE VERSION)

```
<li><UICONTROL id="012">障害<Resource_ID>Key_199</Resource_ID></UICONTROL>:バグを特定します。</li>
<li><UICONTROL id="013">タスク<Resource_ID>Key_200</Resource_ID></UICONTROL>:特定の作業部分を記述します。</li>
<li><UICONTROL id="014">プロジェクト変更要求<Resource_ID>Key_201</Resource_ID></UICONTROL>:
主要なプロジェクト・パラメーター(範囲、予定表、リソース)を再ネゴシエーションする公式メカニズムを提供します。</li>
<li><UICONTROL id="015">ビジネス・ニーズ<Resource_ID>Key_202</Resource_ID></UICONTROL>開発チームによるビジネス組織に対するコミットメントを記録します。</li>
<li><UICONTROL id="016">リスク<Resource_ID>Key_203</Resource_ID></UICONTROL>リスクを記述し、リスクの確率および影響を計算するマトリックスを提供します。</li>
<li><UICONTROL id="017">リスク・アクション<Resource_ID>Key_204</Resource_ID></UICONTROL>リスクに対処するアクションまたはリスクを緩和するアクションを記述します。</li>
<li><UICONTROL id="018">課題<Resource_ID>Key_205</Resource_ID></UICONTROL>具体的なソリューションが提案されていないリスクまたは問題は、ソリューションが提案されるかもしくは作成することができるビジネス上の潜在的な問題を特定し、記述します。問題は、ソリューションが提案されるかもしくは作成することができます。</li>
<li><UICONTROL id="019">マイルストーン<Resource_ID>Key_206</Resource_ID></UICONTROL>プロジェクト計画における重要なイベントを特定します。</li>
```

23. UPDATED MANUAL (JAPANESE VERSION)

24. DISPLAY AUTOMATICALLY-UPDATED TERM ON EDITOR SO AS TO ALLOW USER TO VIEW, AND SELECT THE TERM BY USER (JAPANESE VERSION)
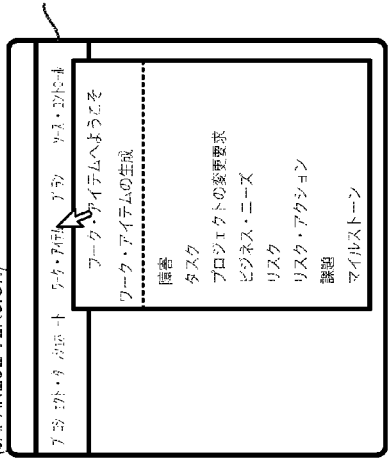
25. DISPLAY SELECTED TERM ON SCREEN DISPLAY OF PROGRAM PRODUCT SO AS TO ALLOW USER TO VIEW (ENGLISH VERSION)
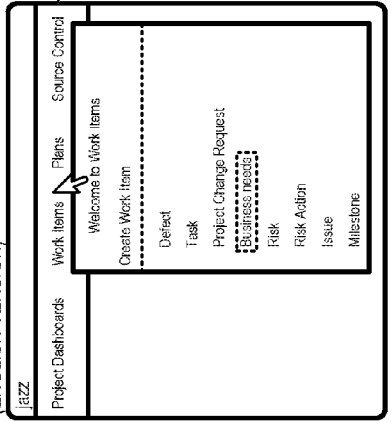
FIG. 8K

6. EDITING MANUAL (JAPANESE VERSION) IN THE EDITOR

<li><UICONTROL id="012">障害<UICONTROL>: バグを特定します。</li>
<li><UICONTROL id="013">タスク<UICONTROL>: 特定の作業部分を記述します。</li>
<li><UICONTROL id="014">プロジェクト変更要求<UICONTROL>:
主要なプロジェクト・パラメーター (範囲、予定表、リソース) を再ネゴシエーションする公式メカニズムを提供します。</li>

7. SCREEN CHARACTER STRING CONTROL TABLE AFTER EDITING

| Master ID | Language ID | Character String | Category Information | Appearance Positional Information in the Program | Appearance Positional Information in the Application |
|---|---|---|---|---|---|
| Key_199 | English | Defect | Menu | (50,120),(200,160) | XYZ0012:/com/ibm/foo/bar/WorkItem.Dita:UICONTROL_012 |
| Key_199 | Japanese | 障害 | Menu | (50,120),(200,160) | XYZ0012:/com/ibm/foo/bar/WorkItem.Dita:UICONTROL_012 |
| Key_200 | English | Task | Menu | (50,170),(200,210) | XYZ0012:/com/ibm/foo/bar/WorkItem.Dita:UICONTROL_013 |
| Key_200 | Japanese | タスク | Menu | (50,170),(200,210) | XYZ0012:/com/ibm/foo/bar/WorkItem.Dita:UICONTROL_013 |
| Key_201 | English | Project Change Request | Menu | (50,220),(200,260) | XYZ0012:/com/ibm/foo/bar/WorkItem.Dita:UICONTROL_014 |
| Key_201 | Japanese | プロジェクト変更要求 | Menu | (50,220),(200,260) | XYZ0012:/com/ibm/foo/bar/WorkItem.Dita:UICONTROL_014 |
| Key_202 | English | Plan Item | | | |
| Key_203 | English | Risk | | | |
| Key_204 | English | Risk Action | | | |
| Key_205 | English | Issue | | | |
| Key_206 | English | Milestone | | | |

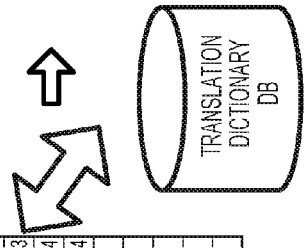

TRANSLATION DICTIONARY DB

8. ENTER <UICONTROL> TAG FOR TRANSITIONING TO SCREEN INFORMATION ACQUISITION MODE ON EDITOR (JAPANESE VERSION)

<li><UICONTROL id="012">障害<UICONTROL>: バグを特定します。</li>
<li><UICONTROL id="013">タスク<UICONTROL>: 特定の作業部分を記述します。</li>
<li><UICONTROL id="014">プロジェクト変更要求<UICONTROL>:
主要なプロジェクト・パラメーター (範囲、予定表、リソース) を再ネゴシエーションする公式メカニズムを提供します。</li>
<li><UICONTROL id="015"></li>

FIG. 8M

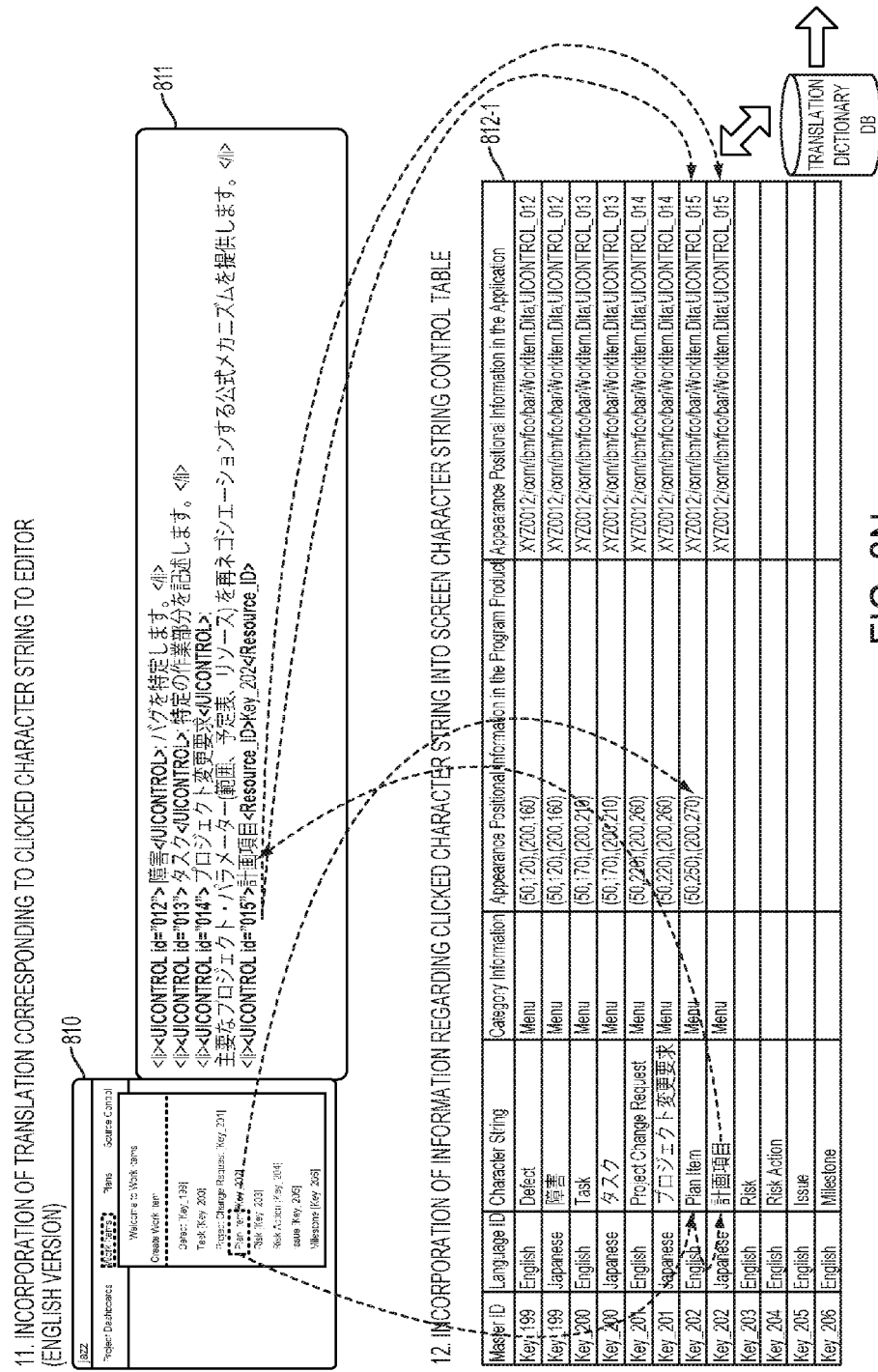

FIG. 9A

1-1. DEVELOPERS DETERMINE THE SCREEN CHARACTER STRING
/com/ibm/foo/bar/mes.properties
(ENGLISH VERSION)

```
Spec_13 = Defect
Spec_14 = Task
Spec_15 = Project Change Request
Spec_16 = Plan Item
Spec_17 = Risk
Spec_18 = Risk Action
Spec_19 = Issue
Spec_20 = Milestone
```
901

⇒

1-2. TRANSLATOR TRANSLATES THE SCREEN CHARACTER STRING
/com/ibm/foo/bar/mes.properties
(JAPANESE VERSION)

```
Spec_13 = 欠損
Spec_14 = タスク
Spec_15 = プロジェクト変更要求
Spec_16 = 計画項目
Spec_17 = リスク
Spec_18 = リスク・アクション
Spec_19 = 課題
Spec_20 = マイルストーン
```
951

⇑

2-1. SCREEN DISPLAY IN THE PROGRAM PRODUCT (ENGLISH VERSION)

jazz
Project Dashboards | Work Items | Plans | Source Control

Welcome to Work Items
Create Work Item 

Defect
Task
Project Change Request
Plan Item
Risk
Risk Action
Issue
Milestone

902

⇑

2-2. SCREEN DISPLAY IN THE PROGRAM PRODUCT (JAPANESE VERSION)

jazz
プロジェクト・ダッシュボード | ワーク・アイテム | プラン | ソース・コントロール

ワーク・アイテムへようこそ
ワーク・アイテムの生成 

欠損
タスク
プロジェクトの変更要求
計画項目
リスク
リスク・アクション
課題
マイルストーン

952

3. REGISTER IN MASTER TABLE

| Master ID | in-file message ID | SCM Positional Information | Project ID |
|---|---|---|---|
| Key_199 | Spec_13 | /com/ibm/foo/bar/mes.properties | XYZ0012 |
| Key_200 | Spec_14 | /com/ibm/foo/bar/mes.properties | XYZ0012 |
| Key_201 | Spec_15 | /com/ibm/foo/bar/mes.properties | XYZ0012 |
| Key_202 | Spec_16 | /com/ibm/foo/bar/mes.properties | XYZ0012 |
| Key_203 | Spec_17 | /com/ibm/foo/bar/mes.properties | XYZ0012 |
| Key_204 | Spec_18 | /com/ibm/foo/bar/mes.properties | XYZ0012 |
| Key_205 | Spec_19 | /com/ibm/foo/bar/mes.properties | XYZ0012 |
| Key_206 | Spec_20 | /com/ibm/foo/bar/mes.properties | XYZ0012 |

FIG. 9B 4-1. REGISTER IN SCREEN CHARACTER STRING CONTROL TABLE BASED ON THE PROGRAM PRODUCT (ENGLISH VERSION)

| Master ID | Language ID | Character String | Category Information | Appearance Positional Information in the Program Product | Appearance Positional Information in the Application |
|---|---|---|---|---|---|
| Key_199 | English | Defect | | | |
| Key_200 | English | Task | | | |
| Key_201 | English | Project Change Request | | | |
| Key_202 | English | Plan Item | | | |
| Key_203 | English | Risk | | | |
| Key_204 | English | Risk Action | | | |
| Key_205 | English | Issue | | | |
| Key_206 | English | Milestone | | | |

4-2. REGISTER IN SCREEN CHARACTER STRING CONTROL TABLE BASED ON THE PROGRAM PRODUCT (JAPANESE VERSION)

| Master ID | Language ID | Character String | Category Information | Appearance Positional Information in the Program Product | Appearance Positional Information in the Application |
|---|---|---|---|---|---|
| Key_199 | English | Defect | | | |
| Key_199 | Japanese | 障害 | | | |
| Key_200 | English | Task | | | |
| Key_200 | Japanese | タスク | | | |
| Key_201 | English | Project Change Request | | | |
| Key_201 | Japanese | プロジェクト変更要求 | | | |
| Key_202 | English | Plan Item | | | |
| Key_202 | Japanese | 計画項目 | | | |
| Key_203 | English | Risk | | | |
| Key_203 | Japanese | リスク | | | |
| Key_204 | English | Risk Action | | | |
| Key_204 | Japanese | リスク・アクション | | | |
| Key_205 | English | Issue | | | |
| Key_205 | Japanese | 課題 | | | |
| Key_206 | English | Milestone | | | |
| Key_206 | Japanese | マイルストーン | | | |

FIG. 9C

7. COMPARE BETWEEN CHARACTER STRING ENTERED INTO EDITOR AND CHARACTER STRING IN SCREEN CHARACTER STRING CONTROL TABLE (JAPANESE VERSION)

<li><UICONTROL id="012">障害<Resource_ID>Key_198<Resource_ID></UICONTROL> バグを特定します。</li>
<li><UICONTROL id="013"> タスク<Resource_ID>Key_200<Resource_ID></UICONTROL> 特定の作業部分を記述します。</li>
<li><UICONTROL id="014">プロジェクト・パラメーター（動議、予定表、リソース）を再利用するコミュニケーションの公式メカニズムを提供します。</li>
主要なプロジェクト・パラメーター（動議、予定表、リソース）を再利用コミュニケーションの公式メカニズムを提供します。</li>
<li><UICONTROL id="015">計画項目<Resource_ID>Key_202<Resource_ID></UICONTROL> 開発チームによるビジネス組織に対するコミットメントを記録します。</li>
<li><UICONTROL id="016">リスク<Resource_ID>Key_203<Resource_ID></UICONTROL> プロジェクト・リスクを記述し、リスクの確率および影響を計算するマトリックスを提供します。</li>
<li><UICONTROL id="017">リスク・アクション<Resource_ID>Key_204<Resource_ID></UICONTROL> リスクに対処する特定のアクションまたはリスクを緩和する特定のアクションを記述します。</li>
<li><UICONTROL id="018">問題<Resource_ID>Key_205<Resource_ID></UICONTROL></li>

— 907

| Master ID | Language ID | Character String | Category Information | Appearance Positional Information in the Product | Appearance Positional Information in the Program | Appearance Positional Information in the Application |
|---|---|---|---|---|---|---|
| Key_199 | English | Defect | Menu | (50,120),(20,150) | XYZ2012:/com/ibm/foo/bar/Mock:item.Dia:UICONTROL_012 |
| Key_199 | Japanese | 障害 | Menu | (50,120),(20,150) | XYZ2012:/com/ibm/foo/bar/Mock:item.Dia:UICONTROL_012 |
| Key_200 | English | Task | Menu | (50,170),(20,210) | XYZ2012:/com/ibm/foo/bar/Mock:item.Dia:UICONTROL_013 |
| Key_200 | Japanese | タスク | Menu | (50,170),(20,210) | XYZ2012:/com/ibm/foo/bar/Mock:item.Dia:UICONTROL_013 |
| Key_201 | English | Project Change Request | Menu | (50,220),(20,260) | XYZ2012:/com/ibm/foo/bar/Mock:item.Dia:UICONTROL_014 |
| Key_201 | Japanese | プロジェクト変更要求 | Menu | (50,220),(20,260) | XYZ2012:/com/ibm/foo/bar/Mock:item.Dia:UICONTROL_014 |
| Key_202 | English | Plan Item | Menu | (50,270),(20,310) | XYZ2012:/com/ibm/foo/bar/Mock:item.Dia:UICONTROL_015 |
| Key_202 | Japanese | 計画項目 | Menu | (50,270),(20,310) | XYZ2012:/com/ibm/foo/bar/Mock:item.Dia:UICONTROL_015 |
| Key_203 | English | Risk | Menu | (50,320),(20,360) | XYZ2012:/com/ibm/foo/bar/Mock:item.Dia:UICONTROL_016 |
| Key_203 | Japanese | リスク | Menu | (50,320),(20,360) | XYZ2012:/com/ibm/foo/bar/Mock:item.Dia:UICONTROL_016 |
| Key_204 | English | Risk Action | Menu | (50,370),(20,410) | XYZ2012:/com/ibm/foo/bar/Mock:item.Dia:UICONTROL_017 |
| Key_204 | Japanese | リスク・アクション | Menu | (50,370),(20,410) | XYZ2012:/com/ibm/foo/bar/Mock:item.Dia:UICONTROL_017 |
| Key_205 | English | Issue | Menu | (50,420),(20,460) | XYZ2012:/com/ibm/foo/bar/Mock:item.Dia:UICONTROL_018 |
| Key_205 | Japanese | 課題 | Menu | (50,420),(20,460) | XYZ2012:/com/ibm/foo/bar/Mock:item.Dia:UICONTROL_018 |
| Key_206 | English | Milestone | Menu | (50,470),(20,510) | XYZ2012:/com/ibm/foo/bar/Mock:item.Dia:UICONTROL_019 |
| Key_206 | Japanese | マイルストーン | Menu | (50,470),(20,510) | XYZ2012:/com/ibm/foo/bar/Mock:item.Dia:UICONTROL_019 |

8. CONFORM THE CHARACTER STRING INPUT INTO THE EDITOR TO THE CHARACTER STRING IN THE SCREEN CHARACTER STRING CONTROL TABLE (JAPANESE VERSION)

```
<li><UICONTROL id="012">障害<Resource_ID>Key_199<UICONTROL>バグを特定します。</li>
<li><UICONTROL id="013">タスク<Resource_ID>Key_200<UICONTROL>特定の作業部分を記述します。</li>
<li><UICONTROL id="014">プロジェクト変更要求<Resource_ID>Key_201<UICONTROL>
主要なプロジェクト・パラメーター (範囲、予定表、リソース) を再ネゴシエーションする公式メカニズムを提供します。</li>
<li><UICONTROL id="015">計画項目<Resource_ID>Key_202<UICONTROL>開発チームによるビジネス組織に
対するコミットメントを記録します。</li>
<li><UICONTROL id="016">リスク<Resource_ID>Key_203<UICONTROL>プロジェクト・リスクを記述し、リスクの確
率および影響を計算するマトリックスを提供します。</li>
<li><UICONTROL id="017">リスク・アクション<Resource_ID>Key_204<UICONTROL>リスクに対処する特定のアク
ションまたはリスクを緩和する特定のアクションを記述します。</li>
<li><UICONTROL id="018">課題<Resource_ID>Key_205<UICONTROL></li>
```
909

| Master ID | Language ID | Character String | Category Information | Appearance Positional Information in the Product | Appearance Positional Information in the Program | Appearance Positional Information in the Application |
|---|---|---|---|---|---|---|
| Key_199 | English | Defect | Menu | (50,120), (200,160) | XYZ0012:/com/ibm/foo/bar/WorkItem.Dia | UICONTROL_012 |
| Key_199 | Japanese | 障害 | Menu | (50,120), (200,160) | XYZ0012:/com/ibm/foo/bar/WorkItem.Dia | UICONTROL_012 |
| Key_200 | English | Task | Menu | (50,170), (200,210) | XYZ0012:/com/ibm/foo/bar/WorkItem.Dia | UICONTROL_013 |
| Key_200 | Japanese | タスク | Menu | (50,170), (200,210) | XYZ0012:/com/ibm/foo/bar/WorkItem.Dia | UICONTROL_013 |
| Key_201 | English | Project Change Request | Menu | (50,220), (200,260) | XYZ0012:/com/ibm/foo/bar/WorkItem.Dia | UICONTROL_014 |
| Key_201 | Japanese | プロジェクト変更要求 | Menu | (50,220), (200,260) | XYZ0012:/com/ibm/foo/bar/WorkItem.Dia | UICONTROL_014 |
| Key_202 | English | Plan Item | Menu | (50,270), (200,310) | XYZ0012:/com/ibm/foo/bar/WorkItem.Dia | UICONTROL_015 |
| Key_202 | Japanese | 計画項目 | Menu | (50,270), (200,310) | XYZ0012:/com/ibm/foo/bar/WorkItem.Dia | UICONTROL_015 |
| Key_203 | English | Risk | Menu | (50,320), (200,360) | XYZ0012:/com/ibm/foo/bar/WorkItem.Dia | UICONTROL_016 |
| Key_203 | Japanese | リスク | Menu | (50,320), (200,360) | XYZ0012:/com/ibm/foo/bar/WorkItem.Dia | UICONTROL_016 |
| Key_204 | English | Risk Action | Menu | (50,370), (200,410) | XYZ0012:/com/ibm/foo/bar/WorkItem.Dia | UICONTROL_017 |
| Key_204 | Japanese | リスク・アクション | Menu | (50,370), (200,410) | XYZ0012:/com/ibm/foo/bar/WorkItem.Dia | UICONTROL_017 |
| Key_205 | English | Issue | Menu | (50,420), (200,460) | XYZ0012:/com/ibm/foo/bar/WorkItem.Dia | UICONTROL_018 |
| Key_205 | Japanese | 課題 | Menu | (50,420), (200,460) | XYZ0012:/com/ibm/foo/bar/WorkItem.Dia | UICONTROL_018 |
| Key_206 | English | Milestone | Menu | (50,470), (200,510) | XYZ0012:/com/ibm/foo/bar/WorkItem.Dia | UICONTROL_019 |
| Key_206 | Japanese | マイルストーン | Menu | (50,470), (200,510) | XYZ0012:/com/ibm/foo/bar/WorkItem.Dia | UICONTROL_019 |

MANUAL CREATION FOR A PROGRAM PRODUCT

PRIORITY

This application is a continuation of and claims priority from U.S. patent application Ser. No. 14/262,125, filed on Apr. 25, 2014, entitled "MANUAL CREATION FOR A PROGRAM PRODUCT," which in turn claims priority to Japanese Patent Application No. 2013-165147, filed Aug. 8, 2013, and all the benefits accruing therefrom under 35 U.S.C. § 119, the contents of which in its entirety are herein incorporated by reference.

BACKGROUND

The present disclosure relates generally a technique for supporting creation of a manual of a program product, and more specifically, to a technique for creating a manual by maintaining terminology consistency between a program product and a manual associated with the program product.

A manual of a program product fulfills an important role when a user uses the program product. However, terminology displayed on a display device of a computer that is actually operating the program product (hereinafter referred to as "terminology of a program product on the screen") (for example, menu bar terminology) and terminology in the manual (hereinafter referred to as "manual terminology") are often different. In this case, even if the user reads the manual, a situation where an operation method for the program product is difficult to understand or is beyond his/her understanding, or the program product is difficult to use could happen. Furthermore, even if the user reads the manual, a situation where the terminology of the program product on the screen cannot be verified could happen.

An author of a manual creates the manual while confirming the terminology of the program product on the screen during actual operation, or based on specifications thereof. Furthermore, in order to confirm the terminology of the program product on the screen during actual operation, the author of the manual creates the manual while switching between an application for creating the manual (hereinafter referred to as "editor"), and the program product during actual operation on the same computer (for example, by switching windows), or by operating the editor and the program product during actual operation on different computers and simultaneously operating both computers for example.

Furthermore, when creating a manual using a screen character string, specifically using a UI (user interface) character string, the author of the manual manually enters the screen character string, or creates a glossary for the program product and then uses the glossary. However, when the author of the manual manually creates the manual, a situation where the terminology of the manual is not accurately described, for example, because of typographical errors or misunderstandings during the entry could occur. Furthermore, maintaining manual terminology consistency while the author of the manual views the terminology of the program product on the screen is a very time-consuming work. Furthermore, there may be cases where terminology about a leading edge program product or terminology of its own company's or other company's unique terminology, which is not an industry wide standard, may not be sufficiently compiled in the glossary of the program product. Furthermore, the program product is improved just before its release, and the terminology on the screen of the program product often changes. In this case, a situation where changes in the terminology are not reflected in the manual could happen.

Furthermore, if the program product is in an English version, a situation where a different translation is used for the same word between in a Japanese version of the program product and a Japanese version of the manual, because a developer translating the program product into Japanese and the author of the Japanese version of the manual of the program product are different could happen. Furthermore, if the program product is in an English version, when an author of the Japanese version of the manual creates a Japanese version of the manual by translating the English version or creates a new Japanese version of the manual independent from the English version of the manual, a situation where a different translation is used for the same word between the Japanese version of the program product and the Japanese version of the manual could happen.

SUMMARY

A method, system, and computer program product for supporting creation of a manual of a program product are provided. An aspect includes recording into a recording medium that can be accessed by the computer a screen character string, a translated character string where the screen character string has been translated to another language, or an identifier associated with the screen character string or the translated character string, displayed on a display device by the program product. Another aspect includes recording into the recording medium attribute information of the screen character string or the translated character string. Yet another aspect includes maintaining consistency between the screen character string or the translated character string and a character string that is displayed on a display device by an application for creating the manual, using the screen character string, the translated character string or identifier recorded on the recording medium and the attribute information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which:

FIG. 7A-K show examples where terminology change in the manual of the program product is automatically reflected and the consistency is maintained between the terminology of the menu bar after the changes and the terminology in the manual, in the case that the terminology of the menu bar is changed during a product development stage of the program product, in accordance with an embodiment.

FIG. 9A-F show examples where the consistency is maintained between the translation in the Japanese version of the program product and the translation in the Japanese version of the manual, in the case that a screen character string in the English version of the program product is translated into different Japanese character strings between the translation in the Japanese version of the program product and the translation in the Japanese version of the manual, in a product development stage of the Japanese version of the program product corresponding to the English version of the program product, in accordance with an embodiment.

DETAILED DESCRIPTION

Figure 1:
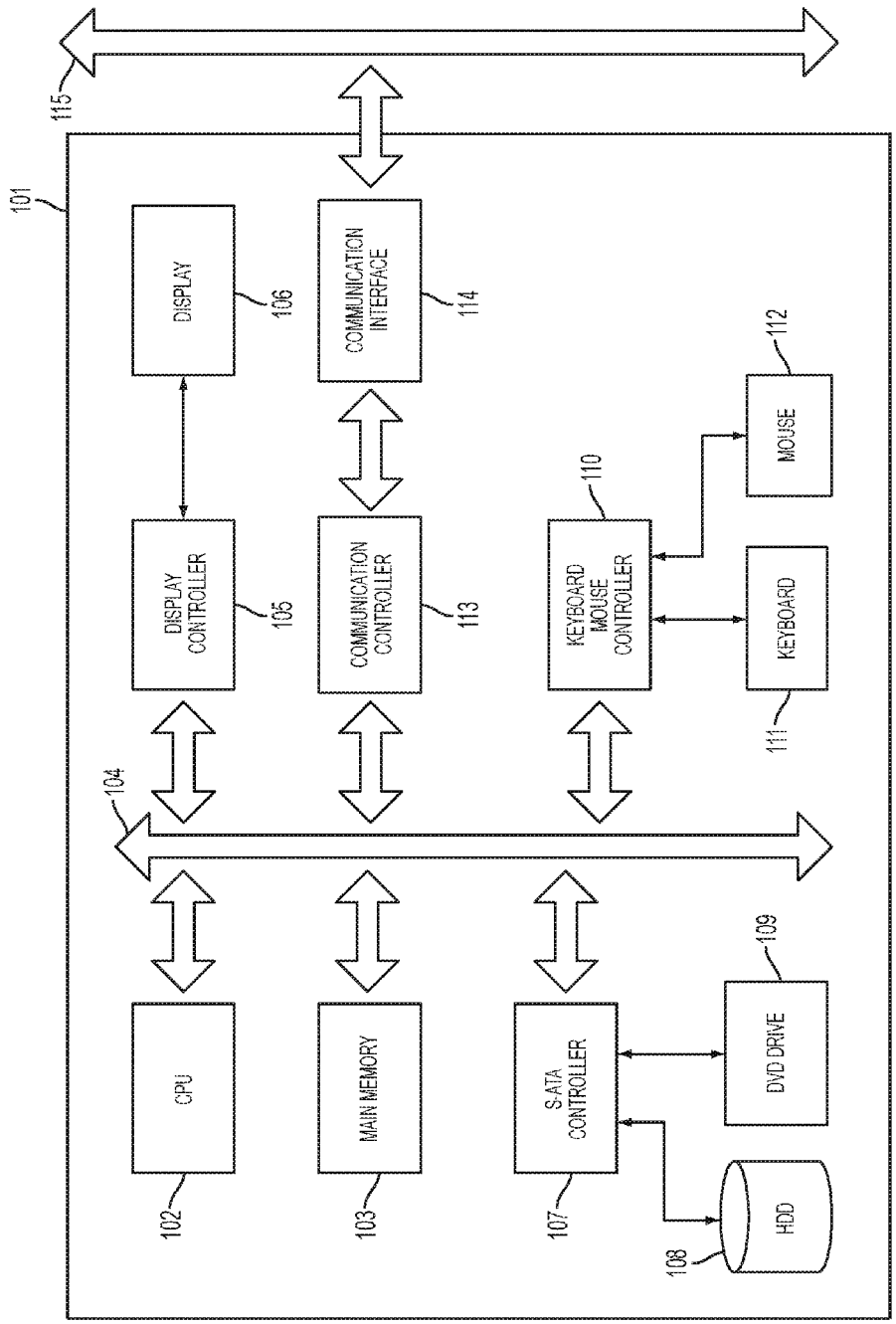
FIG. 1 is a diagram showing an example of a computer having a hardware configuration for realizing a computer that may be used In an embodiment.

Embodiments disclosed herein relate to manual creation for a program product. Terminology of a program product on the screen and terminology in the manual of the program product must be consistent. However, according to results from complaints and questionnaire surveys collected from users of the program product, it is known that users are dissatisfied with inconsistency of the terminology. Furthermore, if the terminology of the program product on the screen and the terminology in the manual of the program product are not consistent, because no term may be hit as a result of searching, it may be necessary to read the entire manual or all relevant sections. Therefore, a technique is provided for automatically conforming terminology of a program product on the screen and terminology in a manual of the program product. A technique is provided for supporting creation of a manual of a program product. The technique may include a method for supporting creation of a manual of a program product, as well as a computer, a computer program, and a computer program product.

In an embodiment, a method for supporting creation of a manual of a program product includes: a block of recording a screen character string (hereinafter also referred to as "screen character string for the program product"), a translated character string where the screen character string has been translated into another language, or an identifier related to the screen character string or the translated character string, displayed on a display device by the program product onto a recording medium that is accessible by the computer; a block of recording attribute information of the screen character string or the translated character string onto the recording medium; and a block of maintaining consistency between the screen character string or the translated character string and a character string that is displayed on a display device by an application for creating the manual, using the screen character string, translated character string or identifier recorded on the recording medium and the attribute information.

In an embodiment, a computer for supporting creation of a manual of a program product includes: a recording means for recording a screen character string, a translated character string where the screen character string has been translated into another language, or an identifier related to the screen character string or the translated character string displayed on a display device of the program product onto a recording medium that is accessible by a computer, and for recording attribute information of the screen character string or the translated character string onto the recording medium; and a consistency maintaining means for maintaining consistency between the screen character string or the translated character string and a character string that is displayed on a display device by an application for creating the manual, using the screen character string, the translated character string, or the identifier and the attribute information recorded in the recording medium.

In one aspect, the computer can be further provided with a substituting means of substituting a screen character string prior to modification in terminology data that where the screen character string about the program product is recorded with a modified screen character string, according to the modification of the screen character string to another screen character string. In this case, the consistency maintaining means can compare the attribute information to the terminology data when the application loads the manual into memory in the computer, and can substitute the screen character string prior to modification in the manual with the modified screen character string.

In one aspect, the computer may be further provided with a translated character string adding means that adds a translated character string that has been translated into a second language to the terminology data where the screen character string about the program product is recorded when the screen character string is translated from a first language to a second language. In this case, the consistency maintaining means can execute to compare information to the terminology data when the application loads the manual into the memory, and to substitute the screen character string in the first language in the manual with the translated character string that has been translated into the second language.

In one aspect, the computer can be further provided with a substituting means of substituting a screen character string prior to modification in terminology data where the screen character string for the program product is recorded with a modified screen character string, when the screen character string is modified to another screen character string, and a translated character string adding means that adds a translated character string that has been translated into a second language to the terminology data where the screen character string for the program product is recorded when the modified screen character string is translated from a first language to a second language. In this case, the consistency maintaining means can execute to compare the attribute information to the terminology data when the application loads the manual into the memory, and to substitute the screen character string of the first language in the manual with the translated character string that has been translated into the second language.

In one aspect, the computer can be further provided with an editing means that execute to insert the recorded screen character string or translated character string adjacent to the entered indicator character string, and to insert the recorded screen character string or translated character string between a character string indicating a start of the entered indicator character string and a character string indicating an end.

In one aspect, the recording means can record, on the occasion of selecting the screen character string displayed on the display device by the program product, the selected screen character string, a translated character string where the selected screen character string has been translated into another language, or an identifier related to the selected screen character string or the translated character string onto a recording medium.

In one aspect, the recording means can record the screen character string, the translated character string or the identifier; the attribute information; and an identifier for uniquely associating a combination of the attribute data with the screen character string or the translated character string onto the recording medium.

In an embodiment, the attribute information can include at least one of language information of the screen character string or the translated character string, category information associated with the screen character string, first appearance positional information associated with the screen character string in the program product, and second appearance positional information associated with the screen character string or the translated character string in the application.

In one aspect, the computer, on the occasion of selecting the recorded screen character string or the recorded translated character string on the application, can be further provided with a character string display means that displays a character string corresponding to the selected screen character string or the screen character string before translation of the selected translated character string, on the program product.

In one aspect, the computer can be provided with a message file control means that prepares a message file associated with the program product. In one aspect, the computer can be further provided with a master table control means that prepares a master table. In one aspect, the computer can be further provided with a screen character string control table control means that prepares a screen character string control table.

In one aspect, the computer can be further provided with a granting means, in response to a command to incorporate a screen character string displayed on the display device by the program product onto the application, for granting a unique identifier within the manual associated with the incorporating screen character string; and a screen character string control table control means for updating the screen character string control table so as to include a set of the master table identifier that is associated with the incorporating screen character string; the incorporating screen character string, translated character string where the incorporating screen character string has been translated into another language or an identifier associated with the screen character string or the translated character string; category information associated with the incorporating screen character string; first appearance positional information associated with the incorporating screen character string in the program product; and second appearance positional information of the incorporating screen character string or translated character string where the incorporating screen character string has been translated into another language in the application.

In one aspect, the computer can be further provided with an inserting means for referencing the screen character string control table, associating the master table identifier associated with the incorporating screen character string to the screen character string incorporating in the application, and inserting into the application.

In one aspect, the computer can be provided with a screen character string control table control means that records the modified screen character string or the translated character string where the modified screen character string has been translated into another language, in the screen character string control table, according to the modification of the screen character string to another screen character string. The screen character string control table can include a set of the master table identifier associated with the screen character string before modification; the modified screen character string, the translated character string where the modified screen character string has been translated into another language, or an identifier associated with the modified screen character string or the translated screen character string where the modified screen character string has been translated into another language; category information associated with the screen character string before modification; the first appearance positional information associated with the screen character string before modification in the program product; and the second appearance positional information associated with the screen character string before modification in the application. Furthermore, In one aspect, the computer is further provided with an acquiring means for referencing the screen character string control table, and acquiring the second appearance positional information associated with the screen character string before modification, in response to the application loading the manual into the memory. Furthermore, In one aspect, the consistency maintaining means can substitute the screen character string before modification that has been associated with the acquired second appearance positional information with the modified screen character string.

In one aspect, the computer can be provided with a screen character string control table control means for recording the translated character string that has been translated into another language in the screen character string control table, in response to the screen character string being translated from a first language into a second language. The screen character string control table can include a set of the master table identifier associated with the screen character string in the first language; language information in the second language; translated character string that has been translated into the second language; category information associated with the screen character string in the first language; first appearance positional information associated with the screen character string of the first language on the program product; and the second appearance positional information associated with the screen character string in the first language on the application. Furthermore, In one aspect, the computer can be further provided with an acquiring means for referencing the screen character string control table, and acquiring the second appearance positional information associated with the screen character string in the first language, in response to the application loading the manual into the memory. Furthermore, In one aspect, the consistency maintaining means can substitute the screen character string that has been associated with the acquired second appearance positional information with the modified screen character string that has been translated into a second language.

In one aspect, the computer can be provided with a screen character string control table control means for recording the modified screen character string in the screen character string control table, in response to the screen character string being modified. The screen character string control table can include a set of the master table identifier associated with the screen character string before modification; the screen character string after modification; category information associated with the screen character string before modification; first appearance positional information associated with the screen character string before modification on the program product; and the second appearance positional information associated with the screen character string before modification in the application. Furthermore, In one aspect, the computer can be provided with a screen character string control table control means for recording the translated character string that has been translated into another language, in the screen character string control table, in response to the modified screen character string being translated from a first language into a second language. The screen character string control table can include a set of the master table identifier associated with the screen character string of the first language before modification; language information in the second language; translated character string that has been translated into the second language; category information associated with the screen character string in the first language before modification; first appearance positional information associated with the screen character string in the first language before modification on the program product; and the second appearance positional information associated with the screen character string in the first language before modification or the screen character string after modification, on the application. Furthermore, In one aspect, the computer can further provided with an acquiring means for referencing the screen character string control table, and acquiring the second appearance positional information associated with the screen character string in the first language before modification or the screen character string after modification, in response to the application loading the manual into the memory. Furthermore, In one aspect, consistency maintaining means can substitute the screen character string either before or after modification that has been associated with the acquired second appearance positional information with the translated character string that has been translated into a second language.

Furthermore, the computer program and computer program product according to embodiments cause the computer to execute each of the blocks of the method. The computer program according to an embodiment can store data in one or a plurality of computer readable recording media, such as a flexible disk, MO, CD-ROM, DVD, BD, hard disk devices, USB connectable memory media, ROM, MRAM or RAM. The computer program can be downloaded from another data processing system, such as a server computer, connected to a communication circuit, or can be copied from other recording media, in order to store in the recording medium. Furthermore, the computer program according to an embodiment can also be compressed or split into a plurality of parts and can be stored on one or a plurality of recording media. Furthermore, it should be noted that the computer program product according to an embodiment can naturally be provided in a variety of forms. The computer program product according to an embodiment can include, for example, recording media where the computer program is recorded or transmission media that transmit the computer program.

Furthermore, embodiments can be realized as hardware, software or a combination of hardware and software. In the execution by a combination of hardware and software, execution in a computer where the computer program is installed is exemplified as a typical example. In such case, the computer program controls the computer and causes execution of the processes relating embodiments by loading the computer program into a memory of the computer and executing it. The computer program can be composed of a group of commands that can be expressed by any language, code, or description. Such group of commands enables the computer to execute specific functions directly, or after performing either one or both of: 1. converting into another language, code, or description, or 2. copying to other media.

In accordance with an embodiment, even when a screen character string (for example menu bar terminology) is changed, for example, during a product development stage of a program product, because the change is automatically reflected on the application for creating a manual of the program product, it becomes possible to maintain consistency between the changed screen character strings in the program product and character strings that are displayed on a display device by the application. In other words, it is possible to prevent discrepancy in terminology between the screen character string of the program product after modification in the program product and the character string that is displayed on a display device by the application.

According to an embodiment, when a screen character string (such as a menu bar term) is changed during a product development stage of an English version program product, because the translation of the menu bar on a Japanese version of the program product corresponding to the English version of the program product is changed in response to the change in the menu bar term of the English version program product, the change in the term is automatically reflected in the Japanese version of the manual of the Japanese version of the program product, and it becomes possible to maintain consistency between the menu bar term of the English version program product after modification and the translation of the manual of the Japanese version.

According to an embodiment, for the menu bar term in the English version the program product, it becomes possible to maintain consistency between the translation of the menu bar in the Japanese version program product corresponding to the English version program product and the translation of the menu bar in the manual of the Japanese version program product.

The aforementioned computer according to an embodiment may be composed of one or a plurality of computers. The aforementioned computer according to an embodiment may simultaneously execute a program product and an application for creating a manual (hereinafter referred to as "editor"). The aforementioned computer according to an embodiment may display an execution window screen of a running program product on a first display device, and may display an execution window screen of the running editor on a second display device.

Alternatively, the aforementioned computer according to an embodiment may display the execution window screen of the running program product and the execution window screen for the running editor side by side on one display device.

Alternatively, the aforementioned computer according to an embodiment may display the execution window screen of the running program product and the execution window screen of the running editor on one display device by switching between both windows according to a user's instruction.

In an embodiment, "program product" refers to an arbitrary variety of applications, and includes any software that is utilized by installing on an operating system, and, the operating system. In an embodiment, "a screen character string displayed on the display device by the program product" refers to a screen character string about the program product displayed on the display device by a computer operating the program product. The screen character string may be a user interface (UI) character string for example, and more specifically, may be a variety of UI components, such as a menu bar, an access tool bar or a button label, or terminology displayed on the window title for example. In an embodiment, "manual" refers to instructions, a manual, user('s) guide, specifications or help guide relating to the aforementioned program product, regardless of whether it is printed material or electronic data. In an embodiment, "an application for creating a manual" is not particularly limited as long as it is an application provided with an editing means for electronically entering or editing the aforementioned manual, and refers to an editor or word processor for example. In an embodiment, "a character string displayed on a display device by an application for creating a manual" refers to a character string in the manual during or after editing. In an embodiment, a display device where a program product displays a screen character string, and a display device where an application for creating a manual displays a character string can be the same display device, or separate display devices.

FIG. 1 is a diagram showing an example of a hardware configuration for realizing a computer that may be used In an embodiment. A computer (101) includes a central processing unit (CPU) (102) and a main memory (103), and these are connected to a bus (104). The CPU (102) may be based on a 32-bit or 64-bit architecture in various embodiments, and may comprise any appropriate CPU. The bus (104) can be connected to a display (106), such as a liquid crystal display (LCD), through a display controller (105). Furthermore, the liquid crystal display (LCD), for example, may be a touch panel display or a floating touch display. The display (106) can be used for displaying information that is displayed by operating software running on the computer (101), such as a computer program in accordance with an embodiment, for example, a screen displayed on a display device by the program product (including screen character strings), or a screen displayed on a display device by the application for creating a manual (including character strings of a manual during editing), using an appropriate graphic interface. The bus (104) can optionally be connected to a memory device (108), such as a hard disk or a solid state drive, through SATA or an IDE controller (107). The bus (104) can optionally be connected to the memory device (108) or a drive (109), such as a CD, DVD, or BD drive, through the SATA or IDE controller (107). A keyboard (111) and a mouse (112) can be optionally connected to the bus (104) through a peripheral controller (110), for example, a keyboard-mouse-controller or a USB bus.

An operating system, programs that provide a processing environment, computer programs according to various embodiments; and other programs and data are stored in the memory device (108) to enable to be loaded into the main memory (103). The memory device (108) can be incorporated in the computer (101), and can be connected by a cable so as to be accessible by the computer (101), or can be connected through a wire or wireless network so as to be accessible by the computer (101). The drive (109) can be used for installing a program, such as an operating system or an application, into the memory device (108) from a compact disc read only memory (CD-ROM), digital video disc ROM (DVD-ROM), or Blu-ray disc.

A communication interface (114) follows, for example, Ethernet™ protocol. The communication interface (114) is connected to the bus (104) through a communication controller (113), assumes a role to connect the computer (101) to a communication line (115) with a wire or wirelessly, and provides a network interface layer to communication protocol of the communication function of the operating system of the computer (101). The communication line, for example, can be a wired or wireless communication line, or a mobile telephone network in various embodiments. The computer (101) can receive data from another computer through the communication line (115), and store the data on the memory device (108).

Figure 4A:
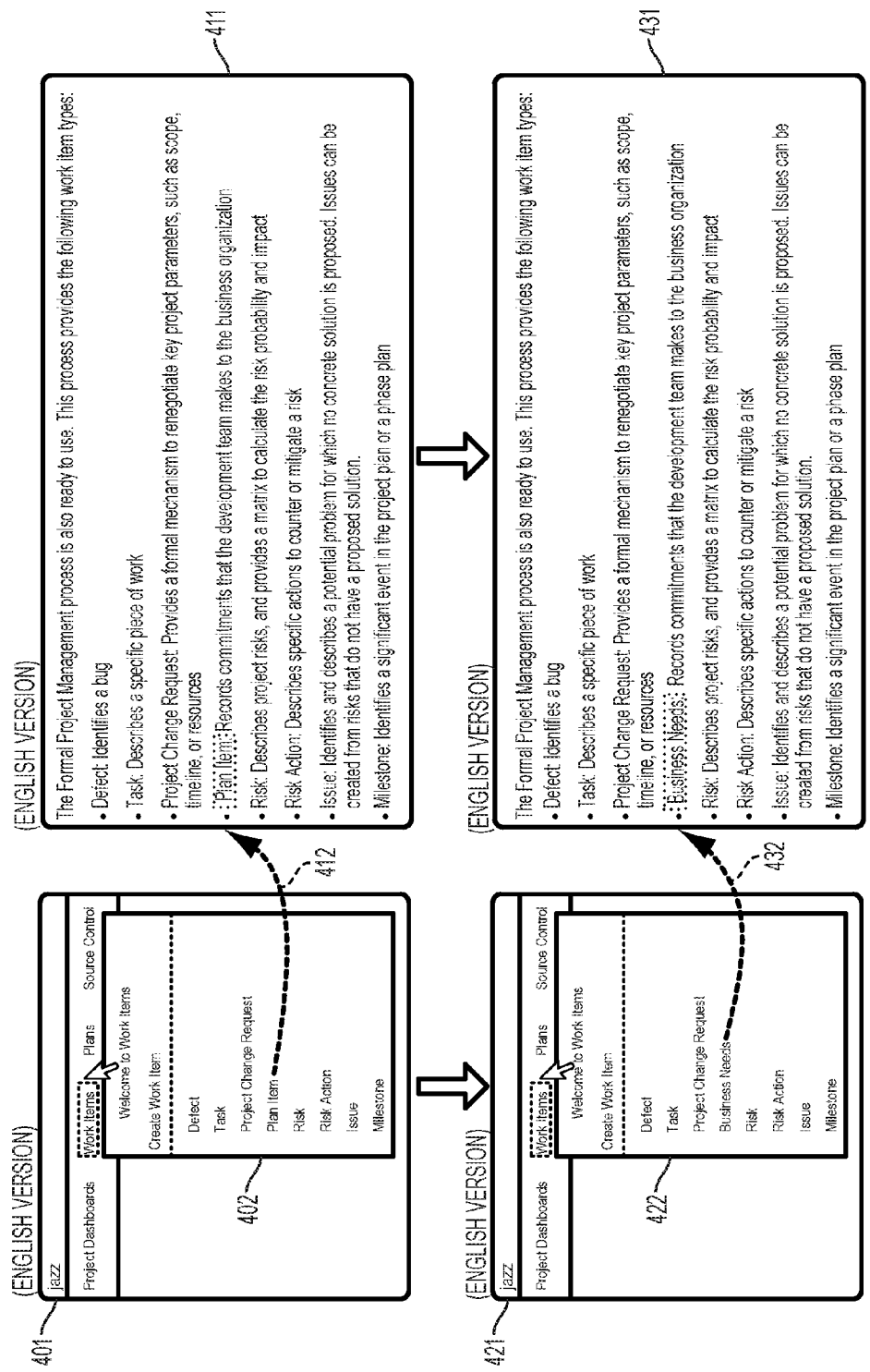
FIGS. 4A-C show examples of prior art where a Japanese version of the manual is shipped without terminology in the Japanese version of the manual reflecting changes in the Japanese version of the program product corresponding to an English version of the program product, in the case that the terminology of the menu bar is changed during a product development stage of the English version of the program product.
Figure 4B:
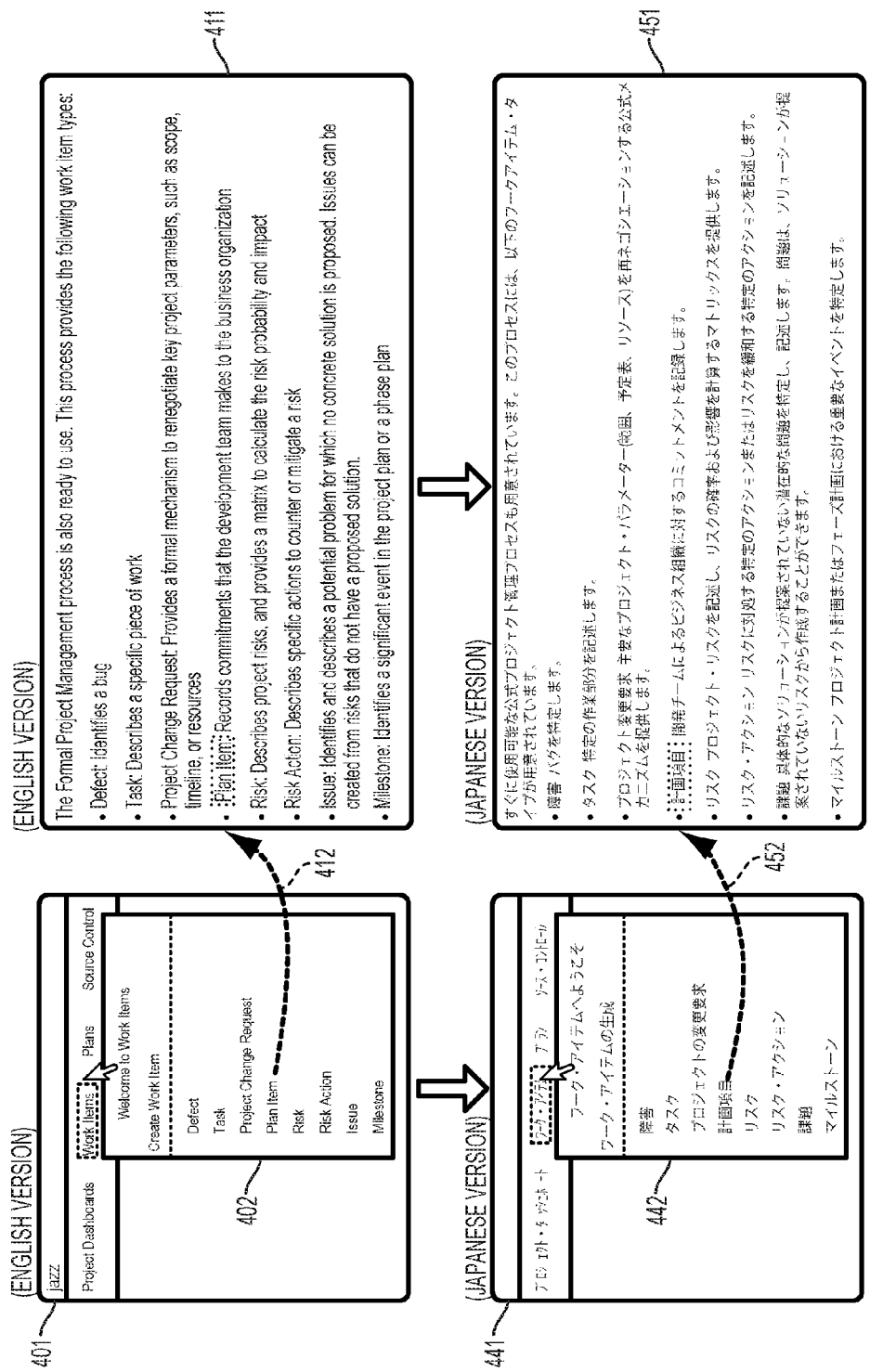
Figure 4C:
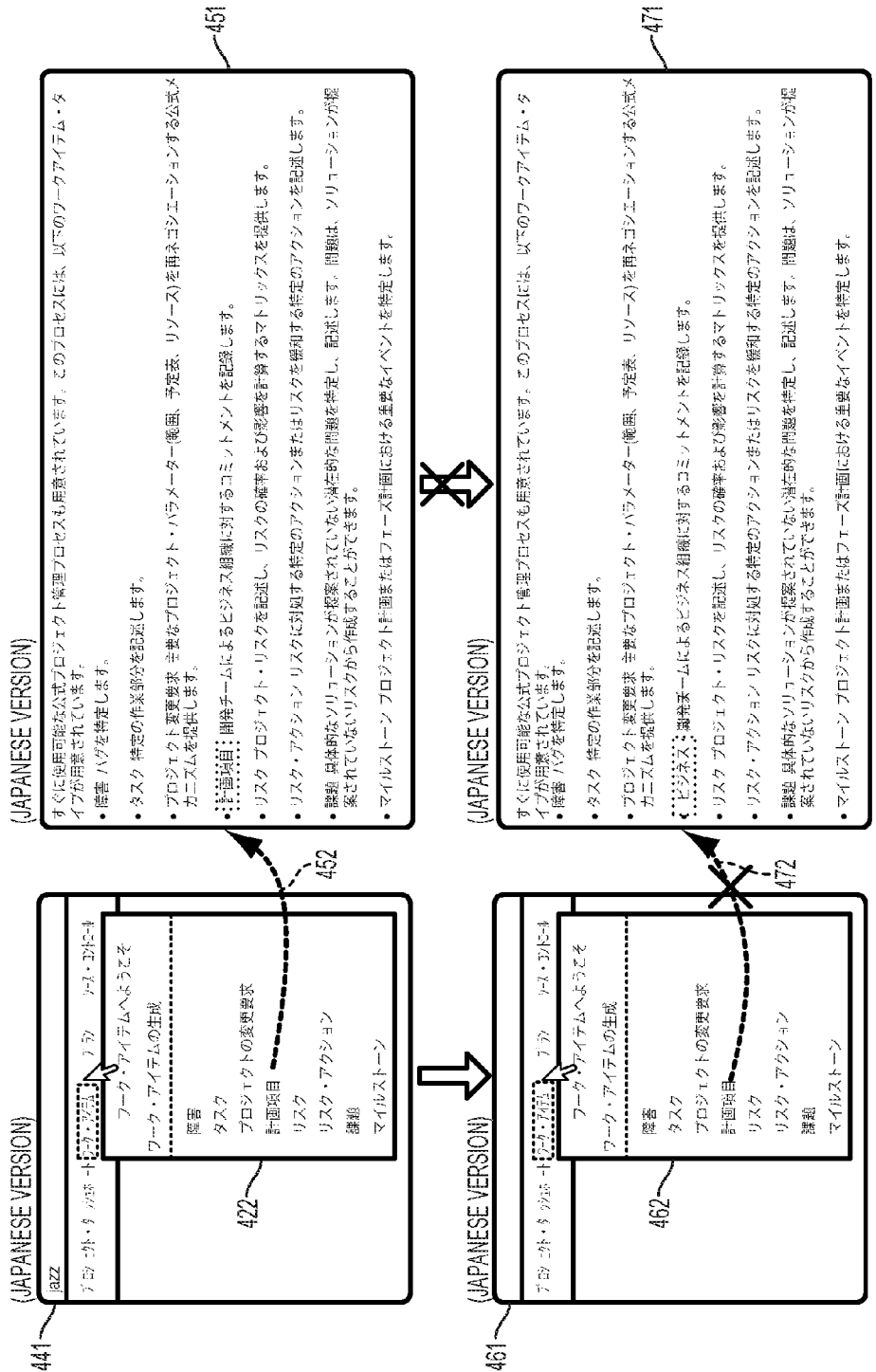
Figure 5:
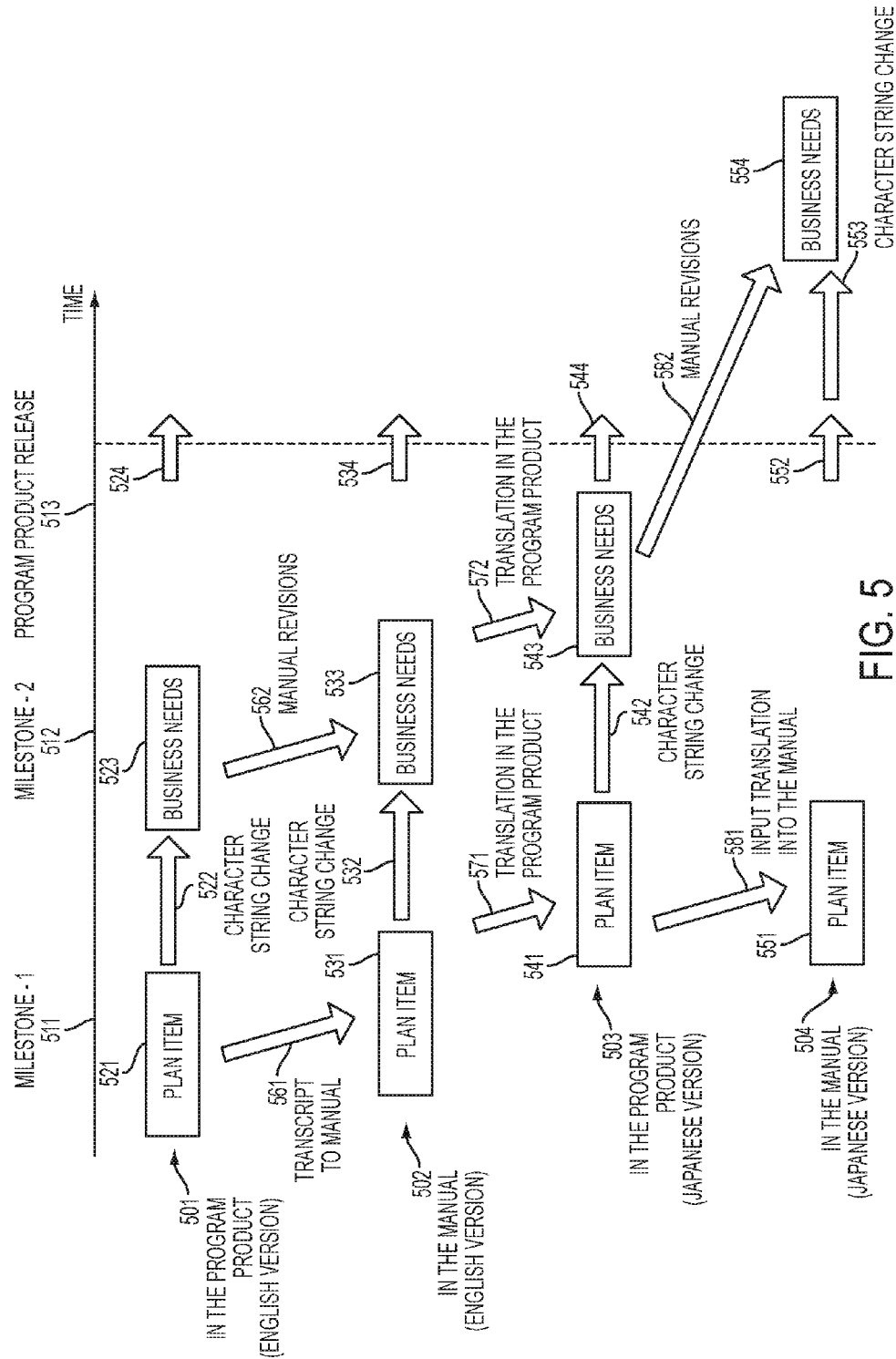
FIG. 5 is a diagram for describing an example of the prior art shown in FIG. 4A through FIG. 4C in chronological order.
Figure 6:
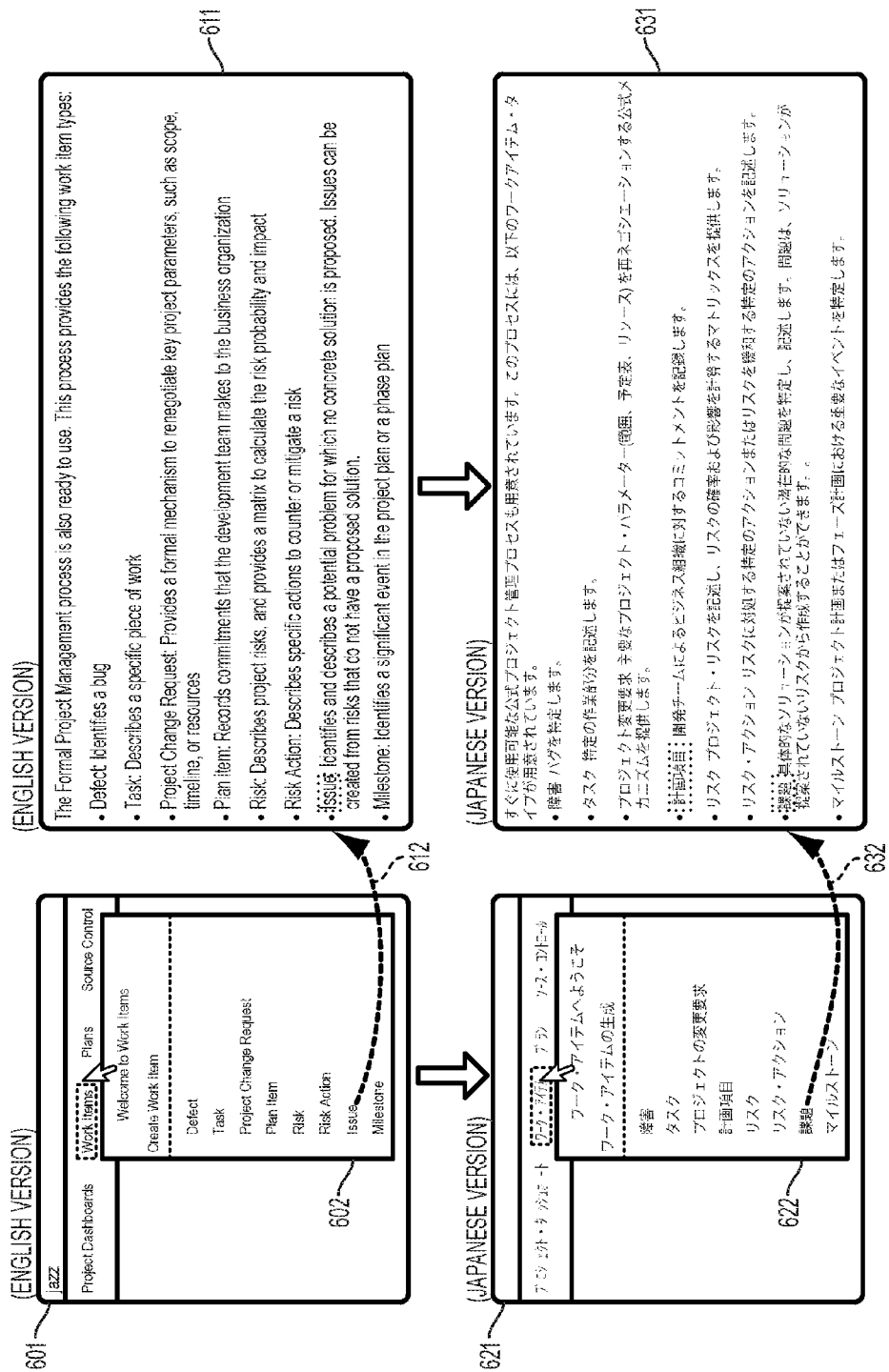
FIG. 6 shows an example of prior art where a manual is shipped with different terminology between the translation of a menu bar on a Japanese version of the program product corresponding to an English version of the program product and the translation corresponding to the menu bar in the manual of the Japanese version of the program product, with regards to the terminology in the English version of the program product.

FIG. 2 and FIG. 3, FIG. 4A through FIG. 4C and FIG. 5, as well as FIG. 6 show an example of prior art that cannot maintain consistency between a screen character string displayed on a display device by a program product, and a character string displayed on the display device by an application for creating the manual, respectively.

Figure 2:
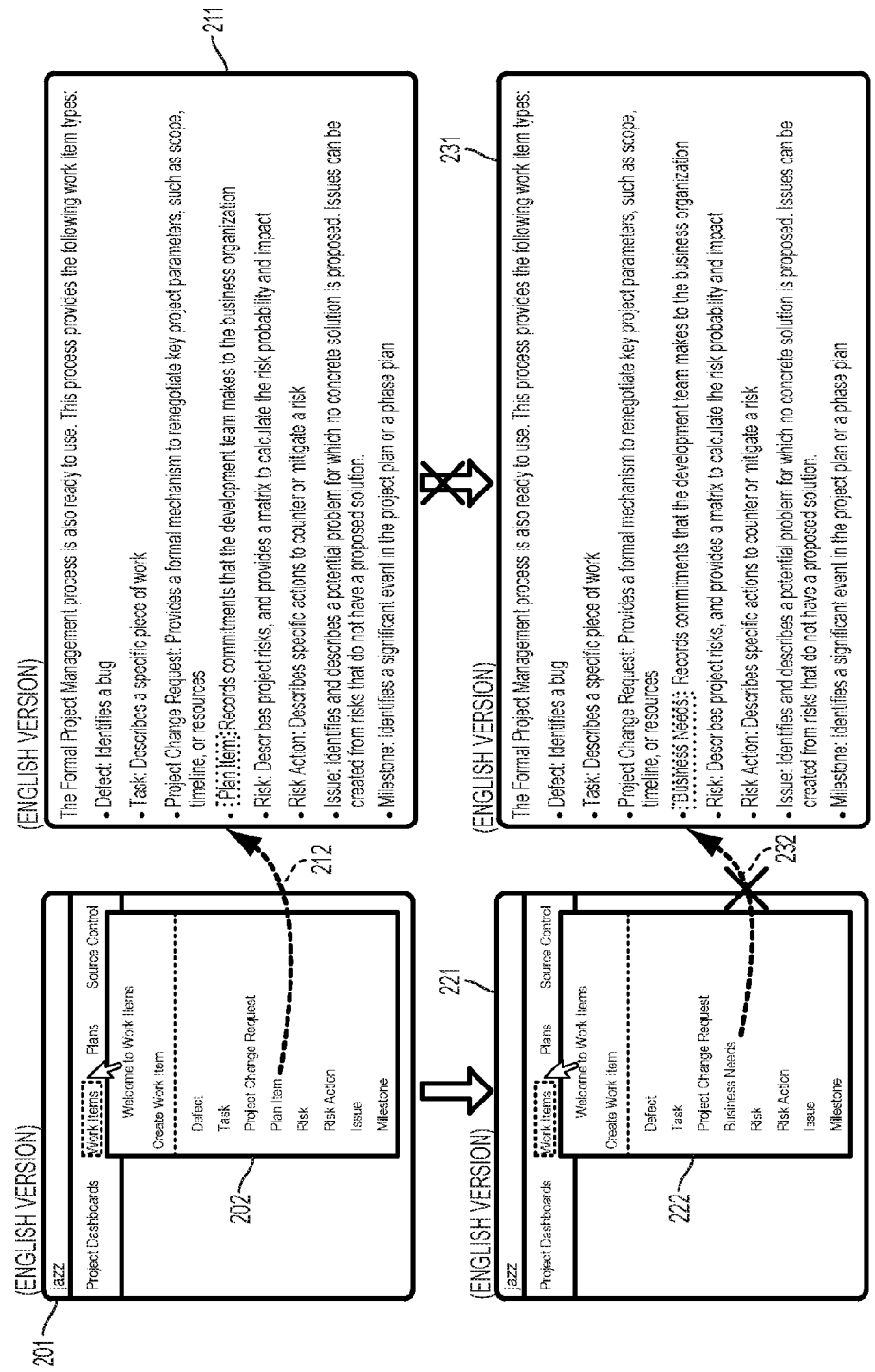
FIG. 2 shows an example of the prior art where a manual is shipped without terminology in the manual reflecting the changes in the program product, in the case that the terminology of the menu bar is changed during a product development stage of the program product.
Figure 3:
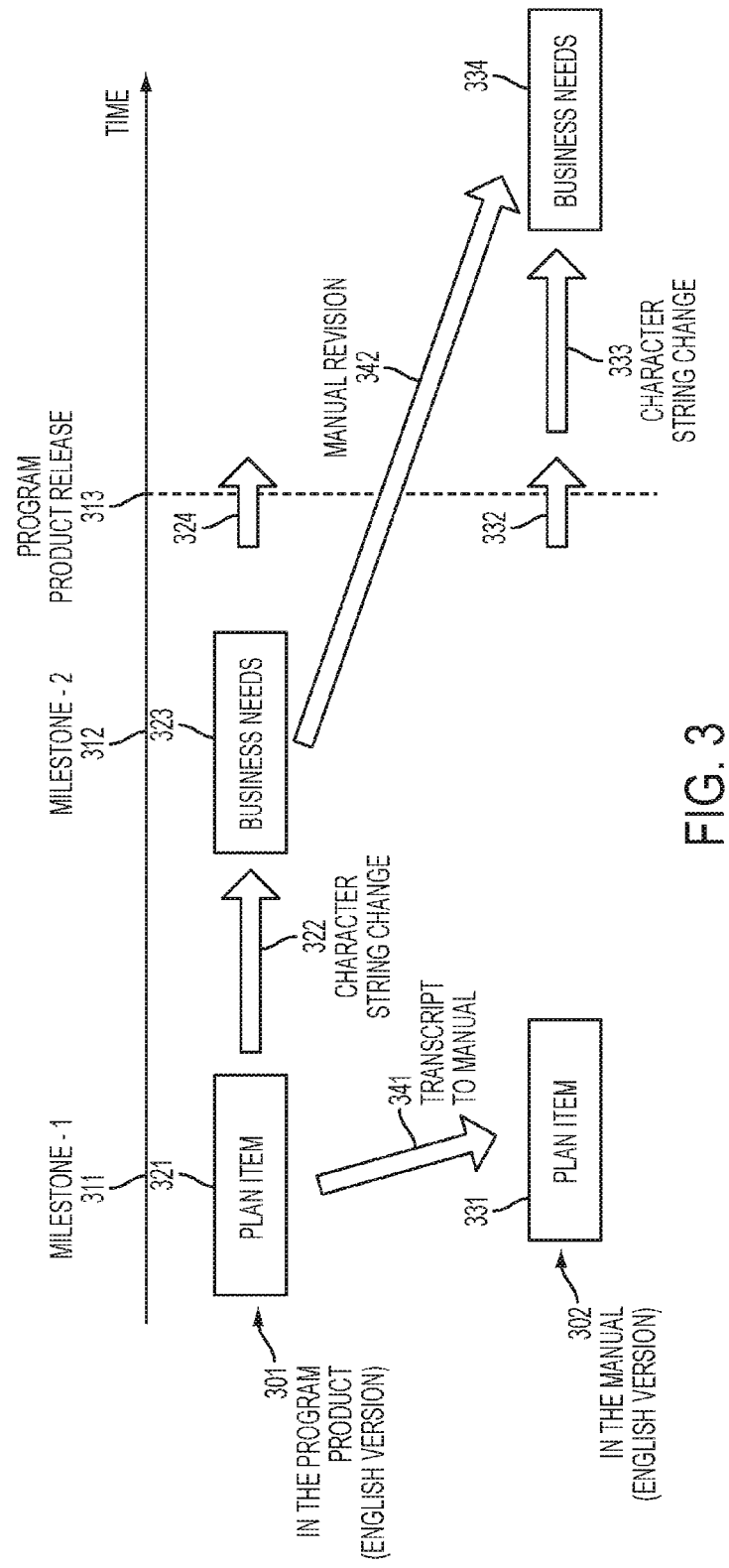
FIG. 3 is a diagram for describing an example of the prior art shown in FIG. 2 in chronological order.

FIG. 2 shows an example of prior art where a manual is shipped without reflecting changes in terminology in the manual of a program product, in the case that the terminology of the menu bar is changed in the middle of a product development stage of a program product. Furthermore, FIG. 3 is a diagram for describing an example of the prior art shown in FIG. 2 in chronological order. A screen (221)

shows a condition when the program product (English version) is shipped (in other words, when a release to manufacture is shipped) (324). A manual (211) shows a condition when the program product (English version) is shipped. The problem in this example is that a UI character string "Business Needs" (222) on the screen (221) of the program product (English version) does not correspond with a character string "Plan Item" (212) in the manual (English version) corresponding to the UI character string "Business Needs" (222).

A screen (201) shows a display screen in the middle of a product development stage (milestone-1) (311) before the program product (English version) is shipped. On the screen (201) in the middle of the aforementioned stage, the UI character string "Business Needs" (222) on the screen (221) of the release to manufacture of the program product (English version) is shown as "Plan Item" (202) (321). An author of an English version manual starts creation of the manual on the editor, based on the screen (201) in the middle of the aforementioned stage of the program product (English version). The manual (English version) (211) has been created based on (341) the screen (201) in the middle of the aforementioned stage (311) (331), and corresponds to the display on the display screen of the editor. The manual (English version) (211) describes a character string "Plan Item" (212), which is the same as a UI character string (202)" on the screen (201) in the middle of the aforementioned stage (311). It is deemed that a developer of the program product (English version) has changed (322) the UI character string "Plan Item" (202, 321) on the screen (201) in the middle of the aforementioned stage (311) from the UI character string "Plan Item" (202, 321) to a UI character string "Business Needs" (222, 323) according to the change (322). The screen (221) shows that the UI character string "Plan Item" (202) on the screen (201) in the middle of the aforementioned stage (311) has been changed (322) from the UI character string "Plan Items" (202, 321) to the UI character string "Business Needs" (222, 323) according to the aforementioned change (322). Furthermore, the program product (English version) where the character string has been changed to the UI character string "Business Needs" (222) is shipped (324).

It is deemed that the author of the English version of the manual is not able to make the change of the UI character string of the program product (English version) for some arbitrary reason. The reason, for example, may be such that the author of the English version of the manual did not know about the change of the UI character string, or the author of the English version of the manual was notified of the change of the UI character string, but made a mistake in a portion/section to be corrected for the change. Therefore, the English version of the manual remains the same as the manual (211) created based on the screen (201) in the middle of the aforementioned stage (311). In other words, the manual (English version) of the release to manufacture is a manual where the changed UI character string "Business Needs" (222) on the screen (221) of the release to manufacture of the program product (English version) has not been reflected. Furthermore, the English version of the manual (211) is shipped (332).

As described above, consistency is not ensured between the UI character string "Business Needs" (222) on the screen (221) of the release to manufacture of the program product (English version) and the character string "Plan Item" (212) in the manual (211) of the release to manufacture. Normally, the release to manufacture of the manual (English) must have the character string "Business Needs" (see 232), which is the same as the UI character string "Business Needs" (222) on the screen (221) of the release to manufacture of the program product (English version) (see the manual (English version) (231)). Therefore, after a release (324) of the release to manufacture of the program product (English version), the author of the English version of the manual changes (333) the character string "Plan Item" (212) in the manual (English version) to the character string "Business Needs" (232) based on (342) the UI character string "Business Needs" (222) in the release to manufacture (221) of the program product (English version), and then publishes (334) the modified version (231, 334) of the manual (English version).

FIG. 4A to FIG. 4B show an example of prior art where a Japanese version of the manual is shipped without reflecting changes in terminology in the Japanese version of the manual for a Japanese version of the program product corresponding to an English version of the program product, in the case of changing the terminology of the menu bar in the middle of the product development stage of the English version of the program product, respectively. Furthermore, FIG. 5 is a diagram for describing an example of the prior art shown in FIG. 4A to FIG. 4C in chronological order.

A screen (461, FIG. 4C) shows versions when the program product (Japanese version) is shipped (in other words, when the Japanese version of release to manufacture is shipped) (552). The manual (451, FIG. 4C) shows a version when the manual (Japanese version) related to the program product (Japanese version) is shipped. The problem in this example is that the UI character string "Business Needs" (Japanese) (462) on the screen (461) of the program product (Japanese version) does not correspond to terminology "Plan Item" (Japanese) (452) in the manual (Japanese version) corresponding to the UI character string "Business Needs" (Japanese) (462).

A screen (401, FIG. 4A) shows a display screen in the middle of the product development stage (milestone-1) (511) before the program product (English version) is shipped. On the screen (401) in the middle of the aforementioned stage (511), the UI character string "Business Needs" (English) (422) on the screen (421) of the release to manufacture of the program product (English version) is shown as "Plan Item" (English) (402) (521).

The author of the English version of the manual starts (531) creation of the manual (English version) on the editor based on the screen (401) in the middle of the aforementioned stage (511). The manual (English version) (411) is created based on the screen (401) in the middle of the aforementioned stage (511) (531), and also corresponds to the display on the display screen of the editor. The manual (English version) (411) describes a character string "Plan Item" (English) (412), which is to the same as the UI character string "Plan Item" (English) (402) on the screen (401) in the middle of the aforementioned stage of the program product (English version). It is deemed that a developer of the program product (English version) has changed (522) the UI character string "Plan Item" (English) (402, 521) on the screen (401) in the middle of the aforementioned stage (511) to UI character string "Business Needs" (English) (422, 523).

The screen (421) shows a situation where the UI character string "Plan Item" (English) (402, 521) on the screen (401) in the middle of the aforementioned stage (511) has been changed (522) to the UI character strings "Business Needs" (English) (422, 523) based on the aforementioned change (522). Furthermore, the program product (English version)

that has been changed to the UI character string "Business Needs" (English) (422) is shipped (524).

It is deemed that the author of the English version of the manual has known that there is a change in the terminology after the change (522) of the program product (English version) and before the release to manufacture of the program product (English version) is shipped (524). Then, the author of the English version of the manual is able to change the character string "Plan Item" (English) (412, 531) in the manual (English version) (411) to the character string "Business Needs" (English) (423, 533) with reference to the release to manufacture (421, 523) of the program product (English version). The manual (English version) (431) indicates that the character string "Plan Item" (English) (402, 531) in the manual (411) has been changed (532) to the character string "Business Needs" (English) (422, 533) according to the aforementioned change (522). Therefore, the manual (English version) (431) that has been changed from the character string "Plan Item" (English) (412) to the character string "Business needs" (English) (432) is shipped (534) as the release to manufacture of the manual (English version).

It is deemed that a developer of the Japanese version of the program product ports to the Japanese version based on the display screen (401) in the middle of the production development stage (milestone-1 (511) before shipping the program product (English version). The developer of the Japanese version of the program product translates (571) the UI character string "Plan Item" (English) (402) on the screen (401) to the UI character string "Plan Item" (Japanese).

A screen (441, FIG. 4B) is a screen in the middle of a stage of the program product (Japanese version), and includes the UI character string "Plan Item" (Japanese) (442). Because the program product (Japanese) is still in the middle of development, the author of the Japanese version of the manual starts (551) creation of the Japanese manual on the editor based on the screen (401) in the middle of the aforementioned stage (511) of the program product (English version). It is deemed that the developer of the Japanese version of the program product has known that the character string has been changed from the UI character string "Plan Item" (English) (402) shown on the screen (401) to the UI character string "Business Needs" (English) (422) displayed on the aforementioned screen, immediately before shipping (milestone-2) (512) the program product (English version). Then, the developer of the Japanese program product has changed (542) the UI character string "Plan Items" (Japanese) (442, 541) on the screen (441) of the program product (Japanese version) to the UI character string "Business Needs" (Japanese) (462, 543), which is a translation of the "Business Needs" (English) (422, 523), with reference to the screen (421, 523) before shipping (milestone-2) (512) the program product (English version).

A screen (461) indicates that the UI character string "Plan Items" (Japanese) (442, 541) on the screen (441) of the program product (Japanese version) has been changed from the UI character string "Plan items" (Japanese) (442, 541) to the UI character string "Business Needs" (Japanese) (462, 543), according to the aforementioned change (542). Furthermore, the program product (Japanese version) that has been changed to the UI character string "Business Needs" (Japanese) (462) is shipped (544).

It is deemed that the author of the Japanese version of the manual did not know about the change of the UI character string of the program product (English version). Therefore, the Japanese version of the manual remains the same as the manual (451) that has created based on the screen (201) in the middle of the aforementioned stage (511) of the program product (English version). Therefore, the aforementioned change (522) on the screen (401) of the release to manufacture of the program product (English version) remains unreflected (451) in the release to manufacture of the manual (Japanese version). In other words, the character string "Plan Item" (in Japanese) in the manual (451) has not been changed to "Business Needs" (in Japanese). Furthermore, the Japanese manual (451) is shipped (552).

As described above, consistency has not been ensured in the UI character string (English) and the corresponding Japanese translation, between the UI character string "Business Needs" (422) on the screen (421) of the release to manufacture of the program product (English version) and the release to manufacture of the manual (Japanese version) of the corresponding program product (Japanese version).

Normally, the release to manufacture of the manual (Japanese version) (451) for the corresponding program product (Japanese version) must have a translation "Business Needs" (Japanese) (see 472) corresponding to the UI character string "Business Needs" (English) (422) on the screen (421) of the release to manufacture of the program product (English version) (see the manual (Japanese version) (471)). Therefore, after the release (524) of the release to manufacture of the program product (Japanese version), the author of the Japanese version of the manual changes (553) the character string "Plan Item" (Japanese) (452) in the manual (Japanese version) to the character string "Business Needs" (Japanese) (472), based on the UI character string "Business Needs" (English) (422) in the release to manufacture (421) of the program product (English version), and then publishes (554) the modified version (471, 554) of the manual (Japanese version). Alternatively, after the release (544) of the release to manufacture of the program product (Japanese version), the author of the Japanese version of the manual changes (553) the character string "Plan Item" (Japanese) (452) in the manual (Japanese version) (451) to the character string "Business Needs" (Japanese) (472), based on the UI character string "Business Needs" (Japanese) (462) in the release to manufacture (461) of the program product (Japanese version), and then publishes (554) the modified version (471, 54) of the manual (Japanese version).

FIG. 6 shows an example of prior art where a manual is shipped with different terminology between the translation of a menu bar on a Japanese version of the program product corresponding to an English version of the program product and the translation corresponding to the menu bar in the manual of the Japanese version of the program product, about the terminology in the English version of the program product. A screen (621) indicates a version when the program product (Japanese version) is shipped (in other words, when the Japanese release to manufacture is shipped). The manual (631) indicates a version when the program product (Japanese version) is shipped. The problem in this example is such that a UI character string "Kadai" (a Japanese translation of "issue") (622) on the screen (621) of the program product (Japanese version) does not correspond to a character string "Mondai" (another Japanese translation of "issue") (632) in the manual (Japanese version) (631) corresponding to the UI character string "Kadai" (622).

A screen (601) is a display screen of the program product (English version), and the screen (601) has a UI character string "Issue" (English) (602). The author of the English version of the manual starts creation of the manual (English version) on the editor, based on the screen (601) of the program product (English version). The manual (English version) (611) is created based on the screen (601) of the program product (English version), and shall correspond to the display on the display screen of the editor. The manual (English version) (611) describes a character string (612), which is same as the UI character string "Issue" (English) (602) on the screen (601) of the program product (English version). It is deemed that the developer of the Japanese version of the program product has ported to the Japanese version based on the screen (601) of the program product (English version). The developer of the Japanese version of the program has translated (571) the UI character string "Issue" (English) (602) on the screen (601) to a UI character string "Kadai" (a Japanese translation of "issue"). Furthermore, the program product (Japanese version) where the UI character string "Issue" (602) is translated to UI character string "Kadai" (a Japanese translation of "issue") is shipped.

The screen (621) is created based on the screen (601) of the program product (English version), and has the translated character string "Kadai" (a Japanese translation of "issue") (622) corresponding to the UI character string "Issue" (English) (602) on the screen (601) of the program product (English version). The author of the Japanese version of the manual is a different person from the developer of the Japanese version of the program product. The author of the Japanese version of the manual starts creation of the manual (Japanese version) on the editor, based on the screen (601) of the program product (English version), or the manual (English version) (611). It is deemed that the author of the Japanese version of the manual has translated the UI character string "Issue" (English) (602) on the screen (601) of the program product (English version) or the character string "Issue" (English) (612) in the manual (English) (611) to the character string "Mondai" (another Japanese translation of "issue") (632). Furthermore, the manual (Japanese version) (631) where the UI character string "Issue" (English) (602) or the character string "Issue" (English) (612) has been translated to the character string "Mondai" (another Japanese translation of "issue") is shipped.

As described above, consistency has not been ensured in the translation of the UI character string "Issue" (English) (602), between the UI character string "Kadai" (a Japanese translation of "issue") (622) of the program product (Japanese version) (621) and the character string "Mondai" (another Japanese translation of "issue") (632) in the manual (Japanese version) (631) of the program product (Japanese version) (621). Normally, as described above, consistency has to be ensured in the translation of the UI character string "Issue" (English) (602), between the UI character string "Kadai" (a Japanese translation of "issue") (622) of the program product (Japanese version) and the character string "Mondai" (another Japanese translation of "issue") (632) in the manual (Japanese version) (631) of the program product (Japanese version). However, it is difficult for both the developer of the Japanese version of the program product and the author of the Japanese version of the manual to discover any discrepancy after the translation.

When the developer of the Japanese version of the program product and the author of the Japanese version of the manual are different people, the aforementioned example shown in FIG. 6 shows a case where the translation of the UI character strings becomes different between the program product and the manual. In addition, if the author of the English version of the manual mistakenly posted the UI character string "Issue" of the English version of the program product as "Issues" in the English version of the manual for example, the developer of the Japanese version of the program product might translate the aforementioned UI character string "Issue" as UI character string "Mondai" (a Japanese translation of "Issue") but the author of the Japanese version of the manual might translate the character string "Issues" in the aforementioned manual as "Mondai-gun" (a Japanese translation of "issues"), therefore the translation of the program product (in other words, "Mondai" (a Japanese translation of "issue")) and the translation in the manual (in other words, "Mondai-gun" (a Japanese translation of "issues")) might be different.

FIG. 7A to FIG. 7K and FIG. 8A to FIG. 8N show an example of maintaining consistency between a screen character string displayed on the display device by the program product or a translated character string translating the screen character string into another language, and, a character string displayed on the display device by an application for creating the manual, respectively. FIG. 7A to FIG. 7K show an example where a terminology change in the manual of the program product is automatically reflected and consistency is maintained between the terminology of the menu bar after the changes and the terminology in the manual, in the case that the terminology of the menu bar is changed in the middle of the product development stage of the program product, in accordance with an embodiment.

Figure 7A:
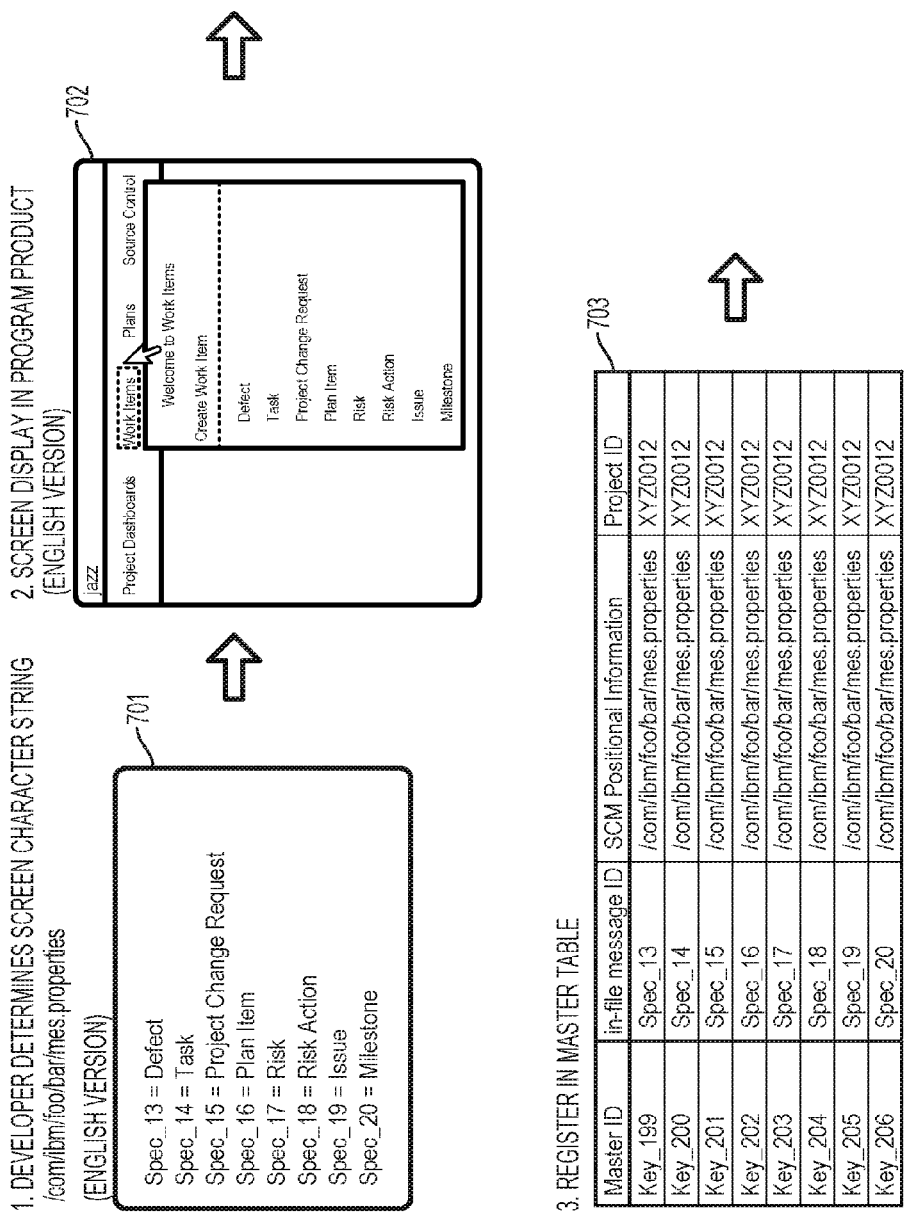

In block 1, shown in FIG. 7A, a developer of a program product determines a screen character string. The developer of the program product prepares a message file "/com/ibm/foo/bar/mes.properties" (701) relating to a program product. The message file "/com/ibm/foo/bar/mes.properties" is source code management (SCM) positional information, and indicates a location (path information in the memory device (108)) of the message file. The message file is used for defining screen character strings in the program product. The message file has at least one set of a screen character string (a message body) and an in-file message identifier that is uniquely related to the screen character string (hereinafter, referred to as "in-file message ID") (for example, Spec_number). The computer (101) does not store the message file (701) in the form of a file including the screen character string and the in-file message ID, but can store the screen character string and the in-file message ID in the form of a database.

The developer of the program product uses, for example, a program development application, and enters a screen character string into the message file. At this time, the in-file message ID is provided to each screen character string so as to be uniquely determined within a content of the message file. The computer (101) can be designed to automatically grant the in-file message identifier according to a user's entry of the screen character string. The message file (701) indicates that eight in-file message identifiers (Spec_13 through Spec_20) and character strings {Defect, Task, Project Change Request, Plan Items, Risk, Risk Action, Issue and Milestone} that are related to each of the eight identifiers are defined as one example. The computer (101) stores the message file (701) in the memory device (108).

In block 2, shown in FIG. 7A, the computer (101) displays screen character strings on a screen of a program product. The computer (101) displays the screen (702) according to the incorporation of the message file (701) into the program product (English version). The screen (702) has each character string in the aforementioned message file (701) as a character string in "Create Work Item" which is situated under an entry "Work Items" in the menu bar.

In block 3, shown in FIG. 7A, the computer (101) prepares a master table, and enters data in the master table. The computer (101) prepares a master table (703) in the memory device (108) or on the memory (103) in order to reflect the contents of the message file (701) in the master table (703). The master table (703) includes at least one set including a combination of the master table identifier (hereinafter, referred to as "master ID"), an in-file message ID, SCM positional information and a project identifier (hereinafter, referred to as "project ID", as well). The set in the master table (703) can include at least a combination of the master ID and the in-file message ID. The SCM positional information and the project ID in the master table (703) may be omitted in the following cases: there is one message file and there is one project; or each message body is not a file but is stored in the database. The master ID is an identifier uniquely related to the in-file message identifier (in-file message ID) in the message file (701). In other words, one master ID is allocated to one in-file message ID. The in-file message ID corresponds to the in-file message identifier (in-file message ID) in the message file (701). The in-file message ID is line specific information in the message file (701). The SCM positional information indicates a location (path information in the memory device (108)) of the message file (701). The project ID is an internal code for uniquely identifying a combination of a program product that is created by using the message file (701) and its version.

The computer (101) reads an in-file message ID in the message file (701) and copies the in-file message ID in the master table (703). Furthermore, the computer (101) automatically determines a master identifier that is uniquely related to the in-file message ID, and enters it in the master table (703). In addition, the computer (101) enters the SCM positional information of the message file (701) where the in-file message ID is stored, and the project ID into the master table (703).

In block 4, shown in FIG. 7B, the computer (101) prepares a screen character string control table, and enters a part of data from a message file and a master table. The computer (101) prepares a screen character string control table (704) in the memory device (108) or the memory (103) in order to copy the master ID of the master table (703) in the screen character string control table (704). The screen character string control table (704) includes at least one set including a combination of a master ID, a language identifier (hereinafter, referred to as "language ID"), a character string, category information, appearance positional information related to the screen character string on the display screen of the program product (hereinafter, referred to as "first appearance positional information" or "appearance positional information in the program product), and appearance positional information related to the character string in the application (corresponding to the screen character string or the translated character string) (hereinafter, referred to as "second appearance positional information" or "appearance positional information in the application"). If there is one language used (for example, English) when creating the manual, the combination does not need to have language information. The master ID corresponds to the master ID in the master table (703). The language ID is an identifier for identifying a (natural) language in which a character string specified by the in-file message ID related to the master ID is written. The language ID is a language ID related to the screen character string if a screen character string or an identifier related to the screen character string is entered as a character string, and is related to a translated character string if the translated character string where the screen character string is translated into another language or the identifier related to the translated character string is entered as the character string. The language ID is, for example, language information (for example, English or Japanese), or an identifier that is uniquely related to the language information (for example, English="1", Japanese="2").

The character string can be a screen character string (aforementioned message body) or an identifier that is uniquely related to the screen character string, or can be the translated character string where the screen character string is translated into another language or the identifier that is uniquely related to the translated character string. The identifier that is uniquely related to the screen character string or the identifier that is uniquely related to the translated character string can be, for example, a numeric character, an alphabet character, a combination of both, or a character code that is uniquely related to the screen character string. The category information is category information related to the screen character string, and is, for example, use application of the screen character string. The use application is, for example, a menu, buttons, a label of input field, a column name in a table, a row name in a table, and a window title.

The first appearance positional information is appearance positional information that is related to the screen character string on the display screen of the program product. For example, the first appearance positional information is positional information of the display screen (specified by the XY coordinates), and can be positional information of two points on a diagonal of a rectangle (for example, top left and bottom right) including the screen character string.

The second appearance positional information is appearance positional information related to the character string in the application (corresponding to the screen character string or the translated character string). The second appearance positional information can be specified for example by program positional information (for example, line number) in the manual creation language of the application; or a combination of project ID of the message file (701), storage positional information of an electronic file of the manual and the filename, or indicator character string that is specified in an electronic file of the editor (for example, start tag <UICONTROL>) and an embedded trigger identifier (for example, id="number") incorporated in the display screen of the editor.

The computer (101) reads the master table (703), and copies the entire master ID in the master table (703), or a part of the master ID specified by a user onto the screen character string control table (704). Furthermore, the computer (101) extracts from the message file (701) the entire screen character string specified by in-file message IDs that are related to the copied master IDs, and then copies the character strings onto the screen character string control table (704). Alternatively, the computer (101) enters onto the screen character string control table (704) the identifier that is related to the screen character string specified by the in-file message IDs that are related to the copied master IDs, respectively. Furthermore, the computer (101) enters into the screen character string control table (704) the language ID that is related to the specified screen character string. Other items (category information, first appearance positional information and second appearance positional information) in the screen character string control table (704) are blank at this point in time.

In block 5, shown in FIG. 7B, the computer (101) creates a build where a master ID is added. The computer (101) performs a process of embedding the master ID stored in the master table (703) into the program product. In other words, the computer (101) creates a build where a master ID is added in the program product. By creating the build where the master ID has been added in the program product, the screen character string selected in the following Block 10 can be specified using the added master ID. A screen (705) indicates a build where master IDs ([Key_199] through [Key_206]) are added in the program product. The computer (101) can display the master IDs ([Key_199] through [Key_206]) adjacent to corresponding character strings such that the author of the manual can view the master IDs ([Key_199] through [Key_206]). Alternatively, the computer (101) adds a master ID in the program product, but can hide the added master ID from the author of the manual.

In block 6, shown in FIG. 7C, the author of the manual is editing the manual (English version) on the editor. It is deemed that the author of the manual starts creating the manual on the editor. The author of the manual tries to create a description for each item of the screen character string {Defect, Task, Project Change Request, Plan Item, Risk, Risk Action, Issue, Milestone}. The author of the manual creates the aforementioned manual in accordance with markup language for example. It is deemed that the author of the manual has completed creation of the description for each item of the screen character string {Defect, Task}, and completed entry of the description (provides a formal mechanism to renegotiate key project parameters, such as scope, timeline, or resources) for the item of the screen character string {Project Change Request}. The screen (706) is a screen on the editor in the middle of editing of a manual immediately after entry the description. Because the description up to the items of the screen character string {Defect, Task, Project Change Request} is completed, the author of the manual then is about to enter the description for the item of screen character string {Plan Item}.

In block 7, shown in FIG. 7C, the computer (101) updates the screen character string control table during the editing of Block 6. The computer (101) updates the screen character string control table according to the completion of description creation for the item of the screen character string {Project Change Request}. The screen character string control table (707) shows the condition after being updated based on the completion of creation. The screen character string control table (707) has category information, appearance positional information in the program product (first appearance positional information), and appearance positional information in the application (second appearance information) for each item of the screen character string {Defect, Task, Project Change Request}, respectively. The category information is a character string for each menu item {Defect, Task, Project Change Request}, and are "menus". The first appearance positional information is positional information of two points on a diagonal of a rectangle including the screen character string on the display screen of the program product. The second appearance positional information includes project ID, storage positional information of an electronic file of the manual and the filename, and ID character string that is specified in an electronic file of the editor (for example, start tag <UICONTROL>) and an embedded trigger identifier (for example, id="number") incorporated in the display screen of the editor.

In block 8, shown in FIG. 7C, the author of the manual enters a start tag <UICONTROL>, which is a tag for transitioning to a screen information acquisition mode on the editor. The author of the manual transitions the screen in the program product in advance such that the screen character string that is to be incorporated in the manual in the program product is displayed on the screen. In other words, the author of the manual activated the program product as shown on screen (705) in FIG. 7B for example, and operates the menu, dialogues, and windows so as to display the screen character string incorporated in the manual. In the screen (705) of FIG. 7B, the screen character string {Plan Item} to be incorporated next is displayed. The author of the manual enters the start tag <UICONTROL> on the editor in order to switch from the normal operating mode of the program product (mode demonstrating an original function of the program product) to a mode that enables incorporation of the screen character string from the program product (hereinafter, referred to "screen information acquisition mode"). The screen (708) in the editor shows that the start tag <UICONTROL> has been entered on the bottom row.

The computer (101) automatically inserts in the start tag <UICONTROL> a trigger identifier "ID="number" for identifying the trigger within the same manual (for example, display in <UICONTROL id="number"), based input of the start tag <UICONTROL> in the editor. Furthermore, the computer (101) is connected such that the editor can access the screen character string control table (707), based on input of the start tag <UICONTROL> in the editor.

In block 9, shown in FIG. 7D, The computer (101) transits the program product to a screen information acquisition mode from a normal operating mode. The computer (101) transits the program product from a normal operating mode (702) to a screen information acquisition mode (709), based on the entry of the start tag <UICONTROL> on the editor. Note that as a trigger transitioning the program product to the screen information acquisition mode from the normal operating mode, the follow operations can be used as triggers and not merely the start tag <UICONTROL> entry. An indicator character string is entered on the editor: for example, an indicator character string including a pair of a start tag and an end tag are entered (for example, a pair of <UICONTROL></UICONTROL>; and for example, a character string, which is an indicator character string where a start tag and an end tag are not a pair (for example, UI tag), and that is set so as to be recognizable by the editor is entered (for example, entry of the end character "w" of indicator character string "sw" is set as a trigger). A character string indicating a start of an indicator character string is entered: for example, a start tag and an end tag are a pair for the indicator character string (for example, UI tag), and the start tag is entered (for example, inputting the end character ">" of the start tag <UICONTROL> is set as a trigger). A specific keyboard operation is performed: for example, CTRL+ALT are simultaneously pressed. A specific operation of a pointing device is performed: for example, a double left click is performed in the editor. Specific speech is conduced: For example, the author of the manual speaks "transition movement" into a microphone. A specific gesture is performed: for example, a person moves the right hand from left to right, top to bottom while facing a camera that is provided on the computer (101).

A screen (709) indicates that the program product is transited to the screen information acquisition mode. On the screen (709), the master IDs ([Key_199] through [Key_206]) are arbitrarily displayed items. Furthermore, on the screen (709), the section indicated with a dotted line is a character string that can be incorporated as a screen character string. Note that the dotted line is included for descriptive purposes.

In block 10, shown in FIG. 7D, the author of the manual performs a clicking operation for selecting the screen character string for incorporation. The author of the manual performs an incorporation action for incorporating the screen character string {Plant Item}, which is the subject for incorporation, onto the editor. The incorporation action is to select and click the screen character string {Plan Item} using a pointing device for example. In the screen (710), the section indicated with the dotted line indicates that the screen character string {Plan Item} has been selected.

Figure 7E:
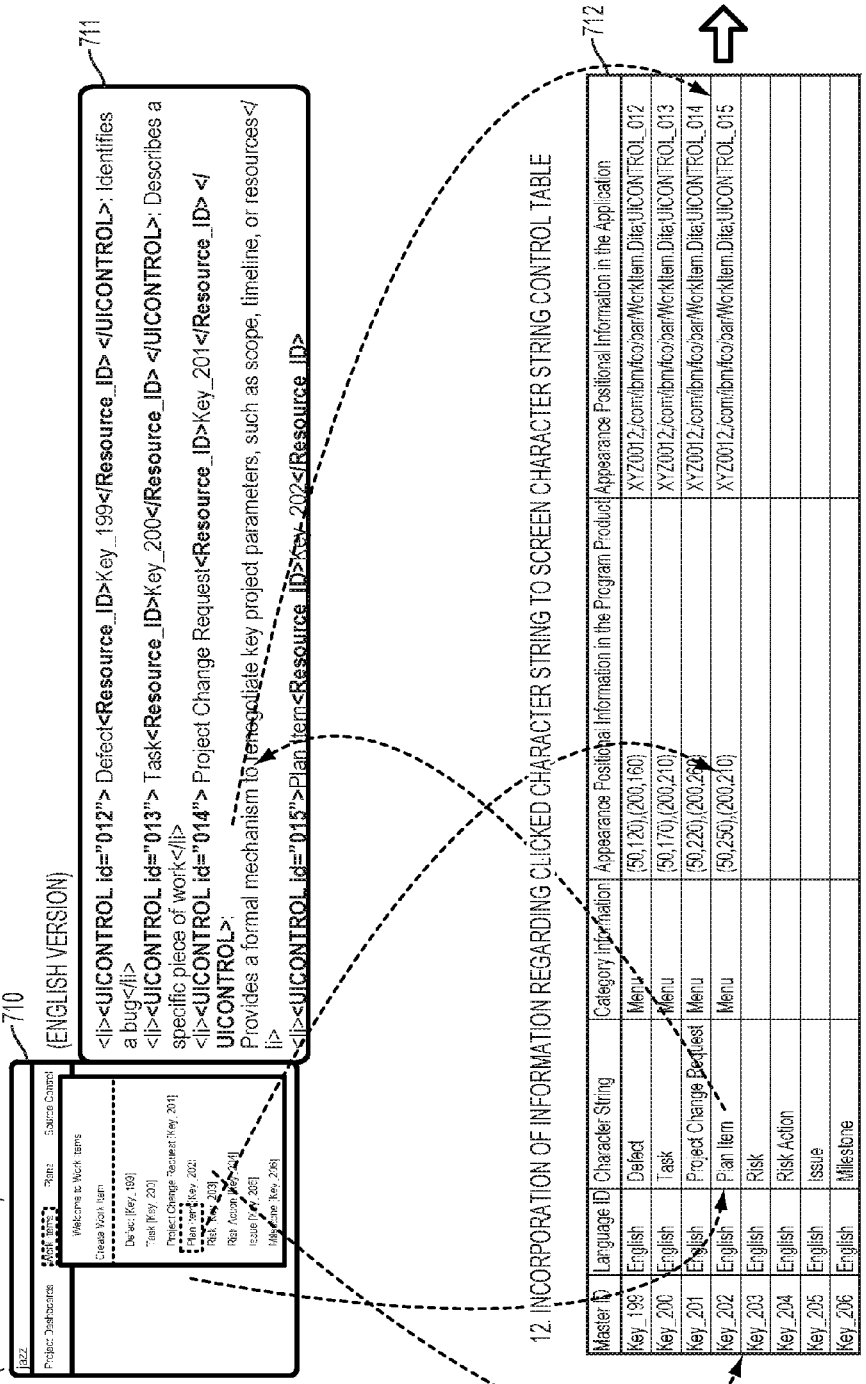
Figure 71:
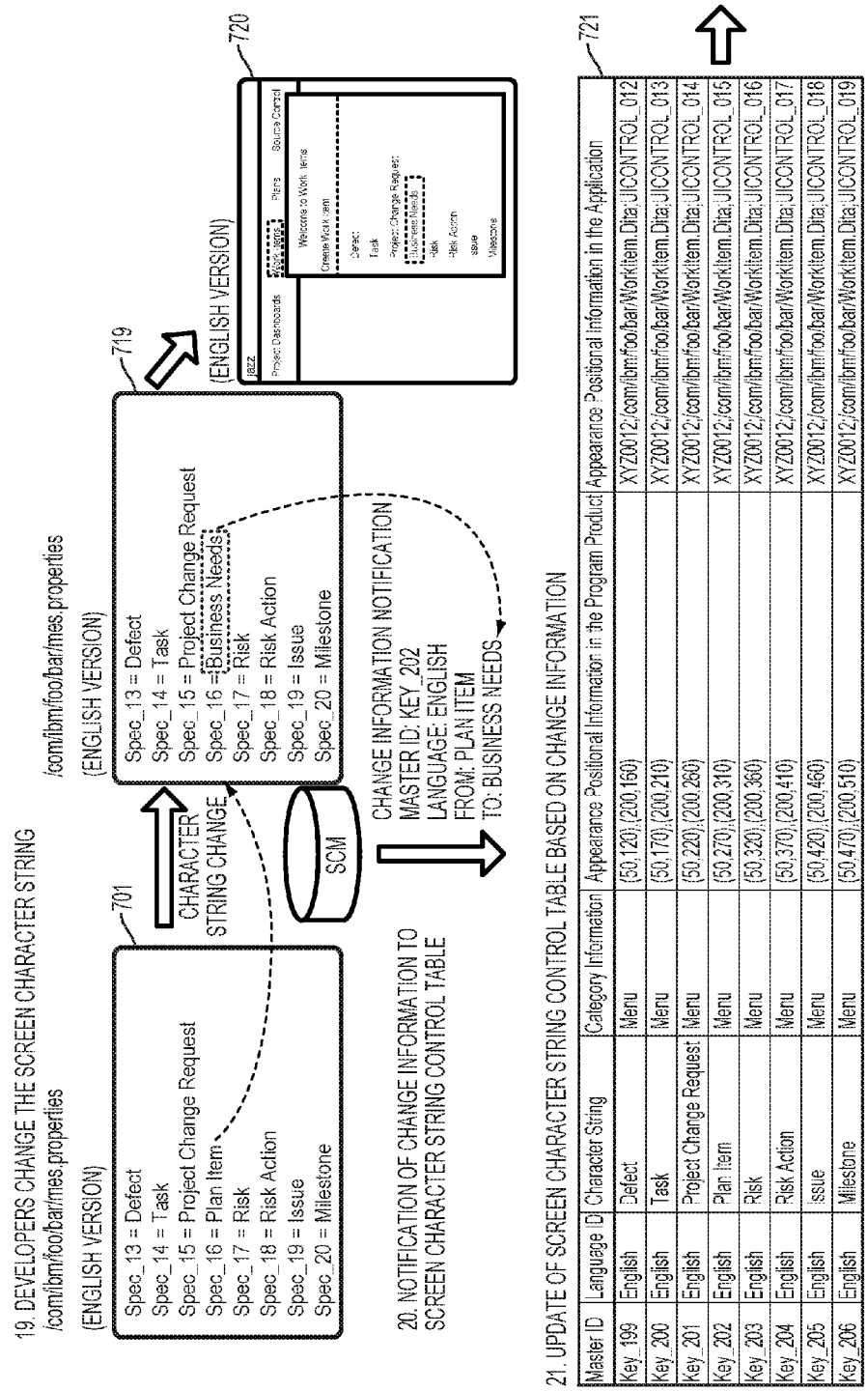

In block 11, shown in FIG. 7E, the computer (101) enters the selected screen character string on the editor based on the selection of the screen character string. The computer (101) incorporates the character string (in other words, the screen character string {Plan Item}) on the row having master ID (Key_202) that is related to the selected screen character string {Plan Item}, while referring to the screen character string control table (707), based on selection of the screen character string {Plan Item}. Furthermore, the computer (101) enters the incorporated screen character string {Plan Item} adjacent to the start tag <UICONTROL id="015"> so as to be visible on the screen (711) on the editor "<UICONTROL ID="015"> Planitem". Furthermore, the computer (101) incorporates the master ID (Key_202) that is related to the selected screen character string {Plan Item} adjacent to the character string {Plan Item} that has been entered for example, and then enters the incorporated master ID (Key_202) "<UICONTROL ID="015"> Plan Item <Resource_ID> Key_202 </Resource_ID>". The computer (101) transitions the cursor on the editor immediately after the end tag </Resource_ID>, based on the entry of the master ID (Key_202) on the editor.

In block 12, shown in FIG. 7E, the computer (101) updates the screen character string control table. The computer (101) updates the screen character string control table (707, FIG. 7C) based on selection of the screen character string {Plan Item}. In the row including the combination of the character string conforming to the selected screen character string {Plan Item}, the master ID and the language ID in the screen character string control table (707), the computer (101) enters the data into each item of the category information, the appearance positional information in the program product, and the appearance positional information on the application as described below. The computer (101) automatically acquires the category information data from the program product. Alternatively, the computer (101) displays on a display device a window that prompts a user to enter the category information data, and then enters the data entered into that window in the item of the category information. Furthermore, the computer (101) determines a region of a rectangle for example that encompasses the selected screen character string in the program product, and acquires the appearance positional information in the program product from a device that associates the 2 points of screen positional information on the diagonal of the selected region with the screen display. Furthermore, the computer (101) specifies the appearance positional information in the application based on a project ID (XYZ0012) related to the master ID in the master table (703), storage positional information of an electronic file of the manual and the filename (/com/ibm/foo/bar/WorkItem.Dita), an ID character string specified in an electronic file of the editor (start tag <UICONTROL>), and a trigger identifier (_015) embedded in the display screen of the editor. The screen character string control table (712) shows a screen character string control table after the data is entered in each item of the aforementioned category information, the appearance positional information on the program product, and appearance positional information on the application, and the screen character string control table (707) is updated.

In block 13, shown in FIG. 7F, the author of the manual enters an end tag </UICONTROL>, which is a tag for deactivating the screen information acquisition mode and transitioning to normal operating mode, on the editor. The author of the manual enters an end tag </UICONTROL> on the editor in order to deactivate the screen information acquisition mode and switch to normal operating mode in the editor. The dotted line section in screen (713) on the editor shows that the end tag is entered. Note that the dotted line part is added in order to facilitate the description. Furthermore, the computer (101) temporarily deactivates the connection such that the editor cannot access the screen character string control table (707), according to the entry of the end tag </UICONTROL> on the editor.

In block 14, shown in FIG. 7F, the computer (101) transitions the program product to a normal operating mode from a screen information acquisition mode. The computer (101) transitions the program product from a screen information acquisition mode (702) to a normal operating mode (709), according to the entry of the end tag </UICONTROL> on the editor. Note that as a trigger transitioning the program product to the normal operating mode from the screen information acquisition mode, not merely the end tag </UICONTROL> entry, but the following operations can be used as triggers: an indicator character string is entered on the editor: For example, a character string, which is an indicator character string (for example, UI tag) where a start tag and an end tag are not a pair for the indicator character string, and the character string that is set such that the editor can be confirmed is input (for example, inputting the end character "w" of the indicator character string "ew" is set as the trigger); a character string displaying the end of the indicator character string is entered on the editor: For example, the start tag and the end tag are a pair for the indicator character string (for example, UI tag), and the end tag is entered (for example, the entry of the end character ">" of the end tag </UICONTROL> is set as the trigger); a specific keyboard operation is performed: For example, CTRL+ALT are simultaneously pressed; a specific point device operation is performed: For example, a double left click is performed on the editor; a specific speech is spoken: For example, the author of the manual speaks "transition movement" into a microphone; and a specific gesture is performed: For example, a person moves the right hand from left to right, top to bottom while facing a camera that is provided on the computer (101).

In block 15, shown in FIG. 7G, the author of the manual describes the incorporated character string {Plan Item} on the editor. The author of the manual describes the incorporated character string {Plant Items} adjacent to the aforementioned end tag </UICONTROL> on the editor. A screen (715) indicates that the description "Records commitments that the development team makes to the business organization" has been entered.

In block 16, shown in FIG. 7G, the author of the manual starts from Block 8 and repeats the work to incorporate the remaining screen character strings in the editor. The computer (101) updates the screen character string control table. The author of the manual does not have to transition the program product from the screen (714) shown in FIG. 7F because a screen character string that is desired to be incorporated next in the manual is {Risk}. The same operations shown in Block 8 through Block 15 are performed for each item of the screen character strings {Risk, Risk Action, Issue, Milestone}. A screen character string control table (716) shows an updated one as a result of the same operations shown in Block 8 through Block 15 for each item of the screen character strings {Risk, Risk Action, Issue, Milestone}.

In block 17, shown in FIG. 7H, this is a screen display of the editor after the author of the manual has completed the description of the incorporated character string {Milestone} in the editor. The author of the manual saves an edited manual file in the memory device (108) after completing the description of the incorporated character string {Milestone}.

In block 18, shown in FIG. 7H, this is an example that shows that the edited manual file is read into the memory (103) and displayed on the screen; or an example where the edited manual file is printed on a paper form. A screen (718) is a screen example where the edited manual file is read onto the memory (103) and displayed on the screen. Furthermore, a printed material (718) is created by calling up the edited manual file, and then printing using a printer.

In block 19, shown in FIG. 7I, the developer of the program product changes a screen character string before release of the program product. It is deemed that the developer of the program product calls the message file (701) from "/com/ibm/foo/bar/mes.properties", and changes (719) a screen character string {Plan Item} in the message file (701) to {Business Needs}. The computer (101) displays a screen (720) according to the incorporation of the message file after the change (719) into the program product (English version). The dotted line portion in screen (720) indicates that the screen character string {Plan Item} on the screen (702) has been changed to {Business Needs}. Note that the dotted line portion is added in order to facilitate the description.

In block 20, shown in FIG. 7I, the computer (101) notifies the screen character string control table (716, FIG. 7G) of the change information of the screen character string in Block 19. The computer (101) checks the information related to the change into the SCM, based on the screen character string {Plant Item} being changed to {Business Needs} in the message file (701). The computer (101) notifies the screen character string control table (716, FIG. 7G) of the change information, based on the information related to the change being checked into the SCM. The change information includes a master ID, language information (for example, language ID), a screen character string {Plan Item} before change, and the screen character string {Business Needs} after change.

In block 21, shown in FIG. 7I, the computer (101) updates the screen character string control table (716, FIG. 7G), based on the change information that was provided in Block 20. The computer (101) replaces the screen character string {Plan Item} of the matching line with {Business Needs}, based on the master ID (Key_202), language ID (English) and the screen character string {Plan Item} in the change information before modification matching a line that includes the set of the master ID (Key_202), the language ID (English) and the screen character string {Plan Item} in the screen character string control table (716). In other words, the change of the screen character string in the message file (701) is reflected in the screen character string control table (716). Therefore, the character string in the screen character string control table (716) is synchronized with the screen character string after modification. There is no change in the other items (a master ID, language ID, category information, appearance positional information in the program product, and appearance positional information in the application) in the screen character string control table (716). The dotted line portion in the screen character string control table (721) indicates that the screen character string {Plan Item} has been replaced with {Business Needs}. Note that the dotted line part is added in order to facilitate the description. Note that even if the screen character string {Plan Item} in the message file (701) is changed to {Business Needs}, the master table (703) is not changed.

In block 22, shown in FIG. 7J, The computer (101) references the screen character string control table (721) and updates a character string on the editor that corresponds to the character string that has been changed in the screen character string control table (721), according to the electronic data (for example, electronic file) of the manual in the editor being loaded. The computer (101) loads electronic data of the manual into the editor, according to the update of the screen character string control table (716) or a read request for the electronic data of the manual. Furthermore, the computer (101) references the screen character string control table (721), and ascertains a location of the corresponding character string before modification in the editor based on the appearance positional information in the application that is associated with the screen character string that has been changed in the screen character string control table (721), and replaces the character string at the ascertained location {Plan Item) to the character string after modification {Business Needs}. The dotted line portion on the screen (722) of the editor indicates that the character string {Plan Item} is automatically updated to the modified character string {Business Needs}. Note that the dotted line part is added in order to facilitate the description.

In block 23, shown in FIG. 7J, This is an example where the manual file where the screen character string has already been replaced is read to the memory (103) and is displayed on the screen, or an example where such manual file is printed on a paper form. The screen (723) is an example where the manual file where the screen character string has already been replaced is read to the memory (103) and is displayed on the screen. Furthermore, the printed material (723) is created by calling up the manual file where the screen character string has already been replaced, and then printing using a printer. The dotted line portion on the screen (723) or the printed material (723) indicates that the character string {Plan Item} is automatically updated to the modified character string {Business Needs}. Note that the dotted line part is added in order to facilitate the description.

In block 24, shown in FIG. 7K, the author of the manual selects the replaced character string in the manual file where the screen character string has already been replaced. The computer (101) displays the modified character string {Business Needs} on the screen (722) of the editor, in order to ease viewing by the author of the manual. The computer (101) can change the text color of the modified character string {Business Needs} to a text color that is different from the other character strings or can cause the modified character string to flash. It is deemed that the author of the manual wishes to confirm that the modified character string {Business Needs} corresponds to which screen character string on the screen of the program product. The author of the manual selects the modified character string {Business Needs} on the editor using a pointing device for example.

In block 25, shown in FIG. 7K, the computer (101) displays the screen character string corresponding to the selected character string {Business Needs} in the program product, in order to ease viewing by the author of the manual. The computer (101) determines whether or not a combination of the master ID associated with the modified character string {Business Needs}, a language ID and a modified character string {Business Needs} matches a combination of the master ID, language ID and the modified character string {Business Need} in the screen character string control table (721), according to the selection of the modified character string {Business Needs} on the editor.

The computer (101) reads the appearance positional information in the program product associated with the line including the aforementioned matching combination in the screen character string control table (721), according to the aforementioned matching. The computer (101) displays the screen character string associated with the read appearance positional information (matching the selected character string {Business Needs}), in order to ease viewing by the author of the manual. The computer (101) can change the text color of the screen character string {Business Needs} associated with the read appearance positional information to be a different text color from the other character strings, or can cause the screen character string to flash. The dotted line portion in the screen (725) indicates that the screen character string {Business Needs} is flashing. Note that the dotted line part is added in order to facilitate the description. It is possible for the author of the manual to easily confirm which screen character string has been modified in the program product through the operations of Block 24 and Block 25.

FIG. 8A to FIG. 8K and FIG. 8L to FIG. 8N showing partially-alternate examples show an example where terminology change in the Japanese manual of the Japanese version of the program product corresponding to the English version of the program product is automatically reflected in the case that the terminology of the menu bar is changed in the middle of the product development stage of the English version of the program product, and the consistency is maintained between the changed terminology of the menu bar of the English version of the program product and the translation (Japanese) of the Japanese manual, in accordance with an embodiment.

Figure 8A:
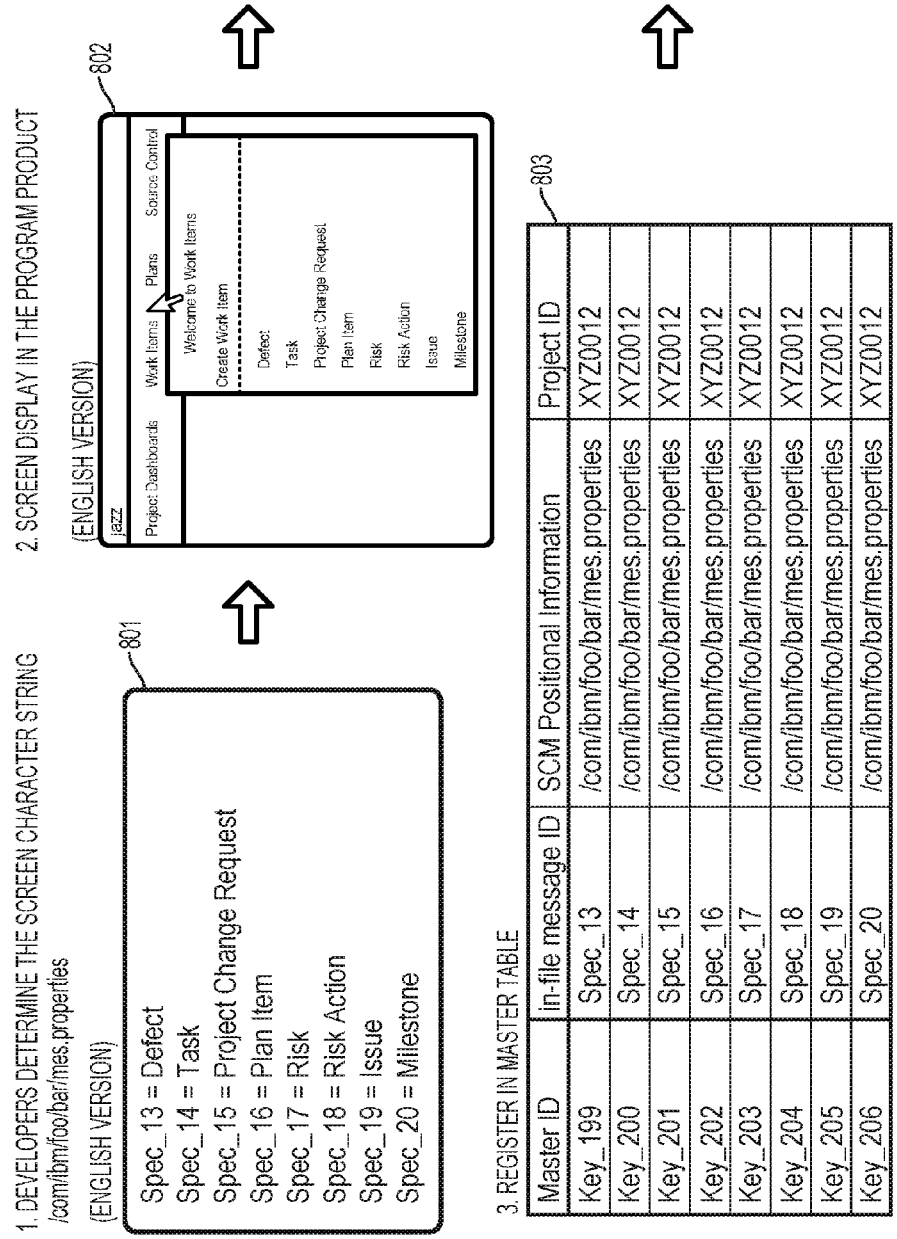
FIG. 8A-N show examples where terminology change in the Japanese version of the manual of the Japanese version of the program product corresponding to the English version of the program product is automatically reflected, and the consistency is maintained between the terminology of the menu bar after the change of the English version of the program product and the translation (Japanese) of the Japanese version of the manual, in the case that the terminology of the menu bar is change in the middle of a product development stage of the English version of the program product, in accordance with an embodiment.

In block 1, shown in FIG. 8A, the developer of the program product (English version) determines a screen character string. Block 1 is similar to Block 1 shown in FIG. 7A, and that description is cited here.

In block 2, shown in FIG. 8A, the computer (101) displays the screen character string (English) on the screen of the program product (English version). Block 2 is similar to Block 2 shown in FIG. 7A, and that description is cited here.

In block 3, shown in FIG. 8A, the computer (101) prepares a master table, and enters data in the master table. Block 3 is similar to Block 3 shown in FIG. 7A, and that description is cited here.

Figure 8B:
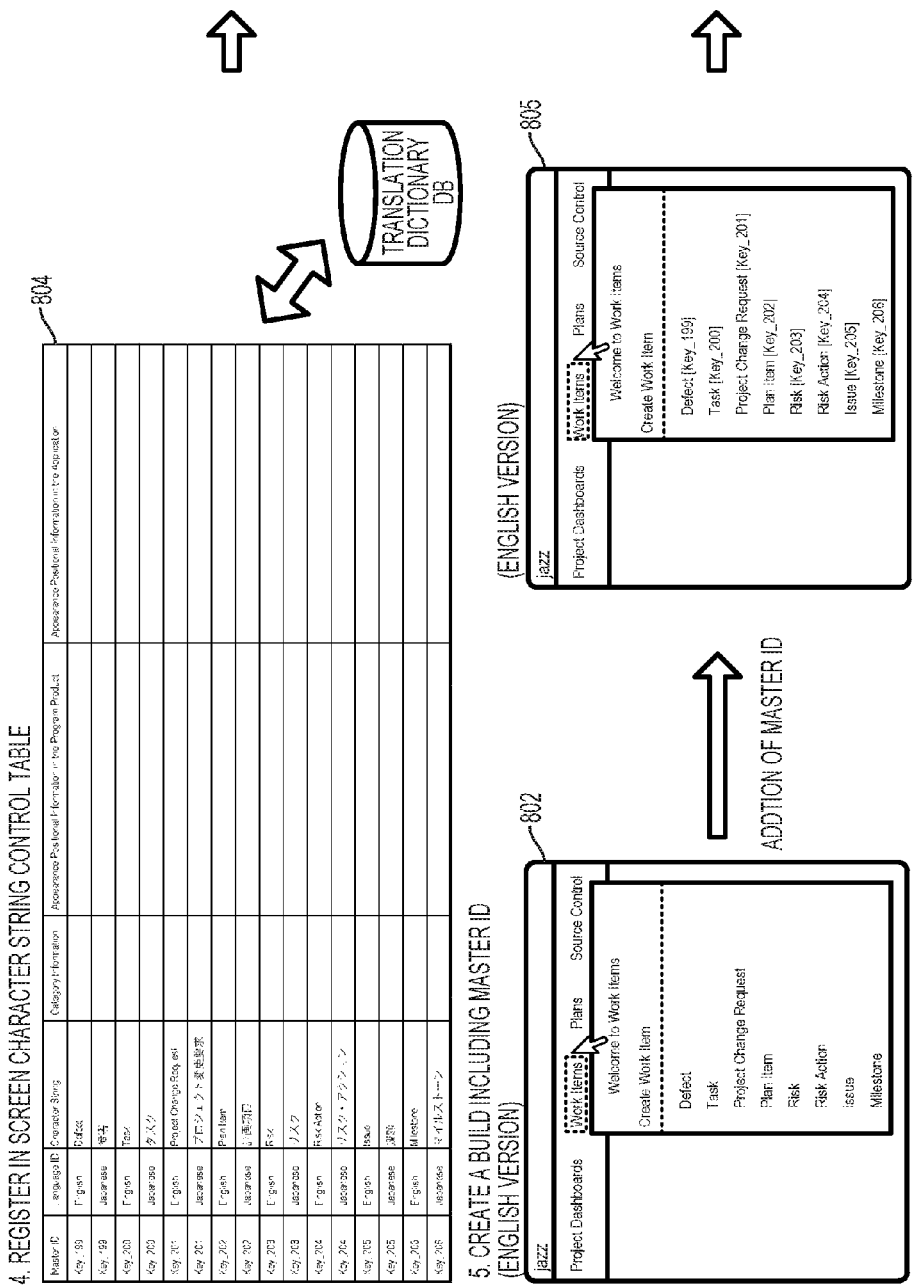

In block 4, shown in FIG. 8B, the computer (101) prepares the screen character string control table, and enters a part of data from the message file, the master table, and the translation dictionary. The computer (101) prepares the screen character string control table (804) in the memory device (108) or the memory (103) in order to copy the master ID of the master table (803) in the screen character string control table (804). The screen character string control table (804) contains at least one set including a combination of: a master ID; a language ID; a character string; category information; appearance positional information in the program product; and appearance positional information in the application, as similar to the screen character string control table (704).

The computer (101) reads the master table (803), and copies the all master IDs in the master table (803) or a part of the master IDs specified by a user onto the screen character string control table (804). Furthermore, the computer (101) extracts from the message file (801) the all screen character strings specified by in-file message IDs that are related to the copied master IDs, respectively, and then copies them onto the screen character string control table (804). Alternatively, the computer (101) enters into the screen character string control table (804) the identifiers that are related to the screen character string specified by the in-file message IDs that are related to the copied master IDs, respectively. Furthermore, the computer (101) enters into the screen character string control table (804) the language IDs that are related to the specified screen character strings, respectively. Other items in the screen character string control table (804) (category information, appearance positional information in the program product, and the appearance positional information in the application) are blank at this point in time.

Furthermore, the computer (101) prepares two rows in advance for the same master ID, in order to port the English version of the program product into the Japanese version. In other words, one row includes a set of a master ID, a language ID (English) and a screen character string (English) copied from the message file (801) or an identifier associated with the screen character string (English), as similar to the screen character string control table (704), and the other row includes the same master ID as the aforementioned set, language ID (Japanese), and a character string (Japanese) or an identifier associated with the character string (Japanese). With regards to the character string (Japanese), the computer (101) can automatically translate the screen character string (English) of the aforementioned set by referencing the translation dictionary database or the translation dictionary data. Alternatively, the computer (101) displays on a display device a window that prompts the user to input a Japanese translation corresponding to the screen character string (English), and then uses the data input to that window as the Japanese translation of the screen character string (English). Furthermore, alternatively, the computer (101) can specify the Japanese version of a message file by combining a master ID associated with the screen character string (English) of the master table (803), the in-file message ID and the SCM positional information, with the master ID a and language ID (Japanese) of the screen character string control table (804), and if a screen character screen that includes the in-file message ID in the message file (Japanese) exists, the screen character string (Japanese) can be the Japanese translation of the screen character string (English). The screen character string control table (804) has two lines of a set including the English character string and a set including a Japanese translation that corresponds to the English character string per same master ID, as described above.

In block 5, shown in FIG. 8B, the computer (101) creates a build including a master ID. Block 5 is similar to Block 5 shown in FIG. 7A, and that description is cited here.

In block 6, shown in FIG. 8C, the author of the manual is editing the manual (Japanese version) in the editor. The author of the manual starts creating the manual (Japanese version) on the editor. The author of the manual tries to create a Japanese description about each item of the Japanese translation corresponding to the screen character string {Defect, Task, Project Change Request, Plan Item, Risk, Risk Action, Issue, Milestone}. The author of the manual creates the aforementioned manual (Japanese version) in accordance with markup language for example.

It is deemed that the author of the manual has completed creation of the Japanese description for each item of the Japanese translation corresponding to the screen character string {Defect, Task}, and completed the entry of the Japanese description (provides a formal mechanism to renegotiate key project parameters (scope, timeline, resources)) for the item of the Japanese translation corresponding to the screen character string {Project Change Request}. The screen (806) is a screen on the editor in the middle of editing of a manual (Japanese version) immediately after the completion of the entry of the description. After the completing the Japanese description for the items of the Japanese translation corresponding to the screen character string {Defect, Task, Project Change Request}, the author of the manual is about to enter the Japanese translation corresponding to the screen character string {Plan Item} and the Japanese description for the items of the Japanese translation.

In block 7, shown in FIG. 8C, the computer (101) updates the screen character string control table during the editing of Block 6. The computer (101) updates the screen character string control table after completing the creation of the Japanese description text for the items of the Japanese translation that corresponds to the screen character string {Project Change Request}. The screen character string control table (807) indicates a version after being updated based on the completion of creation. The screen character string control table (807) contains various pieces of information, such as category information, appearance positional information in the program product (first appearance positional information) or the appearance positional information in the application (second appearance positional information), for the various items of the screen character string {Defect, Task, Project Change Request}, and various pieces of information, such as category information, appearance positional information in the program product, or appearance positional information in the application, for each item of the Japanese translation that corresponds to the screen character string {Defect, Task, Project Change Request}. The category information, the appearance positional information in the program product and the appearance positional information in the application for the various items of the screen character string {Defect, Task, Project Change Request} are the same as the category information, the appearance positional information in the program product and the appearance positional information in the application for each item that corresponds to the screen character string {Defect, Task, Project Change Request}.

In block 8, shown in FIG. 8C, the author of the manual enters a start tag <UICONTROL>, which is a tag for transitioning to a screen information acquisition mode, on the editor. The author of the manual transitions a screen in the program product in advance, so as to display the original language of the screen character string that is desired to be incorporated into the manual (Japanese version) in the program product on the screen. In other words, the author of the manual activates the program product, for example, as shown on screen (805) in FIG. 8B, and operates a menu, dialogues and windows so as to display the original language of the screen character string incorporated in the manual (Japanese version). In the screen (805) of FIG. 8B, the original language {Plan Item} of the screen character string to be incorporated next is displayed. The author of the manual enters the start tag <UICONTROL> on the editor in order to switch from the normal operating mode of the program product to the screen information acquisition mode. The screen (808) in the editor indicates that the start tag <UICONTROL> has been input on the bottom row.

The computer (101) automatically inserts into the start tag <UICONTROL> a trigger identifier "id="number"" for identifying the trigger within the same manual (for example, displayed with <UICONTROL id="number">), according to the entry of the start tag <UICONTROL> on the editor. Furthermore, the computer (101) connects the editor to the screen character string control table (807) so as to be accessible to the screen character string control table (807) by the editor, according to the entry of the start tag <UINCONTROL> on the editor.

Figure 8D:
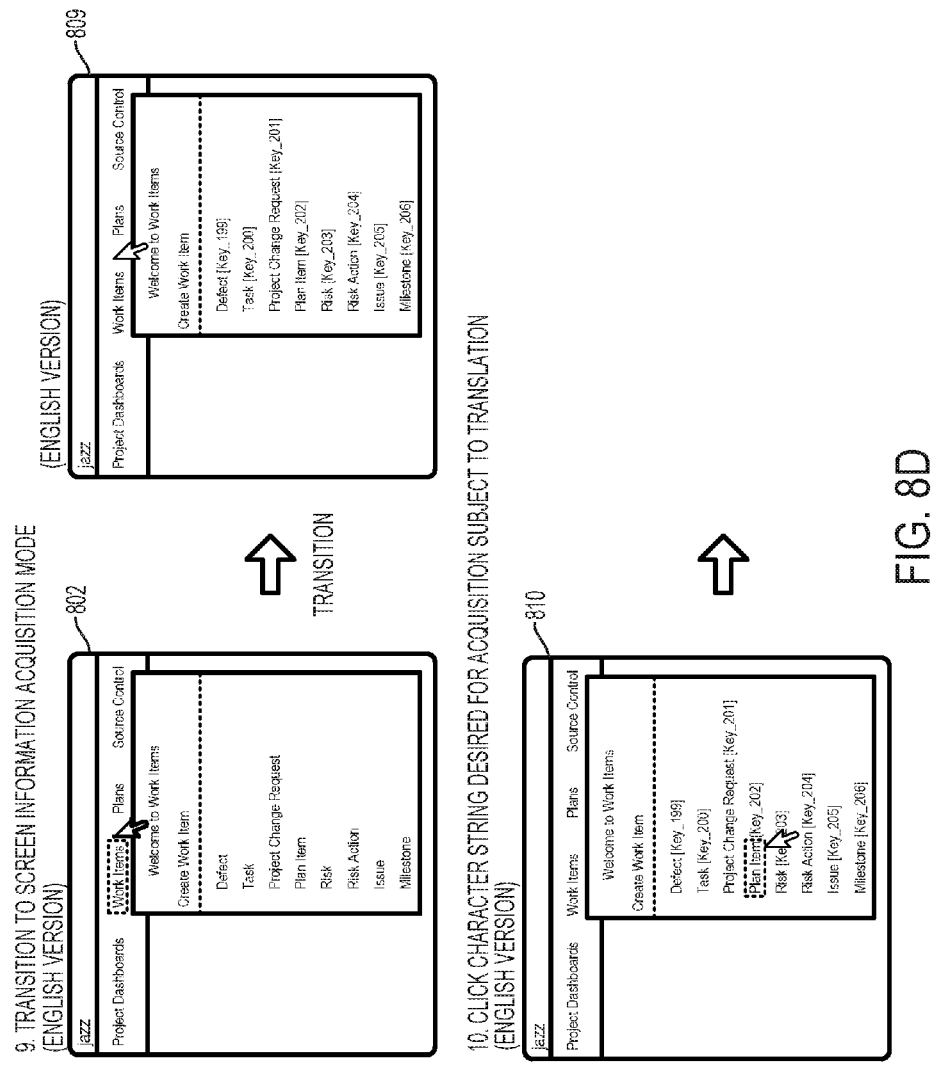

In block 9, shown in FIG. 8D, the computer (101) transitions the program product to a screen information acquisition mode from a normal operating mode. Block 9 is similar to Block 9 shown in FIG. 7A, and that description is cited here.

In block 10, shown in FIG. 8D, The author of the manual performs a clicking operation for selecting the original language of a screen character string desired for incorporation into the manual (Japanese version). The author of the manual performs an incorporation action for incorporating the Japanese translation corresponding to the screen character string {Plant Item} into the editor. The incorporation action is to select and click the screen character string {Plan Item} using a pointing device for example. On a screen (810), the section indicated with the dotted line indicates that the screen character string {Plan Item} has been selected.

Figure 8E:
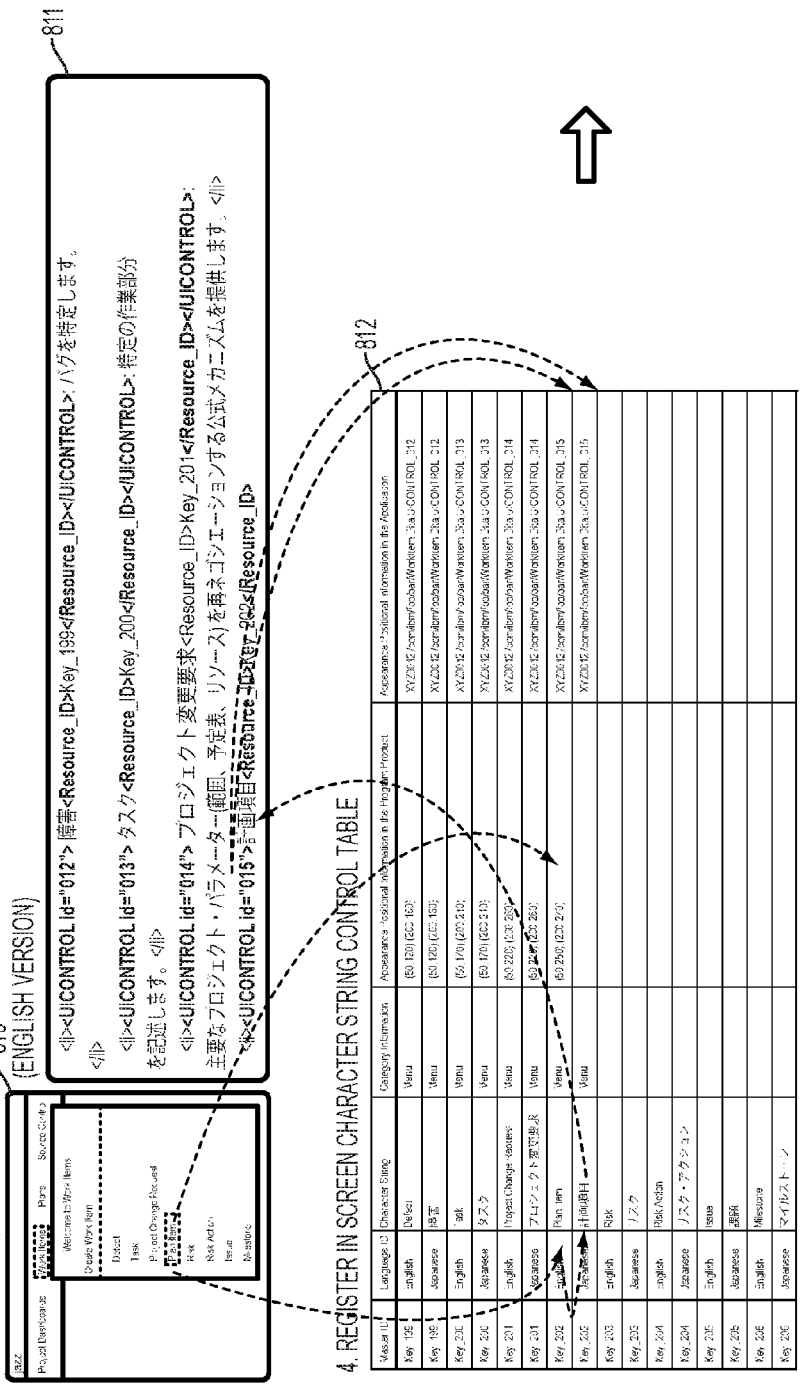
Figure 81:
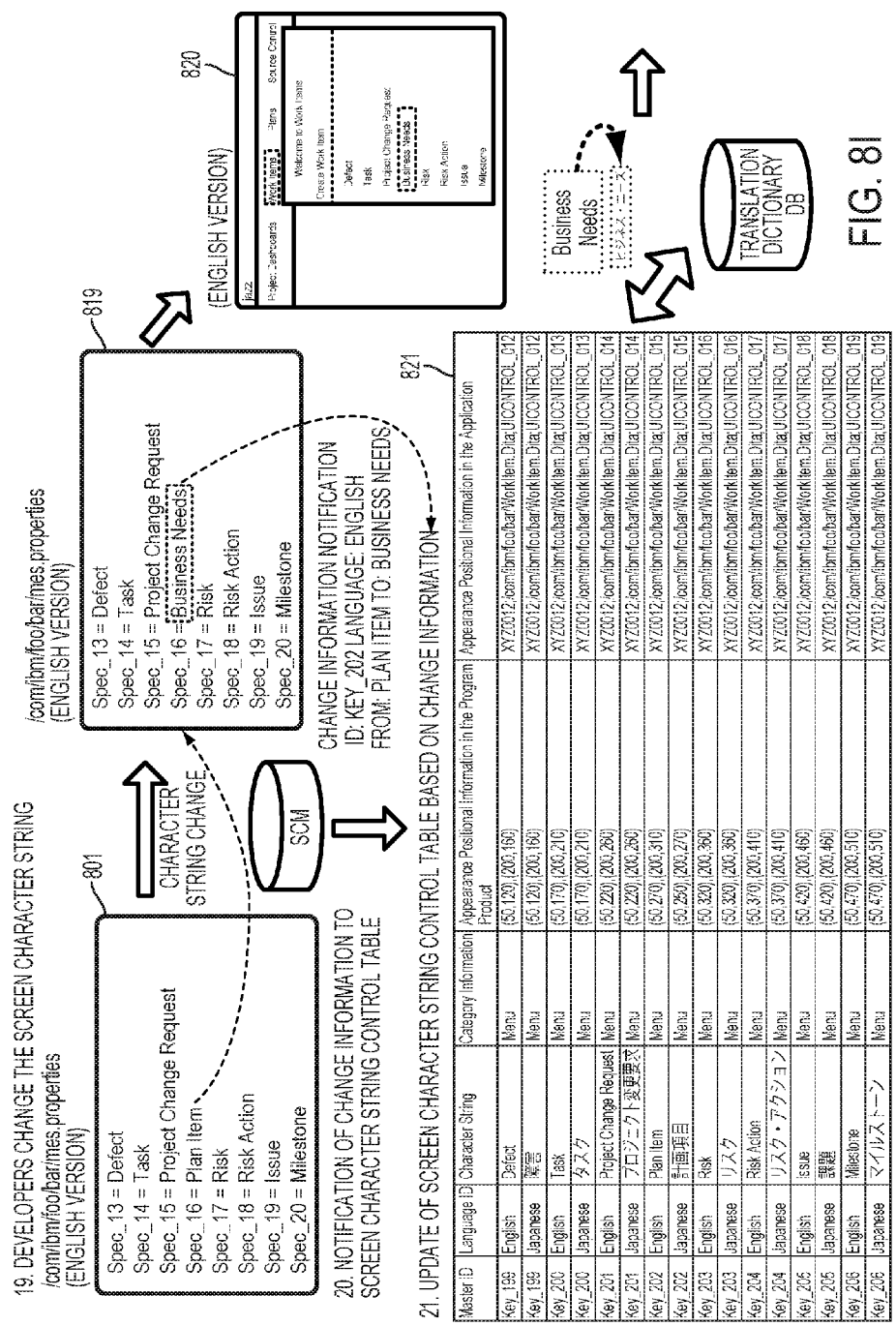

In block 11, shown in FIG. 8E, the computer (101) enters the Japanese translation (translated character string) corresponding to the selected screen character string on the editor, according to the selection of the screen character string. The computer (101) references the screen character string control table (807), and retrieves the character string in the line that has the master ID (Key_202) associated with the selected screen character string {Plan Item} and has the language ID associated with the manual file being edited on the editor (or in other words, the Japanese translation "Plan Item" (Japanese) that corresponds to the screen character string {Plan Item}), according to the selection of the screen character string {Plan Item}. The language ID depends on a number of languages in the screen character string control table (807) and is, for example, 2 or greater. Furthermore, the computer (101) enters the retrieved Japanese translation "Plan Item" (Japanese) adjacent to the start tag <UICONTROL id="015"> so as to be visible on the screen (811) in the editor "<UICONTROL id="015"> Plan Item (Japanese)". Furthermore, alternatively, the computer (101) references the screen character string control table (807) and can present, for example, a dialogue that enables selection of which one is entered on the editor between the character string of the line having the master ID (Key_202) associated with the selected screen character string {Plan Item} and having the language ID associated with the manual file being edited on the editor (in other words, the Japanese translation "Plan Item" (Japanese) that corresponds to the screen character string {Plan Item}), and the selected screen character string {Plan Item}, according to the selection of the screen character string {Plan Item}. Furthermore, the computer (101) references the screen character string control table (807), incorporates the master ID (Key_202) associated with the selected screen character string {Plan Item} (Japanese), and then enters the incorporated master ID (Key_202) adjacent to, for example, the entered character string "Plan Item" (Japanese) "<UICONTROL id="015"> Plan Item (Japanese) <Resource_ID> Key_202 </Resource_ID>". The computer (101) transitions a cursor on the editor immediately after the end tag </Resource_ID>, according to the entry of the master ID (Key_202) in the editor.

In block 12, shown in FIG. 8E, the computer (101) updates the screen character string control table. The computer (101) updates the screen character string control table (807, FIG. 8C) according to selection of the screen character string {Plan Item}. The computer (101) enters the data in the various items of the category information and the appearance positional information in the application, in a row including a combination of the character string conforming to the selected screen character string {Plan Item}, the master ID and the language ID, as well as in a row containing the same master ID as the selected screen character string {Plan Item}, in the screen character string control table (807), as described below. The computer (101) automatically acquires data of the category information from the program product. Alternatively, the computer (101) displays on a display device a window that prompts a user to enter the category information data, and enters the data that has been entered to the window into the category information item. Furthermore, the computer (101) specifies the appearance positional information in the application, according to the project ID (XYZ0012) associated with the master ID in the master table (803), the storage positional information and a file name (/com/ibm/foo/bar/WorkItem.Dita) of the electronic file of the manual, and, the indicator character string specified in the electronic file of the editor (start tag <UICONTROL>) and the trigger identifier (_015) embedded in the display screen of the editor. Note that the computer (101) does not at this time have the appearance positional information in the Japanese version of the program product, thus the appearance positional information will not be entered at this time (in other words, leave this as blank). The computer (101) can enter the appearance positional information in the Japanese version of the program product according to the activation of the Japanese version of the program product. Alternatively, the computer (101) can display a dialogue whether entering the appearance positional information in the Japanese version of the program product, for example, the appearance positional information in the English version of the program product, as reference information, or entering the appearance positional information in the English version of the program product as reference information, on the display device.

The screen character string control table (812) shows a screen character string control table after the data has been entered into each item of the aforementioned category information, the appearance positional information (only the row that includes the character string {Plan Item}) in the program product and the appearance positional information in the application, and the screen character string control table (807) is updated, in the two rows where their master ID is Key_202.

In block 13, shown in FIG. 8F, the author of the manual enters an end tag </UICONTROL>, which is a tag for deactivating the screen information acquisition mode and transitioning to normal operating mode, on the editor. Block 13 is similar to Block 13 shown in FIG. 7F, and that description is cited here.

In block 14, shown in FIG. 8F, the computer (101) transitions the program product to a normal operating mode from a screen information acquisition mode. Block 14 is similar to Block 14 shown in FIG. 7F, and that description is cited here.

In block 15, shown in FIG. 8G, the author of the manual describes the incorporated character string {Plan Item} (Japanese) in the editor. The author of the manual describes the incorporated character string {Plant Items} (Japanese) adjacent to the aforementioned end tag </UICONTROL> in the editor. A screen (815) indicates that the description "Records commitments that the development team makes to the business organization (Japanese)," has been entered.

In block 16, shown in FIG. 8G, the author of the manual starts from Block 8 and repeats the work incorporating the remaining Japanese translations corresponding to the screen character strings in the editor. The computer (101) updates the screen character string control table. The author of the manual does not have to transition the program product from the screen (814) shown in FIG. 8F because the original language of the screen character string desired for incorporation next into the manual (Japanese version) is {Risk}. The same operations shown in Block 8 through Block 15 are performed for each item of the screen character strings {Risk, Risk Action, Issue, Milestone}. Screen character string control table (816) is updated as a result of the same operations shown in Block 8 through Block 15 for each item of the screen character string {Risk, Risk Action, Issue, Milestone}.

In block 17, shown in FIG. 8H, this is a screen display of the editor after completing the description about the incorporated character string {milestone} (Japanese) on the editor by the author of the manual. The author of the manual saves the edited manual file on the memory device (108) after completing the description about the incorporated character string {milestone} (Japanese).

In block 18, shown in FIG. 8H, this is an example where the edited manual file is read to the memory (103) and displayed on the screen, or an example where such manual file is printed on a paper form. A screen (818) is a screen example where the edited manual file is read to the memory (103) and displayed on the screen. Furthermore, a printed product (818) is created by calling up the edited manual file, and then printing using a printer.

In block 19, shown in FIG. 8I, the developer of the program product changes the screen character string before release of the program product. It is deemed that the developer of the program product calls the message file (801) from "/com/ibm/foo/bar/mes.properties", and changes (819) the screen character string {Plan Item} in the message file (801) to {Business Needs}. The computer (101) displays the screen (820) according to the incorporation of the changed message file (819) into the program product (English version). The dotted line portion on a screen (820) indicates that the screen character string {Plan Item} on the screen (802) has been changed into {Business Needs}. Note that the dotted line part is added in order to facilitate the description.

In block 20, shown in FIG. 8I, the computer (101) notifies the screen character string control table (816, FIG. 8G) of the change information of the screen character string in Block 19. The computer (101) checks the information related to the change into the SCM according to the change of the screen character string {Plant Item} to {Business Needs} in the message file (801). The computer (101) notifies the screen character string control table (816) of the change information, based on the information related to the change being checked into the SCM. The change information includes the master ID, language information (for example, language ID), the screen character string {Plan Item} before the change, and the screen character string {Business Needs} after the change.

In block 21, shown in FIG. 8I, the computer (101) updates the screen character string control table (816, FIG. 8G), based on the change information that is provided in Block 20. The computer (101) replaces the screen character string {Plan Item} of the matching row with {Business Needs}, according to the master ID (Key_202), language ID (English) and the screen character string in the change information before modification matching a row that includes the set of the master ID (Key_202), language ID (English) and screen character string {Plan Item} in the screen character string control table (816). In other words, the change of the screen character string in the message file (801) is reflected in the screen character string control table (816). Therefore, the screen character string in the screen character string control table (816) is synchronized with the screen character string after modification. There is no change in the other items in the screen character string control table (816) (master ID, language ID, category information, appearance positional information in the program product, and appearance positional information in the application). The character string "Business Needs" that is surrounded by the dotted line portion in the screen character string control table (821) indicates that the screen character string {Plan Item} has been replaced with {Business Needs}. Note that the dotted line portion is added in order to facilitate the description.

Furthermore, the computer (101) replaces the screen character string (Plan Item) (Japanese}) of the matching row with the Japanese translation {Business Needs} (Japanese) that corresponds to {Business Needs}, according to the master ID in the change information (Key_202) matching the Master ID (Key_202) of the row that includes the set of the master ID (Key_202), language ID (Japanese) and the screen character string {Plan Item} (Japanese) in the screen character string control table (816). In other words, the change of the screen character string in the message file (801) is reflected in the corresponding Japanese translation in the screen character string control table (816). Therefore, the screen character string (Plan Item) (Japanese) in the screen character string control table (816) is synchronized to the Japanese translation (Business Needs) (Japanese) that corresponds to the screen character string after modification. The Japanese translation (Business Needs) (Japanese) corresponding to {Business Needs} can be automatically translated one of the modified screen character string {Business Needs} (English) by the computer (101) with reference to the translation dictionary database or the translation dictionary data. Alternatively, the computer (101) can display on a display device a window that prompts a user to enter a Japanese translation corresponding to the modified screen character string {Business Needs} (English), and then regard the data entry to that window as the Japanese translation of the modified screen character string {Business Needs} (English). Furthermore, alternatively, the computer (101) can specify the Japanese version of a message file by combining a master ID associated with the screen character string (English) of the master table (803), the in-file message ID or the SCM positional information, and the master ID and language ID (Japanese) of the screen character string control table (804), and if a screen character screen that includes the in-file message ID exists in the message file (Japanese), the screen character string (Japanese) can be the Japanese translation of the screen character string (English). There is no change in the other items in the screen character string control table (816) (master ID, language ID, category information, appearance positional information in the program product, and appearance positional information in the application). The character string "Business Needs" (Japanese) enclosed by the dotted line portion in the screen character string control table (821) indicates that the Japanese translation (Plan Item) (Japanese) has been replaced with the screen character string (Business Needs) (Japanese). Note that the dotted line part is added in order to facilitate the description. Note that even if the screen character string {Plan Item} in the message file (801) is changed to {Business Needs}, the master table (803) is not changed.

In block 22, shown in FIG. 8J, the computer (101) references the screen character string control table (821) and updates the character string in the editor that corresponds to the character string that has been changed in the screen character string control table (821) according to loading the electronic data (for example, an electronic file) of the manual (Japanese version) on the editor. The computer (101) loads the electronic data of the manual (Japanese version) into the editor, according to update of the screen character string control table (816) or a read request for the electronic data of the manual (Japanese version). Furthermore, the computer (101) references the screen character string control table (821), and ascertains a location of the corresponding character string before modification in the editor based on the appearance positional information in the application associated with the screen character string that has been modified in the screen character string control table (821), and replaces the character string at the ascertains location {Plan Item} (Japanese) with the changed character string {Business Needs} (Japanese). The dotted line portion on the screen (822) of the editor indicates that the character string {Plan Item} (Japanese) has been automatically updated to the modified character string {Business Needs} (Japanese). Note that the dotted line portion is added in order to facilitate the description.

In block 23, shown in FIG. 8J, this is an example where the manual file, where the Japanese translation corresponding to the screen character string has already been replaced, is read to the memory (103) and is displayed on the screen, or an example where such manual file is printed on a paper form. The screen (823) is an example where the manual file, where the Japanese translation corresponding to the screen character string has already been replaced, is read to the memory (103) and is displayed on the screen. Furthermore, the printed material (823) is created by calling up the replaced manual file, where the Japanese translation corresponding to the screen character string has already been replaced, and then printing using a printer. The dotted line portion on the screen (823) or in the printed material (823) indicates that the character string {Plan Item} (Japanese) has automatically been updated to the modified character string {Business Needs} (Japanese). Note that the dotted line portion is added in order to facilitate the description.

In block 24, shown in FIG. 8K, the author of the manual selects the substituted character string in the manual file where the Japanese translation has been replaced based on the screen character string. The computer (101) displays the modified character string {Business Needs} (Japanese) on the screen (822) of the editor, in order to ease viewing by the author of the manual. The computer (101) can change the text color of the modified character string {Business Needs} (Japanese) to a text color that is different from the other character strings or can cause the modified character string to flash. It is deemed that the author of the manual wishes to confirm that the modified character string {Business Needs} (Japanese) corresponds to which screen character string on the screen of the program product. The author of the manual selects the modified character string {Business Needs} (Japanese) in the editor using a pointing device for example.

In block 25, shown in FIG. 8K, the computer (101) displays the screen character string that corresponds to the selected character string {Business Needs} (Japanese) in the program product (English version) in order to allow easy viewing by the author of the manual, or displays the selected character string {Business Needs} (Japanese) in the program product (Japanese version) in order to allow easy viewing by the author of the manual. The computer (101) determines whether or not the master ID that is associated with the modified character string {Business Needs} matches the master ID in the screen character string control table (821), when the program product is the English version, according to the selection of the modified character string {Business Needs} (Japanese) on the editor. The computer (101) reads the appearance positional information in the program product (English version) (825) associated with the line that contains the aforementioned matching combination in the screen character string control table (821), according to the aforementioned matching. The computer (101) displays the screen character string (matching the original language {Business Needs} of the selected character string {Business Needs} (Japanese)) associated with the read appearance positional information, in order to ease viewing by the author of the manual. The computer (101) can change the color of the screen character string {Business Needs} associated with the read appearance positional information to be a different text color than the other character strings, or can cause the screen character string to flash. The dotted line portion in the screen (825) indicates that the screen character string {Business Needs} is flashing. Note that the dotted line part is added in order to facilitate the description.

The computer (101) determines whether or not the master ID associated with the modified character string {Business Needs} (Japanese) or the combination of the master ID, language ID, and modified character string {Business Needs} (Japanese) matches the combination of the master ID, language ID and the modified character string {Business Needs} (Japanese) in the screen character string control table (821), if the program product is in Japanese, according to the selection of the modified character string {Business Needs} (Japanese) on the editor. The computer (101) reads the appearance positional information in the program product (Japanese version) (826) associated with the row that contains the aforementioned matching combination in the screen character string control table (821), according to the aforementioned matching. The computer (101) displays the screen character string associated with the read appearance positional information (matching the selected character string {Business Needs} (Japanese)), in order to ease viewing by the author of the manual. The computer (101) can change the color of the screen character string {Business Needs} (Japanese) associated with the read appearance positional information to be a different text color from the other character strings, or can cause the screen character string to flash. The dotted line portion in the screen (826) indicates that the screen character string {Business Needs} (Japanese) is flashing. Note that the dotted line part is added in order to facilitate the description. The author of the manual can easily confirm which screen character string has been modified in the program product by the operations of Block 24 and Block 25.

Figure 8L:
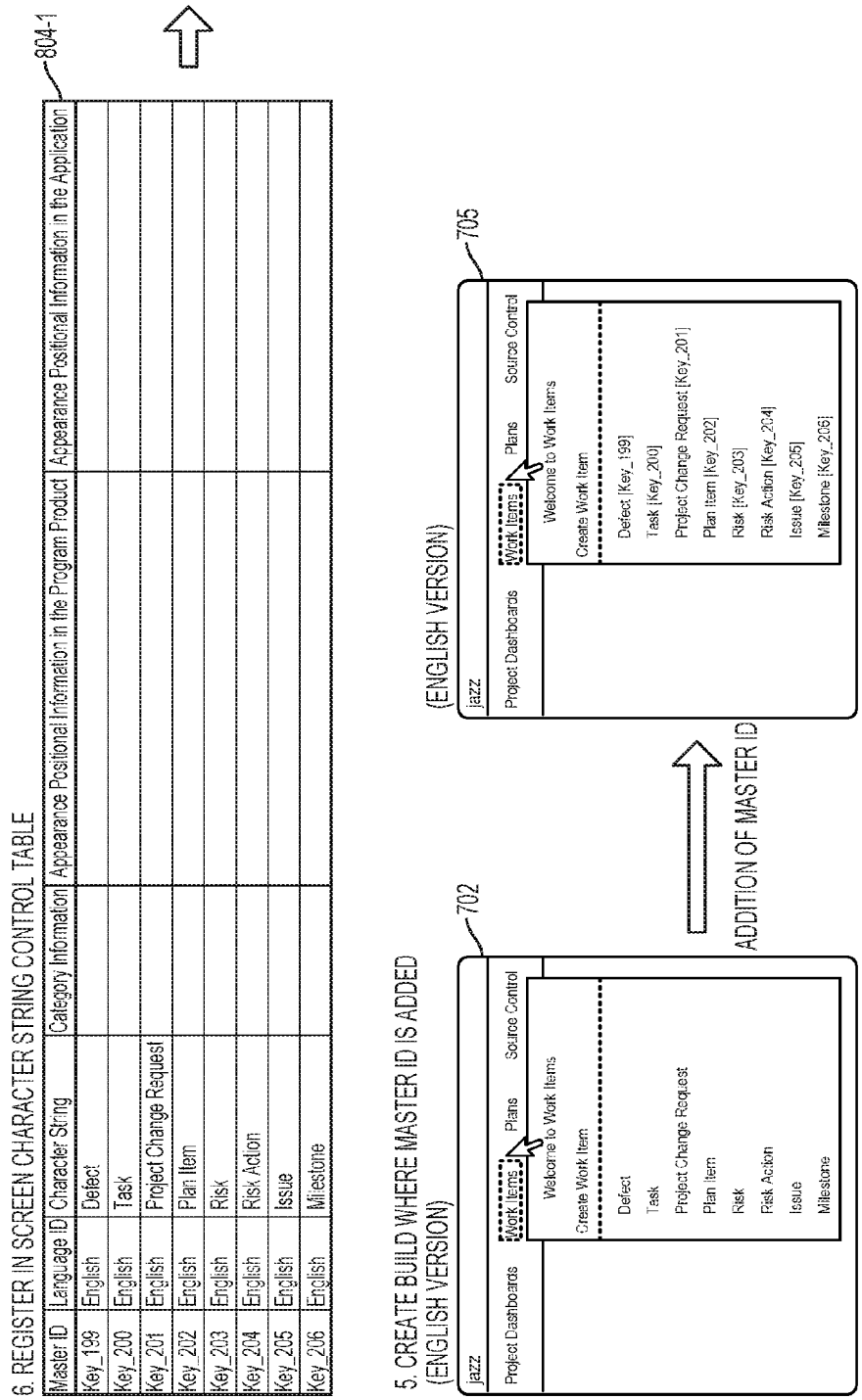

FIG. 8L to FIG. 8N show alternate examples of Blocks 4, 7, 11 and 12 shown in FIG. 8B to FIG. 8E, out of the blocks shown in FIG. 8A to FIG. 8K. The alternate examples of blocks 4, 7, 11 and 12 show an embodiment where a row that contains the Japanese translation that corresponds to the screen character string in the screen character string control table is inserted by the user according to the selection of the screen character string in the program product.

In the alternate example of block 4 shown in FIG. 8L, the computer prepares the screen character string control table and enters a portion of the data from the message file and the master table. The computer (101) prepares the screen character string control table and enters a portion of the data from the message file and the master table, as similar to Block 4 shown in FIG. 7 B. The screen character string control table (804-1) is the same as the screen character string control table (704), but differs from the screen character string control table (804), and does not beforehand have a row that contains the Japanese translation corresponding to the screen character string (English).

In the alternate example of block 7 shown in FIG. 8M, the computer (101) updates the screen character string control table during editing in Block 6. The computer (101) updates the screen character string control table according to the completion of creation of the Japanese explanation text about the item of the Japanese translation that corresponds to the screen character string {Project Change Request}. The screen character string control table (807-1) is a table that has been updated according to the completion of document creation. The screen character string control table (807-1) contains various information, such as category information, appearance positional information in the program product (first appearance positional information) or the appearance positional information in the application (second appearance positional information), about the various items of the screen character string {Defect, Task, Project Change Request}, or various pieces of information, such as category information, appearance positional information in the program product or appearance positional information in the application, for each item of the Japanese translation that corresponds to the screen character string {Defect, Task, Project Change Request} where incorporation of the Japanese translation that corresponds to the screen character string {Defect, Task, Project Change Request} has already been completed, in the editor. The category information, appearance positional information in the program product and the appearance positional information in the application about the various items of the screen character string {Defect, Task, Project Change Request} are the same as the category information, appearance positional information in the program product and appearance positional information in the application about each item that corresponds to the screen character string {Defect, Task, Project Change Request}.

In the alternate example of block 11 shown in FIG. 8N, the computer (101) enters the Japanese translation (a translated character string) corresponding to the selected screen character string in the editor, according to the selection of the screen character string. The computer (101) references the screen character string control table (807) and retrieves the character string (or in other words the screen character string {Plate Item}) of the row that has the master ID (Key_202) associated with the selected screen character string {Plan Item}. Furthermore, the computer (101) references the translation dictionary database or the translation dictionary data and retrieves the Japanese translation {Plan Item} (Japanese) corresponding to the retrieved screen character string {Plan Item}. Alternatively, the computer (101) displays on a display device a window that prompts a user to enter a Japanese translation corresponding to the screen character string {Plan Item}, and then uses the data entry to that window as the Japanese translation of the screen character string (English). Furthermore, alternatively, the computer (101) can specify the Japanese version of a message file by combining a master ID associated with the screen character string (English) of the master table (803), the in-file message ID or the SCM positional information, and the master ID and the language ID (Japanese) of the screen character string control table (804), and if a screen character screen that includes the in-file message ID within the message file (Japanese) exists, the screen character string (Japanese) can be the Japanese translation of the screen character string (English).

The computer (101) further inserts another row that has the master ID (Key_202) associated with the selected screen character string {Plan Item} in the screen character string control table. The inserted row contains at least the same master ID as the selected screen character string {Plan Item}, the language ID (Japanese) of the Japanese translation {Plan Item} (Japanese) corresponding to the selected screen character string {Plan Item}, and the Japanese translation {Plan Item} (Japanese) that corresponds to the selected screen character string {Plan Item}.

Furthermore, the computer (101) references the screen character string control table (807) that has the inserted line, and retrieves the character string of the row that has the master ID (Key_202) associated with the selected screen character string {Plan Item} and has the language ID associated with the editing manual file on the editor (or in other words, the Japanese translation "Plan Item" (Japanese) that corresponds to the screen character string {Plan Item}). Furthermore, the computer (101) enters the retrieved Japanese translation "Plan Item" (Japanese) adjacent to the start tag <UICONTROL id="015"> so as to be visible on the screen (811) in the editor "<UICONTROL ID="015"> Plan Item (Japanese)". Furthermore, the computer (101) references the screen character string control table (807), incorporates the master ID (Key_202) that associated with the selected screen character string {Plan Item}, and then enters the incorporated master ID (Key_202) adjacent to the character string {Plan Item} (Japanese) for example "<UICONTROL ID="015"> Plan Item (Japanese) <Resource_ID> Key_202 </Resource_ID>". The computer (101) transitions the cursor on the editor immediately after the end tag </Resource_ID>, according to the entry of the master ID (Key_202) on the editor.

In the alternate example of block 12 shown in FIG. 8N, the computer (101) updates the screen character string control table. The computer (101) updates the screen character string control table (807, FIG. 8C) according to the selection of the screen character string {Plan Item}. The computer (101) enters the data in the various items for the category information and the appearance positional information in the application, in the row including the combination of the character string conforming to the selected screen character string {Plan Item}, the master ID and the language ID in the screen character string control table (807), as well as in the row that contains the same master ID as the selected screen character string {Plan Item} (or in other words, the line that was added in block 11 (alternate)), as described below. The computer (101) automatically acquires the category information data from the program product. Alternatively, the computer (101) displays on a display device a window that prompts a user to enter category information data, and enters the data that has been entered into the window into the category information item. Furthermore, the computer (101) specifies the appearance positional information in the application using the project ID (XYZ0012) associated with the master ID within the master table (803), the storage positional information and the filename (/com/ibm/foo/bar/WorkItem.Dita) for the electronic file of the manual, and the indicator character string (start tag <UI CONTROL>) specified in the electronic file of the editor and the trigger identifier (_015) embedded in the display screen of the editor. Note that the computer (101) does not at this time have the appearance positional information in the Japanese version of the program product, thus the appearance positional information cannot be entered at this time (in other words, leave as blank). The computer (101) can enter the appearance positional information in the Japanese version of the program product according to the activation of the Japanese version of the program product. Alternatively, the computer (101) either enters the appearance positional information in the Japanese version of the program product using the appearance positional information in the English version of the program product as reference information, or can display on the display device a dialog where a user can select whether or not the appearance positional information in the English version of the program product should be entered as reference information.

The screen character string control table (812-1) shows a screen character string control table after the data is entered into each item of the aforementioned category information, the appearance positional information (only the row that includes the character string {Plan Item}) in the program product, and appearance positional information in the application, and the screen character string control table (807) is updated, in the two rows where the master ID is Key_202. In the screen character string control table (812-1), a row that contains the Japanese translation corresponding to the screen character string in the screen character string control table is inserted according to the selection of the screen character string in the program product by a user. Therefore, the screen character string control table (812-1) has two rows of the English character string and a Japanese translated character string corresponding to the English character string per same master ID in the master ID where the lines has been inserted.

FIG. 9A to FIG. 9F show an example where the consistency is maintained between the translation of the Japanese version of the program product and the translation of the Japanese manual, in the case that a screen character string in the English version of the program product is translated into different translations between the translation in the Japanese version of the program product and the translation in the Japanese manual, in the product development stage of the Japanese version of the program product corresponding to the English version of the program product, in accordance with an embodiment.

In block 1-1 shown in FIG. 9A, the developer of the English version of the program product determines a screen character string. Block 1-1 is similar to Block 1 shown in FIG. 7A, and that explanation is cited here. However, the computer that is used by the developer of the English version of the program product is referred to as a computer A. The computer A has the same hardware configuration as the computer (101) shown in FIG. 1.

In block 2-1 shown in FIG. 9A, the computer (101) displays a screen character string on the screen of the program product (English version). The computer A displays a screen (902) according to the incorporation of the message file (901) into the program product (English version). The screen (902) has each character string in the aforementioned message file (901) as a character string in "Create Work Item" under the "Work Items" entry in the menu bar.

In block 1-2 shown in FIG. 9A, the developer of the Japanese version of the program product translates the screen character string to corresponding Japanese. It is deemed that the developer of the Japanese version of the program product (who is different from the developer of the English version of the program product) localizes the program product (English version) to Japanese in parallel with the developer of the English version of the program product. The developer of the Japanese version of the program product reads the message file (901) created by the developer of the English version of the program product, and translates the screen character strings (English) in the read message file (901) to corresponding Japanese. The message file (951) includes a translated character string where the screen character string (English) has been translated to corresponding Japanese. The developer of the Japanese version of the program product inputs "Kadai" (Japanese) as a Japanese translation that corresponds to the screen character string {Issue}.

In block 2-2 shown in FIG. 9A, the computer (101) displays the screen character string on the screen of the program product (Japanese version). The computer that is used by the developer of the Japanese version of the program product is referred to as a computer B. The computer B has the same hardware configuration as the computer (101) shown in FIG. 1. The computer B displays a screen (952) according to the incorporation of the message file (951) into the program product (Japanese version). The screen (952) has a Japanese translation corresponding to each screen character string in the aforementioned message file (951) as a character string in "Create Work Item" (Japanese) under the "Work Items" (Japanese) entry in the menu bar.

In block 3 shown in FIG. 9B, the computer (101) prepares a master table, and enters data into the master table. The computer A prepares a master table (903) within the memory device (108) or on the memory (103) in order to reflect the contents of the message file (901) in the master table (903). The master table (903) includes at least one set including a combination of the master ID, an in-file message ID, SCM positional information and the project ID. The set in the master table (903) can include at least a combination of the master ID and the in-file message ID. Since the computer A has already created the master table (903) based on the message file (901) that is a translation source of the message file (951), the computer B will not create a master table based on the message file (951).

In block 4-1 shown in FIG. 9C, the computer A prepares a screen character string control table, and enters a part of the data from the message file and the master table. The computer A prepares a screen character string control table (904) in the memory device (108) or on the memory (103) in order to copy the master ID of the master table (903) into the screen character string control table (904). The screen character string control table (904) contains at least one set including a combination of a master ID; a language ID; a character string; category information; appearance positional information in the program product; and appearance positional information in the application.

In block 4-2 shown in FIG. 9C, the computer B enters a part of data into the screen character string control table (904) from the message file (951). Since the screen character string control table (904) has already been prepared in the memory device (108) or on the memory (103), the computer B detects the master ID specified by the in-file message ID in the message file (951) from the master table (903). The computer B inserts a row having a specific master ID into the screen character string control table (904). Furthermore, the computer B references the master table (903) and the message file (951) and enters a character string (Japanese) associated with the inserted master ID and the language ID (Japanese) into the screen character string control table. Therefore, the screen character string control table (905) has two rows of an English character string and a Japanese translated character string that corresponds to the English character string per same master ID. The screen character string control table (905) has a character string "Kadai (Japanese)" in the message file (951). In the screen character string control table (905), data for each item of category information where the language ID is English, appearance positional information in the program product and appearance positional information in the application remain as blank. However, if the block 7 of FIG. 7C or block 7 of FIG. 8C have already been executed, the data has already been entered for each item of the category information where the language ID is English in the screen character string control table (905), appearance positional information in the program product, and the appearance positional information in the application.

Figure 9D:
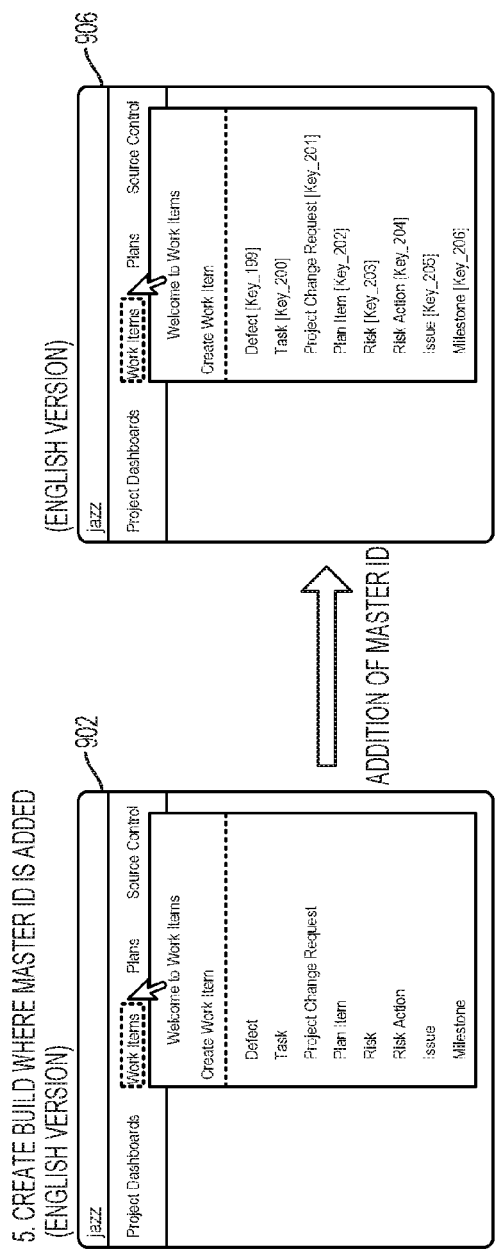

In block 5 shown in FIG. 9D, the computer A creates a build where a master ID is added. Block 5 is similar to Block 5 shown in FIG. 7A, and that explanation is cited here.

In block 6 shown in FIG. 9D, the author of the Japanese version of the manual is creating a manual (Japanese version) on the editor based on the screen of the English version of the program product. The author of the Japanese version of the manual of the program product (who is different from the developer of the Japanese version of the program product) is creating a manual (Japanese version) separate from the developer of the Japanese version of the program product, based on the screen of the English version of the program product. The editor screen (907) shows the interim process of Japanese translation with reference to the English version of the program product (902) by the developer of the Japanese version of the manual. In a screen information acquiring mode in accordance with an embodiment, it is deemed that the developer of the Japanese version of the manual incorporates screen character strings "defect (Japanese)", "task (Japanese)", "Project Change Request (Japanese)", "Plan Item (Japanese)", "risk (Japanese)", "risk action (Japanese)" and "Problem (Japanese)" into the editor; or directly references the English version of the program product (902) and enters the screen character strings "defect (Japanese)", "task (Japanese)", "Project Change Request (Japanese)", "Plan Item (Japanese)", "risk (Japanese)", "risk action {Japanese)" and "Problem (Japanese)" into the editor; or combines the incorporation into the editor and the entry into the editor, and enters the screen character strings "defect (Japanese)", "task (Japanese)", "Project Change Request (Japanese)", "Plan Item (Japanese)", "risk (Japanese)", "risk action {Japanese)" and "Problem (Japanese)" into the editor. The author of the Japanese version of the manual enters "Problem (Japanese)" as the Japanese translation corresponding to the screen character string {Issue} into the editor, adjacent to the start tag <UI control> of the indicator character string. A computer that is used by the author of the Japanese version of the manual is referred to as a computer C. The computer C has the same hardware configuration as the computer (101) shown in FIG. 1.

In block 7 shown in FIG. 9E, the computer C compares the character string entered in the editor and the character string in the screen character string control table (908). The computer C references the screen character string control table according to the entry of the character string "Problem (Japanese)" is entered adjacent to the start tag <UICONTROL> of the indicator character string. The screen character string control table (908) is referenced by the computer C. The computer C references a row where the master ID in the screen character string control table (908) is Key_205 and the language ID is Japanese since the master ID that is associated with the entered character string "Problem (Japanese)" is Key_205. The computer C detects that the character string in the referenced row is "issue (Japanese)". The computer C detects that the entered character string "Problem (Japanese)" is different from the character string "Issue (Japanese)" in the referenced line.

In block 8 shown in FIG. 9F, the computer C replaces the character string entered in the editor into the character string in the screen character string control table (908). The computer C converts the character string "Mondai (Japanese)" that has been entered into the editor with the character string "Kadai (Japanese)" of the referenced row, according to detecting that the input character string "Mondai (Japanese)" is different from the character string "Kadai (Japanese)" in the referenced row. Consistency between the screen character string "Kadai (Japanese)" in the Japanese version of the program product (952) and the character string "Mondai (Japanese)" after replacement in the Japanese version of the manual (909) is ensured due to this replacement.

The example shown in FIG. 9 above shows an example where if the screen character string (translation) in the Japanese version of the program product is translated to be different from the character string (translation) in the manual, the character string (translation) of the manual is consistent with the screen character string (translation) in the Japanese version of the program product. As another embodiment, for example, the developer of the Japanese version of the program product might mistakenly translate the aforementioned UI character string "Issue" as the UI character string "Mondai" because the author of the English version of the manual posted UI character string "Issue" of the English version of the program product as "Issues" in the English version of the manual; in the meantime, when the author of the Japanese version of the manual translates the character string "Issues" in the aforementioned manual as "Mondai-gun", the computer C will replace the translation in the Japanese version of the manual (in other words "Mondai-gun") with the translation in the Japanese version of the program product (in other words "Mondai") as similar to the operation shown in FIG. 9. Consistency between the screen character string "Mondai" in the Japanese version of the program produced) and the character string "Mondai" after conversion in the Japanese version of the manual is ensured due to this replacement.

Figure 10A:
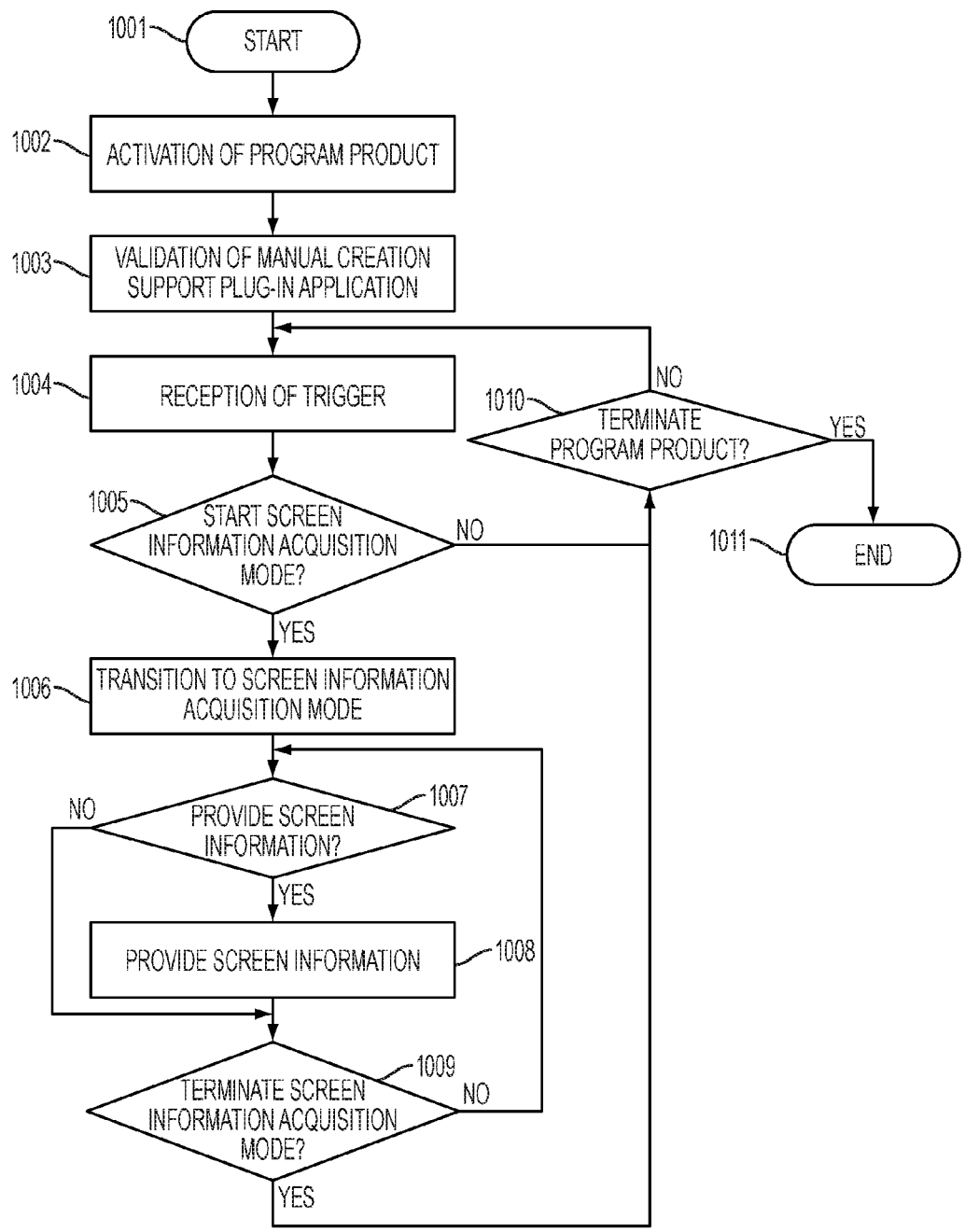
FIG. 10A is a flowchart showing a process for a computer operating the program product to support creation of a manual of the program product, in accordance with an embodiment.
Figure 10B:
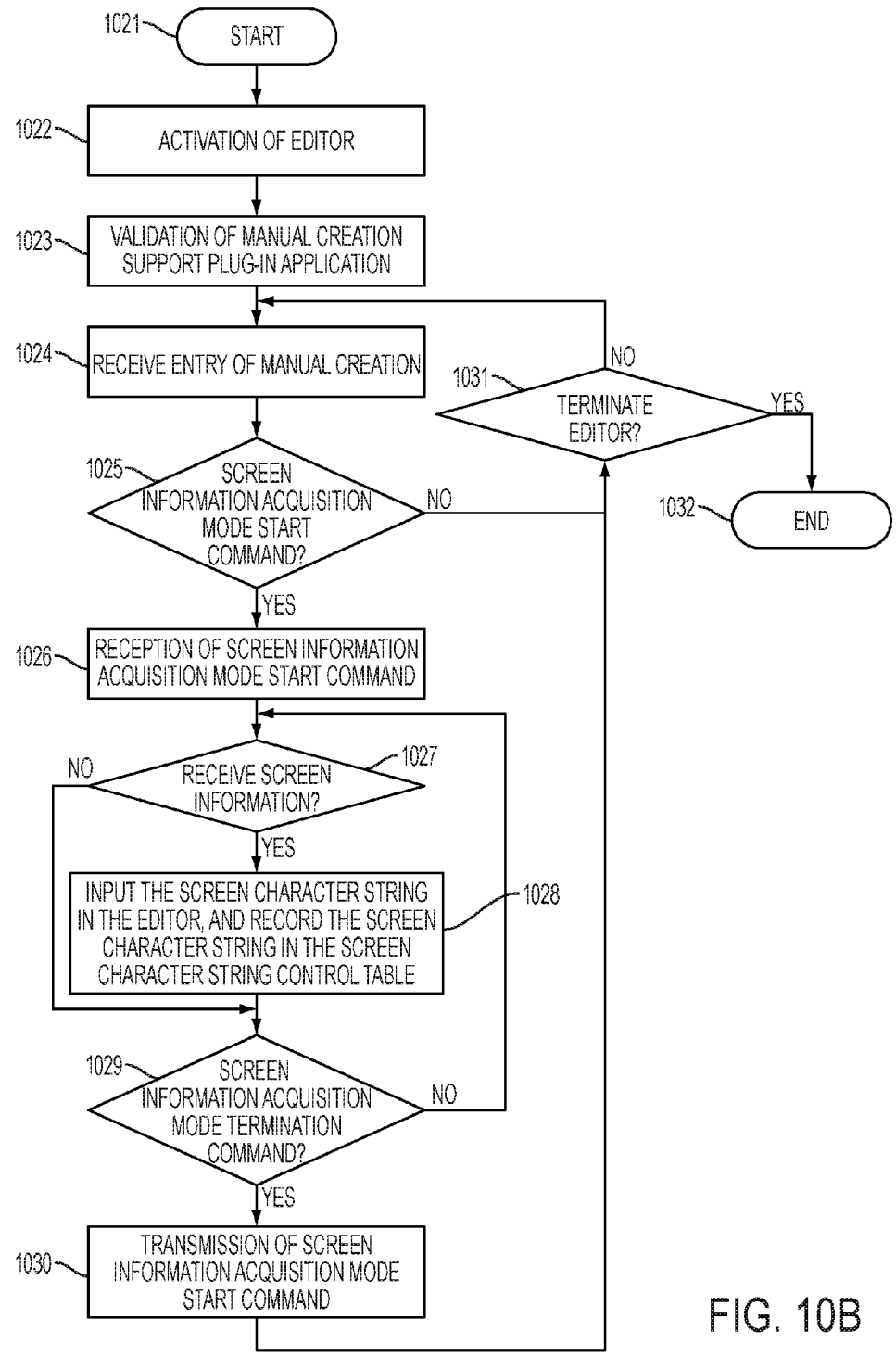
FIG. 10B is a flowchart showing a process for a computer operating an application for manual creation to support creation of a manual of the program product, in accordance with an embodiment.

FIG. 10A and FIG. 10B show flowcharts showing the process for supporting creation of a manual for a program product in accordance with an embodiment. FIG. 10A is a flowchart showing a process for a computer operating the program product to support creation of a manual of the program product, in accordance an embodiment. In Block 1001, the computer (101) begins processing in order to support the creation of a manual for a program product. In Block 1002, the computer (101) starts a program product, which is the subject of manual creation. The program product is operating in a normal operating mode. In Block 1003, the computer (101) activates a manual creation supporting plug-in application (for a program product) in order to support the creation of the manual. In Block 1004, the computer (101) receives a trigger. In Block 1005, the computer (101) determines whether or not the received trigger is a trigger for transitioning the program product from a normal operating mode to a screen information acquiring mode. The computer (101) moves the process to Block 1006 according to the received trigger being a trigger for transitioning to the screen information acquiring mode. On the other hand, the computer (101) moves the process to Block 1010 according to the received trigger being not a trigger for transitioning to the screen information acquiring mode.

In Block 1006, the computer (101) transitions to the screen information acquisition mode from the normal operating mode. In Block 1007, the computer (101) determines whether or not a trigger, which provides screen character string information of the program product (for example, selection of a screen character string by the user), has been received. The computer (101) moves the process to Block 1008 if this trigger has been received. On the other hand, the computer (101) moves the process to Block 1009 if this trigger has not been received in a fixed time period for example. In Block 1008, the computer (101) transmits to the editor the information of the screen character string selected by a user according to the reception of a trigger that provides screen character string information for the program product.

In block 1009, the computer (101) determines whether or not the screen information acquiring mode is finished. The computer (101) moves the process to Block 1010 if the screen information acquiring mode is finished. On the other hand, the computer (101) returns the process to Block 1007 if the screen information acquiring mode is not finished. In Block 1010, the computer (101) determines whether or not the program product is finished. The computer (101) moves the process to block 1011 if the program product is finished. On the other hand, the computer (101) returns the process to Block 1004 if the program product is not finished. In block 1011, the computer (101) finishes processing for supporting the creation of a manual for a program product.

FIG. 10B is a flowchart showing a process for a computer operating an application (for example an editor) for manual creation to support the creation of a manual of the program product, in accordance with an embodiment. In Block 1021, the computer (101) begins processing in order to support the creation of a manual for a program product. In Block 1022, the computer (101) starts the editor. In Block 1023, the computer (101) activates a manual creation supporting plug-in application (for an editor) for supporting the creation of the manual. In Block 1024, the computer (101) receives entries for creating a manual on the editor. The computer (101) displays the entered character string on the editor if the entry is a character string. In Block 1025, the computer (101) determines whether or not the entry is a trigger for transitioning the program product from a normal operating mode to a screen information acquiring mode. The computer (101) moves the process to Block 1026 if the entry is a trigger for transitioning to the screen information acquiring mode. On the other hand, the computer (101) moves the process to Block 1031 if the input is not a trigger for transitioning to the screen information acquiring mode. In Block 1026, the computer (101) transmits a start command to the program product in order to transition to the screen information acquiring mode, if the entry is a start command.

In Block 1027, the computer (101) determines whether or not information for the screen character string has been received from the program product. The computer (101) moves the process to Block 1028 if the screen character string information has been received. The computer (101) moves the process to Block 1029 if the screen character string information has not been received. In Block 1028, the computer (101) enters the screen character string into the editor if the screen character string information has been received, and updates the screen character string control table based on the information of the screen character string. In Block 1029, the computer (101) determines whether or not a trigger for transitioning the program product from screen information acquiring mode to normal operating mode has been received. The computer (101) moves the process to Block 1030 if a trigger for transitioning to the normal operating mode has been received. On the other hand, the computer (101) returns the process to Block 1027 if a trigger for transitioning to the normal operating mode has not been received. In Block 1030, the computer (101) transmits a finish command to the program product in order to finish the screen information acquiring mode, if a trigger for transitioning to the normal operating mode has been received.

In Block 1031, the computer (101) determines whether or not to finish the editor. The computer (101) moves the process to Block 1032 if the editor is to be finished. On the other hand, the computer (101) returns the process to Block 1024 if the editor is not to be finished. In Block 1032, the computer (101) finishes processing for supporting the creation of a manual for a program product.

Figure 11A:
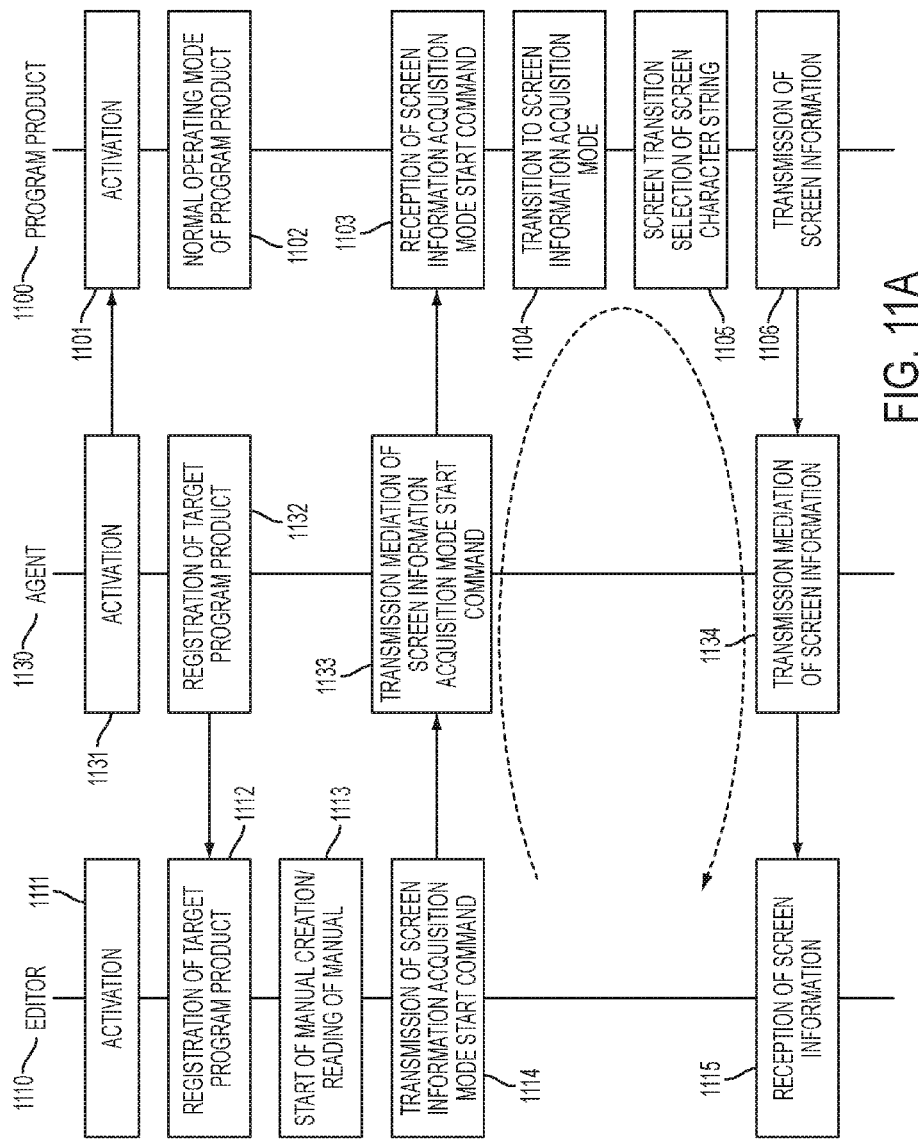
FIG. 11 A-B are flowcharts showing a process for supporting creation of a manual of a program product, among the program product, an application for manual creation, and an agent for supporting creation of the manual of the program product while maintaining consistency between the program product and the application for manual creation, in accordance with an embodiment.
Figure 11B:
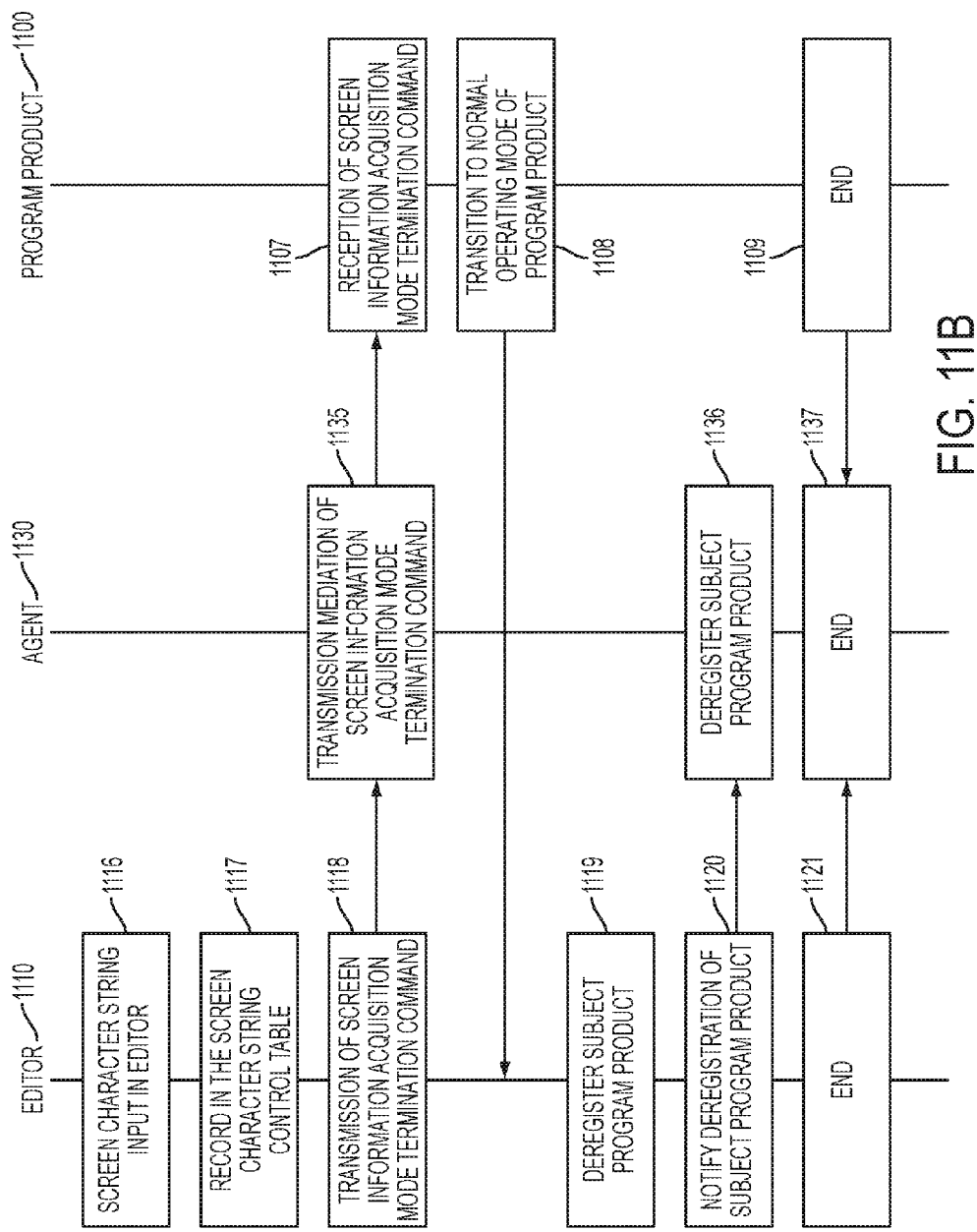

FIG. 11A and FIG. 11B are flowcharts showing a process for supporting creation of a manual of the program product, among a program product, an application (such as an editor) for creating a manual and an agent for supporting creation of the manual of the program product while maintaining consistency between the program product and the application for manual creation, in accordance with an embodiment. An agent (1130) exists between the program product (1100) and the editor (1110) in order to smoothly perform entries on the editor (1110), and is established so as to cause the program product (1100) and the editor (1110) to operate in conjunction through the agent (1130). The agent (1130) is mounted in the same computer if/when the program product (1100) and editor (1110) are both operated on the same computer. If the program product (1100) and the editor (1110) are operating on different computers, the agent (1130) can be mounted onto the computer where the program product (1100) is operating, or onto the computer where the editor (1110) is operating, or onto both computers. The agent (1130) can be mounted as a plug-in application of the program product (1100), or as a plug-in application of the editor (1110), or as an independent application from both the program product (1100) and editor (1110).

The author of the manual starts both the agent (1130) and the editor (1110) (1131, 1111). The agent (1130) arbitrarily starts the program product (1101) if the program product (1100) that is the subject for manual creation (hereinafter referred to as "subject program product") has not been started, and places the program product under the control of the agent (1130). Optionally, if the subject program product (1100) is operating, the agent (1130) uses the operating program product (1100) as is and places the operating subject program product (1100) under the control of the agent (1130). The agent (1130) declares and registers a method for interprocess communication between the editor (1110) and the subject program product (1100) (1132). The declaration that is required for the interprocess communication is, for example, whether or not the agent (1130) and the subject program product (1100) are on the same computer or are on different computers connected via a network; and is a communication means for the interprocess communication (for example, memory sharing, network information (for example, IP address, port)).

In the examples of FIG. 11A and FIG. 11B, an embodiment where one agent (1130) is connected to one editor (1110) is shown. However, as shown in the following FIG. 12A, it is also possible that a plurality of agents (1221, 1222) are connected to one editor (1211), and the one editor (1211) receives registrations from the plurality of agents (1221, 1222). Furthermore, in the examples of FIG. 11A and FIG. 11B, an embodiment where one program product (1100) is connected to one agent (1130) is shown. However, as shown in the following FIG. 12A, it is also possible that a single agent (1221) registers a plurality of subject program products (1201, 1202). The editor (1110) registers the subject program product (1100) on the editor according to the reception of a declaration for the subject program product (1100) from the agent (1130) (1112). The subject program product (1100) operates in a normal operating mode (1102). The editor (1110) creates a new manual file according to new creation of a manual by the author of the manual. Furthermore, the editor (1110) reads a partially-edited manual file from the stored location when the author of the manual edits the partially-edited manual (1113). The author of the manual creates a manual for the subject program product (1100) on the editor (1110). The author of the manual moves screens in order to view the screen(s) required for creating the manual in the subject program product (1100), if necessary, while creating a content text for the manual.

The author of the manual enters into the editor a trigger for transitioning the program product from a normal operating mode to a screen information acquiring mode, according to the timing when the screen character string of the subject program product (1100) is desired to be obtained (for example, when transitioning to a screen that displays the screen character string to be incorporated in the manual). The editor (1110) transmits to the agent (1130) a start command for transitioning to the screen information acquiring mode, using the aforementioned registered communicating means, according to the reception of a trigger (for example, an entry of the start tag <UICONTROL> of the indicator character string to the editor) for transitioning the program product from the normal operating mode to the screen information acquiring mode from a user (1114). Along with the start command, the editor (1110) can arbitrarily transmit the setup condition data that has set what type of screen information will/should be acquired from the program product (1100). The setup conditions can be a selected screen character string in the program product (1100), a translated character string where the selected screen character string has been translated to another specific language, an identifier associated with the selected screen character string, another identifier associated with the translated character string, or other attributes. The author of the manual can edit the setup condition data from the editor.

The agent (1130) transfers the start command to the subject program product (1100) using the registered communication means, according to the reception of the start command (1133). The agent (1130) can transfer the translated start command to the subject program product (1100) after the start command has been translated in a manner that the subject program product (1100) can comprehend, if necessary (1133). The subject program product (1100) receives the start command (1103) and is transitioned from the normal operating mode to the screen information acquiring mode, in accordance with the start command (1104). The subject program product (1100) receives the selection of screen character string by a user, in the screen information acquiring mode (1105). The subject program product (1100) transmits the selected screen character string information to the agent (1130) using the registered communicating means according to the selection of that the screen character string by the user (1106).

The agent (1130) transfers the screen character string information to the editor (1110) using the registered communication means, according to the reception or the screen character string information (1134). The editor (1110) enters the screen character string into the editor (1116) when the screen character string information is received (1115), and further updates the screen character string control table based on the information of the screen character string (1117). The editor (1110) transmits to the agent (1130) a finish command for finishing the screen information acquiring mode, using the aforementioned registered communicating means, when a trigger for transitioning the program product (1100) from the screen information acquiring mode to the normal operating mode is received from the user (for example, an entry of the stop tag </UICONTROL> of the indicator character string to the editor) (1118).

The agent (1130) transfers the finish command to the subject program product (1100) using the registered communication means, when the stop command is received (1135). The subject program product (1100) receives the finish command and is transitioned from the normal operating mode to the screen information acquiring mode, in accordance with the finish command (1108). The agent (1130) continues to create the manual when the subject program product (1100) is transitioned to the normal operating mode. The agent (1130) repeatedly performs the aforementioned processes when the trigger for transitioning the program product from the normal operating mode to the screen information acquiring mode is received again from the user. The editor (1110) deregisters the subject program product (1100) from the editor according to the determination to finish the process for supporting creation of the manual for the subject program product (1100) (for example, according to the closure of editing manual data on the editor) (1119).

The editor (1110) notifies the agent (1130) that the subject program product (1100) has been deregistered from the editor (1120). The agent (1130) deregisters the subject program product (1100) from the agent (1130) itself when the editor (1110) deregisters the subject program product (1100) (1136). The agent (1130), the subject program product (1100) and the editor (1110) finish processes for supporting the creation of the manual for the subject program product (1100), respectively (1137, 1109 and 1121).

Figure 12A:
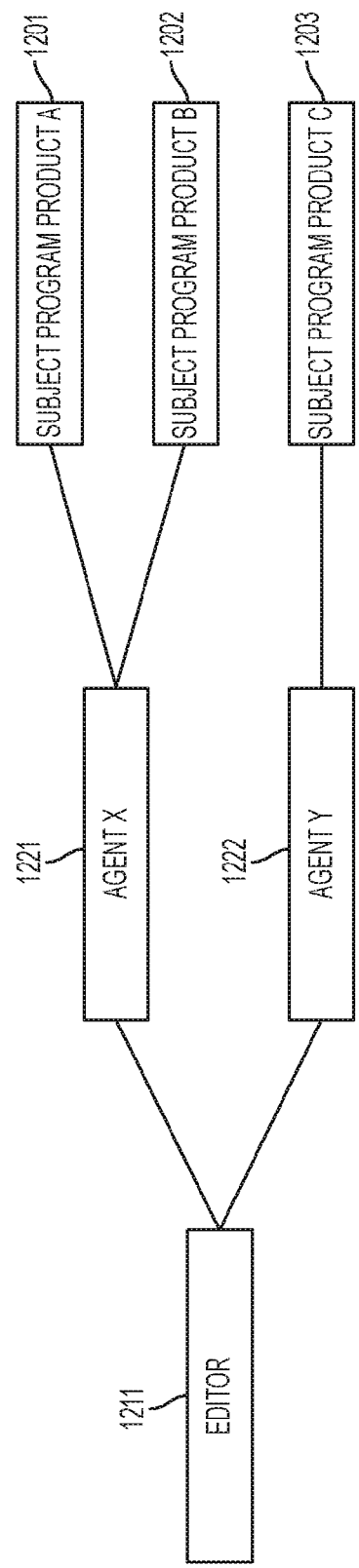
FIG. 12A is a diagram showing a connection relationship among a program product, an application for manual creation, and an agent for supporting creation of the manual of the program product, while maintaining consistency between the program product and the application for manual creation, in accordance with an embodiment.
Figure 12B:
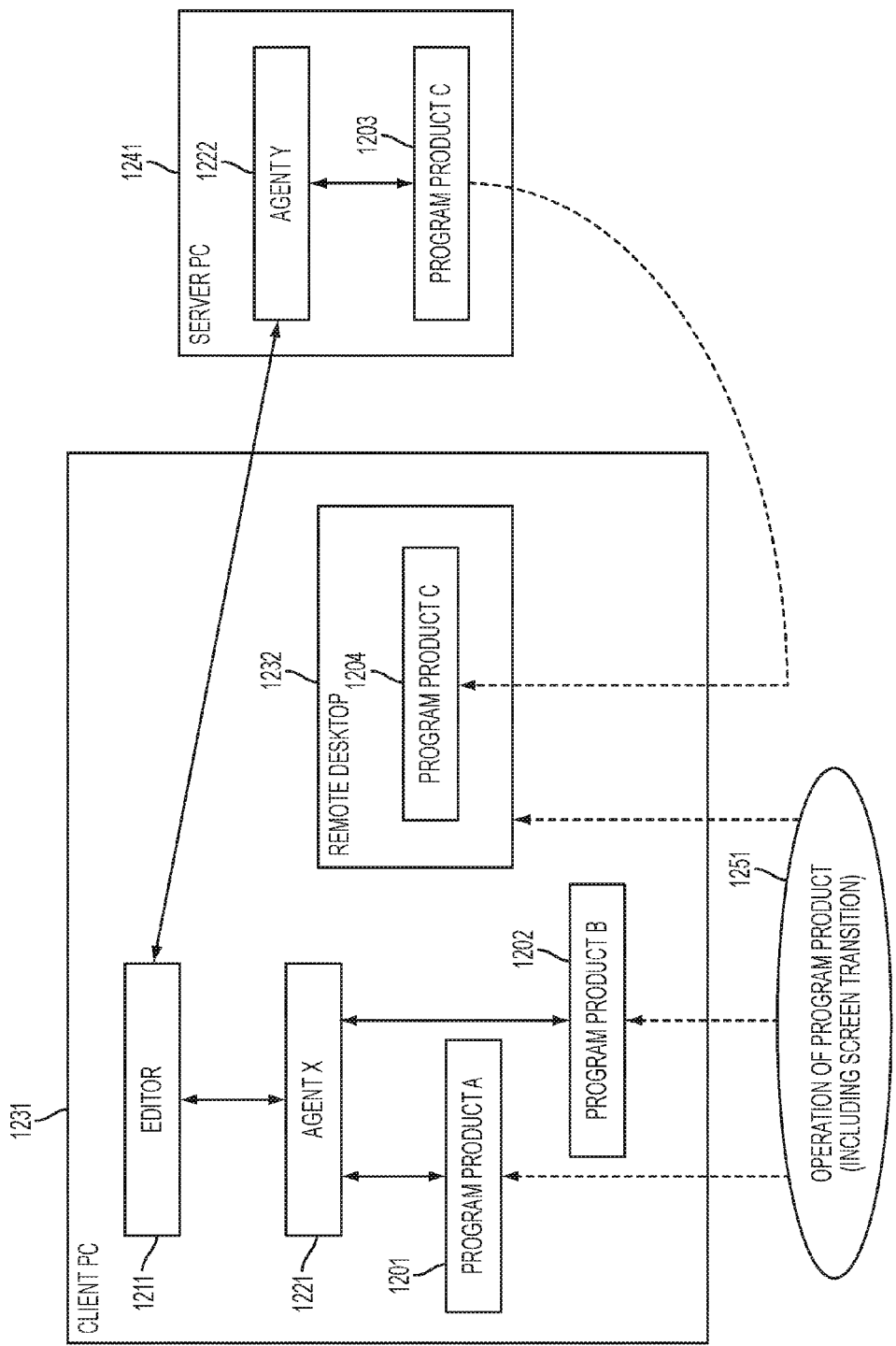
FIG. 12B shows an example where the connection relationship described in FIG. 12A is implemented in a client computer and a server computer.

FIG. 12A and FIG. 12B are diagrams showing a connection relationship among a program product, an application (such as an editor) for creating a manual and an agent for supporting the creation of the manual of the program product while maintaining consistency between the program product and the application for manual creation (in other words the connection relationship that allows interprocess communication), in accordance with an embodiment. FIG. 12A shows the connection relationship between the editor and the agent as well as the connection relationship between the agent and the program product. One editor (1211) is not only connected to one agent (1222), but can also be connected to a plurality of agents X and Y (1221, 1222) (in other words, editor: agent=1: M, provided, M is an integer of 1 or higher). A single agent (1221) is not only connected to one subject program product (1203), but can also be connected to a plurality of subject program products (1201, 1202) (in other words, agent: subject program product=1: N, provided, N is an integer of 1 or higher).

FIG. 12B shows an example where an agent X (1221) and an agent Y (1222) shown in FIG. 12A are mounted in different computers from each other. The author of the manual edits the manual using a client computer (hereinafter referred to as "client PC") (1231). The client PC (1231) is connected to a server computer (hereinafter referred to as "server PC") (1241) by a wireless or wired network. The client PC (1231) contains an editor (1211), and the agent X (1221) connected to the editor (1211) and a program product A (1201) and a program product B (1202) that are connected to the agent X (1221). The server PC (1241) contains an agent Y (1222), and a program product C (1203) that is connected to the agent Y (1222). The editor (1211) on the client PC (1231) is connectable to the agent X (1221) on the same client PC (1231), and is also connectable to the agent Y (1222) on the server PC (1241). The client PC (1231) has a remote desktop viewer (1232) for viewing desktop screen of the server PC (1241), and enables to operate the program product C (1203) that is mounted to the server PC (1241) on the client PC (1231) (1204).

It is possible for the editor (1211) to acquire a selected screen character string on the program product A (1201) and the program product B (1202), respectively, to enter the acquired screen character strings into the editor (1211). Furthermore, it is possible for the editor (1211) to acquire a selected character string on the program product C (1204) using the remote desktop function for the screen character string of the program product C (1203), and to enter the acquired screen character string into the editor (1211) by a communication with the agent Y (1222) (1251).

Figure 13:
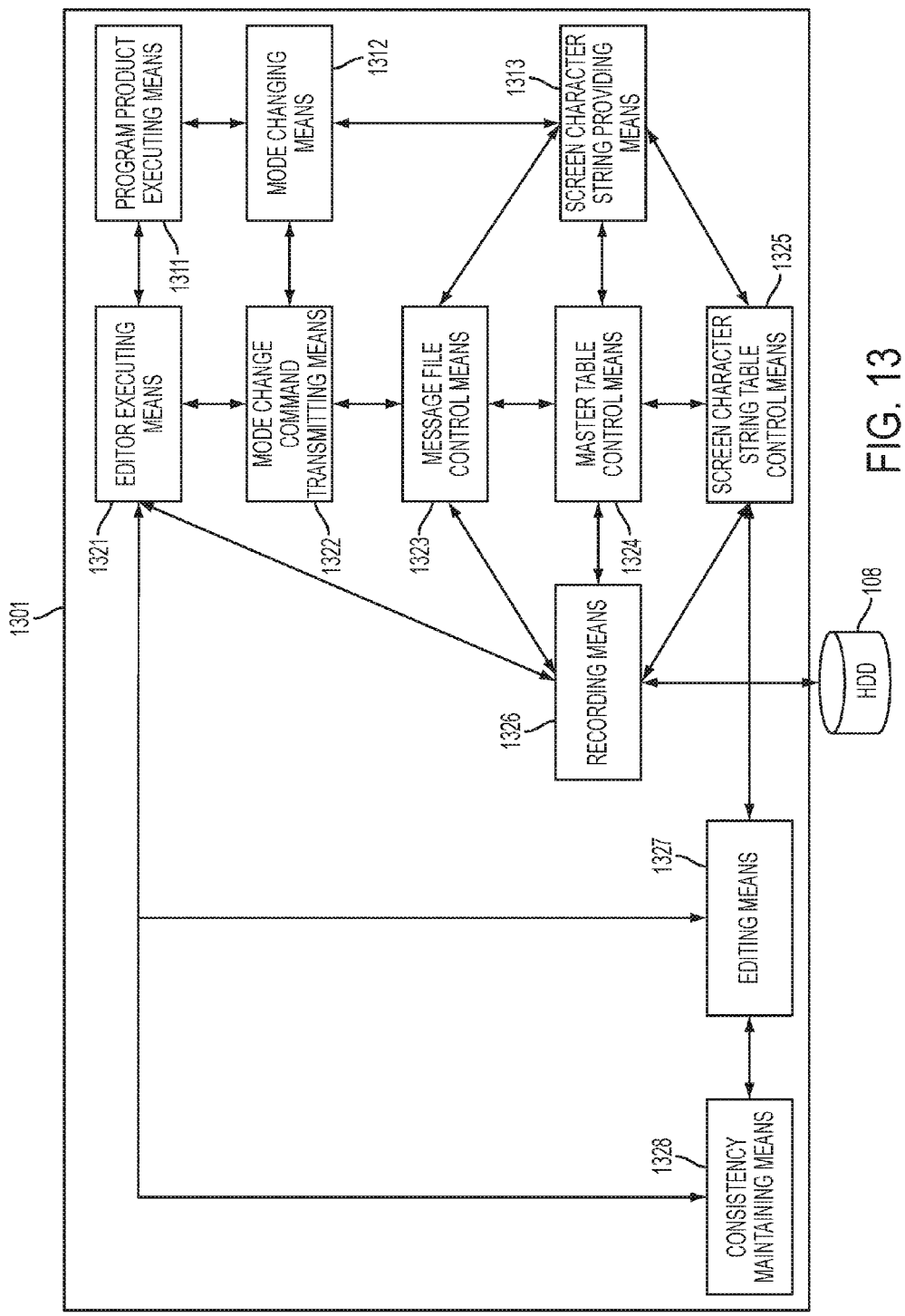
FIG. 13 is a diagram showing an example of a functional block diagram of a computer that is equipped with a hardware configuration in accordance with FIG. 1, and that is for executing a program product and an application for creating a manual, in accordance with an embodiment.

FIG. 13 is a diagram showing one example of a function block diagram of a computer that is equipped with a hardware configuration such as was shown in FIG. 1, and is for executing the program product and an application (such as an editor) for creating a manual, in accordance with an embodiment. The computer (1301) includes program product executing means (1311), mode changing means (1312), and screen character string providing means (1313) (all functions relating to the program product); editor executing means (1321), mode change command transmitting means (1322), message file controlling means (1323), master table controlling means (1324), screen character string control table controlling means (1325), recording means (1326), editing means (1327) and consistency maintaining means (1328) (all functions relating to the editor). Furthermore, the computer (1301) is connected to a memory device (108) that can be accessed either directly or through a network. The program product executing means (1311) executes one or a plurality of program products for which the manual is being created. The mode changing means (1312) switches the program product from a normal operating mode to a screen information acquiring mode, and inversely switches from a screen information acquiring mode to a normal operating mode.

The screen character string providing means (1313) transmits a screen character string selected by a user to the screen character string control table controlling means (1325) and the message file controlling means (1323) when the program product is executed in the screen information acquiring mode. The screen character string providing means (1313) transmits the identifier within the message file associated with the selected screen character string to the master table controlling means (1324) when the program product is executed in the screen information acquiring mode. The editor executing means (1321) executes an application (for example an editor) for creating a manual. The editor executing means (1321) can also start a plurality of applications (in other words start multiple windows). The mode change command transmitting means (1322) transmits commands to the program product (for example mode changing means (1312)) that instruct the program product to switch from a normal operating mode to a screen information acquiring mode, and that instruct to switch from the screen information acquiring mode to the normal operating mode.

The message file controlling means (1323) prepares a message file that is associated with the program product, and records the message file in a memory device (108). Preparation of the message file includes creating an identifier within the message file that is uniquely associated with the screen character string. The message file can include at least one set of the screen character string, and an identifier within the message file that is uniquely associated with the screen character string. The master table controlling means (1324) prepares a master table and records the master table in a memory device (108). Preparation of the master table includes creating a master table identifier that is uniquely associated with the identifier within the message file from the message file control means (1323). The master table includes at least one set of the identifier within the message file, and a master table identifier that is uniquely associated with the identifier within the message file.

The screen character string control table controlling means (1325) prepares a screen character string control table and records the control table in the memory device (108). The screen character string control table can include: the master table identifier; a screen character string associated with an identifier within the message file that is associated with the master table identifier, a translated character string where the screen character string has been translated into another language or an identifier associated with the screen character string or the translated character string; category information associated with the screen character string; first appearance positional information associated with the screen character string on the program product; and second appearance positional information associated with the screen character string or the translated character string on the application (for example, an editor).

Furthermore, the screen character string control table controlling means (1325) can update the screen character string control table so as to include a set of the master table identifier that is associated with the incorporating screen character string; the incorporating screen character string, a translated character string where the incorporating screen character string has been translated into another language or an identifier associated with the incorporating screen character string or the translated character string; category information associated with the incorporating screen character string; first appearance positional information associated with the incorporating screen character string on the program product; and second appearance positional information of the incorporating screen character string or a translated character string where the incorporating screen character string has been translated into another language on the application (such as an editor), in the screen character string control table.

Furthermore, the screen character string control table controlling means (1325) can record the modified screen character string or a translated character string where the modified screen character string has been translated into another language, in the screen character string control table, according to the change of the screen character string into another screen character string. Furthermore, the screen character string control table controlling means (1325) can record a translated character string that has been translated into a second language in the screen character string control table, when the screen character string is translated from a first language into a second language. Furthermore, the screen character string control table controlling means (1325) can record the modified screen character string in the screen character string control table, when the screen character string is changed to another screen character string. Furthermore, the screen character string control table controlling means (1325) can record a translated character string that has been translated into a second language in the screen character string control table, when the modified character string is translated from a first language into a second language.

The recording means (1326) records onto a recording medium that can be accessed by the computer a screen character string, a translated character string where the screen character string has been translated into another language or an identifier associated with the screen character string or the translated character string, displayed on a display device by the program product, and records onto the recording medium attribute information of the screen character string or the translated character string. Furthermore, the recording means (1326) can also be provided with a replacement means of replacing a screen character string prior to modification in terminology data where the screen character string for the program product is recorded with a modified screen character string, when the screen character string is modified to another screen character string. Furthermore, the recording means (1326) can also be provided with a translated character string adding means that adds a translated character string that has been translated into a second language into the terminology data where the screen character string for the program product is recorded, when the modified screen character string is translated from a first language to a second language.

Furthermore, the recording means (1326) can also be further provided with a translated character string adding means that adds a translated character string that has been translated into a second language into the terminology data where the screen character string for the program product is recorded, when the screen character string is changed to another screen character string and the modified screen character string is translated from a first language into a second language. Furthermore, the recording means (1326) can record onto the recording medium (108) the screen character string, the translated character string or the identifier, in response to an entry of an indicator character string on the application (for example, an editor), in response to an entry of a character string that indicates a start of an indicator character string on the application, in response to a specific operation of the keyboard, in response to a specific operation of a pointing device, in response to a specific spoken phrase, or in response to a specific gesture.

Furthermore, the recording means (1326) can record onto the recording medium (108) a selected screen character string, a translated character string where the selected screen character string has been translated into another language or an identifier associated with the selected screen character string or the translated character string, when the screen character string displayed on the display device by the program product is selected. Furthermore, the recording means (1326) can record onto the recording medium (108) the screen character string, the translated character string or the identifier; the attribute information; and an identifier for uniquely associating a combination of the screen character string, the translated character string or identifier with the attribute data. The editing means (1327) can insert the screen character string or the translated character string recorded in the recording medium that is accessible by a computer (1301), or, the screen character string selected by a user in the program product or a translated character string where the selected screen character string has been translated into another language adjacent to the entered indicator character string that on the application (for example an editor).

Furthermore, the editing means (1327) can insert the screen character string or the translated character string recorded in the recording medium that is accessible by a computer (1301), or, the screen character string selected by a user on the program product or a translated character string where the selected screen character string has been translated into another language, between a character string that indicates a start of the entered indicator character string on the application (for example, an editor) and the character string that indicates an end. Furthermore, the editing means (1327) can further be provided with an inserting means for referencing the screen character string control table, and inserting the master table identifier associated with the incorporating screen character string into the application by associating with the screen character string incorporated into the application (such as, an editor).

Furthermore, the editing means (1327) can also be provided with a granting means that grants a unique identifier within the manual that is associated with the incorporating screen character string, in response to a command for the program product to incorporate the screen character string displayed on the display device into the application (such as an editor). Furthermore, the editing means (1327) can also be further provided with an acquiring means that references the screen character string control table and acquires second appearance positional information that is associated with a screen character string before modification, in response to the edited manual or manual being edited by the application (such as an editor) being loaded into the memory (103) of a computer (101). Furthermore, the editing means (1327) can also be further provided with the acquiring means that references the screen character string control table and acquires the second appearance positional information that is associated with the screen character string in the first language, in response to loading the manual being edited by the application (such as an editor) or the edited manual into the memory (103) of a computer (101). Furthermore, the editing means (1327) can also be further provided with the acquiring means that references the screen character string control table and acquires the second appearance positional information that is associated with the screen character string before modification or the modified screen character string in the first language, in response to loading the manual being edited by the application (such as an editor) or the edited manual or into the memory (103) on the computer (101).

The consistency maintaining means (1328) maintains consistency between the screen character string or the translated character string and a character string that is displayed on a display device by an application for creating the manual (such as an editor), using the screen character string, the translated character string or the identifier and the attribute information recorded on the recording medium. Furthermore, the consistency maintaining means (1328) can replace the screen character string before modification that is associated with the second appearance positional information acquired by the acquiring means, with the modified screen character string. Furthermore, the consistency maintaining means (1328) can replace a character string associated with the second appearance positional information acquired by the acquiring means with a translated character string translated into a second language. Furthermore, the consistency maintaining means (1328) can replace a character string before or after modification associated with the second appearance positional information acquired by the acquiring means with a translated character string translated to a second language.

The following means that are functions relating to the program product: program product executing means (1311), mode changing means (1312) and screen character string providing means (1313) can be mounted, for example, as plug-in applications of the program product. The following means that are functions relating to the editor: editor executing means (1321), mode change command transmitting means (1322), message file control means (1323), master table control means (1324), screen character string control table control means (1325), the recording means (1326), the editing means (1327) and the consistency maintaining means (1328) can be mounted, for example, as a plug-in application of the editor.

FIG. 13 shows a functional block diagram in the case where a program product and an editor are executed in the same computer. If the program product and the editor are executed in different computers, the functions relating to the program product and the functions relating to the editor can be allocated to the computer that executes the editor and the computer that executes the program product, as necessary, respectively.

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

What is claimed is:

1. A method for supporting creation of a manual of a program product, the method implemented by a processing unit, and the method comprising:
   receiving, via an editor for creating the manual, a start tag of a user-interface element of the program product for which the manual is being created;
   in response to receipt of the start tag, activating an acquisition mode of a user-interface of the program product, wherein, in the acquisition mode, character strings of the user-interface are displayed with respective master-identifiers appended;
   receiving a selection of a character string corresponding to the user-interface element;
   recording, in the editor, following the start tag of the user-interface element, the character string and the master-identifier;
   receiving, via the editor, an end tag of the user-interface element;
   in response to receipt of the end tag, deactivating the acquisition mode of the user-interface of the program product;
   receiving, via the editor, a description of the user-interface element;
   detecting a category of the user-interface element, and a screen position of the user-interface element;
   in response to receipt of the description, recording an entry in a screen character string control table, the entry comprising, the character string, the master-identifier associated with the character string, a language identifier of the character string, the category of the user-interface element, and the screen position of the user-interface element; and
   maintaining consistency between the character string displayed on the user-interface element and in the manual.

2. The method according to claim 1, further comprising:
   detecting a replacement character string of the user-interface element, wherein maintaining consistency comprises referencing the replacement string in the manual in response to the program product loading the manual into a memory, and replacing the character string prior to modification of the manual with the replacement character string.

3. The method according to claim 1, further comprising:
   receiving a translation request to translate the manual to a second language corresponding to a version of the program product in the second language;
   in response to the translation request, creating a second entry in the screen character string control table, wherein the second entry comprises:
      a translated character string that is a translation of the character string translated to the second language, the master-identifier associated with the character string, a second language identifier of the translated character string, the category of the user-interface element, the screen position of the user-interface element, and a positional information where the translated character string is recorded for being displayed on the user-interface element; and
   wherein maintaining consistency comprises using the same master identifier for the entries corresponding to the character string and the translated character string to facilitate replacing the character string in the manual with the translated character string that has been translated into the second language.

4. The method according to claim 1, further comprising:
   replacing the character string prior to modification in the description; and
   adding a translated character string that has been is a translation of the character string into a second language into the description in place of the character string, in response to the character string being translated from a first language into the second language, wherein maintaining consistency comprises facilitating replacement of the character string in the first language in the manual with the translated character string.

5. The method according to claim 1, wherein receiving the start tag comprises at least one of: an entry of an indicator character string in the editor, an entry of a string that indicates the start of the indicator character string in the editor, a specific operation of a keyboard, a specific operation of a pointing device, or a specific speech sound.

6. The method according to claim 5, wherein recording the character string further comprises inserting the character string between the start tag and the end tag.

7. The method of claim 1, further comprising recording, in the entry of the screen character string control table, a positional information that is indicative of where the character string is recorded for being displayed on the user-interface element.

8. The method according to claim 1, further comprising:
   in response to a request to create the manual of program product in a second language:
      displaying a translated version of the user-interface of the program product, wherein the translated version displays the character strings of the user-interface in a second language;
      in response to receipt of the start tag, activating the acquisition mode of the user-interface, wherein, in the acquisition mode, the character strings of the user-interface are displayed with respective master-identifiers appended; and
      receiving a selection of a translated character string corresponding to the master identifier; and
      displaying the character string corresponding to the selected translated character string before translation on the program product.

9. The method according to claim 1, further comprising:
   preparing a message file associated with the program product, wherein the message file includes at least a set of the character strings of the user-interface of the program product and respective identifiers within the message file that is uniquely associated with the character string.

10. The method according to claim 9, further comprising:
preparing a master table, wherein the master table includes at least a set of the identifiers within the message file and the master identifiers uniquely associated with the identifier within the message file.

11. The method according to claim 10, further comprising:
preparing the screen character string control table, wherein the screen character string control table comprises: the master identifier; the character string associated with the identifier within the message file that is associated with the master identifier; a translated character string, and the respective language identifiers associated with the screen character string and the translated character string; the category information associated with the character string; a first appearance positional information associated with the character string in the program product; and a second appearance positional information associated with the character string and the translated character string respectively.

12. The method according to claim 11, further comprising:
associating the master identifier of the character string that is included in the manual with an incorporating screen character string, in response to a command to incorporate the translated character string displayed on the program product; and
updating the screen character string control table by:
associating the set of the master identifiers that is associated with the incorporating screen character string, wherein the incorporating screen character string is the character string translated into another language.

13. The method according to claim 12, further comprising:
referencing the screen character string control table, and inserting the master table identifier associated with the incorporating screen character string into the user-interface by associating with the character string.

14. The method according to claim 13, further comprising:
recording a translated character strings, into the screen character string control table, wherein the screen character string control table includes a set of the master identifiers associated with the character string before modification;
associating the translated screen character strings with respective master identifiers that are associated with the character strings corresponding to the translated screen character strings;
associating the category information associated with the character strings before modification with the corresponding translated screen character strings;
associating the first appearance positional information associated with the character strings before modification with the corresponding translated screen character strings; and
associating the second appearance positional information associated with the screen character strings before modification with the corresponding translated screen character strings; and
wherein maintaining consistency comprises replacing the character string before modification that is associated with the acquired second appearance positional information with the translated screen character string.

15. The method according to claim 13, further comprising:
recording, in the screen character string control table, the translated character string, wherein the screen character string control table includes:
a set of the master identifiers associated with the character string;
language information of a second language;
the category information associated with the character string;
the first appearance positional information associated with the character string; and
the second appearance positional information associated with the character string; and
referencing the screen character string control table and acquiring the second appearance positional information associated with the character string, in response to the manual being loaded into memory, wherein maintaining consistency comprises replacing the string associated with the acquired second appearance positional information with the translated character string.

16. The method according to claim 13, further comprising:
recording a modified screen character string in the screen character string control table in response to the character string being replaced with the modified screen character string, wherein the screen character string control table includes:
the master identifier associated with the character string before modification;
the category information associated with the character string before modification;
the first appearance positional information associated with the character string before modification; and
the second appearance positional information associated with the character string before modification;
in response, recording an entry for a translated character string of the modified screen character string in the screen character string control table, wherein the translated character string is a translation of the modified screen character string into a second language, wherein the entry for the translated character string of the modified screen character string in the screen character string control table includes:
the master identifier associated with the character string before modification;
a language information of the second language;
the translated character string that has been translated into the second language;
the category information associated with the character string before modification;
the first appearance positional information associated with the character string before modification; and
the second appearance positional information associated with the character string before modification; and
referencing the screen character string control table and acquiring the second appearance positional information associated with the character string, in response to the manual being loaded into memory; and
wherein maintaining consistency comprises replacing the character string that is associated with the second appearance positional information with the translated character string that has been translated into the second language.

17. A system for supporting creation of a manual of a program product, the system comprising:
a processor configured to:
receive, via an editor creating the manual, a start tag of a user-interface element of the program product for which the manual is being created;
in response to receipt of the start tag, activate an acquisition mode of a user-interface of the program product, wherein, in the acquisition mode, character strings of the user-interface are displayed with respective master-identifiers appended;
receive a selection of a character string corresponding to the user-interface element;
record, in the editor, adjacent to the start tag of the user-interface element, the character string and the master-identifier;
receive, via the editor, an end tag of the user-interface element;
in response to receipt of the end tag, deactivate the acquisition mode of the user-interface of the program product;
receive, via the editor, a description of the user-interface element;
detect a category of the user-interface element, and a screen position of the user-interface element;
in response to receipt of the description, record an entry in a screen character string control table, the entry comprising, the character string, the master-identifier associated with the character string, a language identifier of the character string, the category of the user-interface element, and the screen position of the user-interface element; and
maintain consistency between the character string displayed on the user-interface element and in the manual.

18. The system according to claim 17, wherein the processor is further configured to:
receive a translation request to translate the manual to a second language corresponding to a version of the program product in the second language;
create, in response to the translation request, a second entry in the screen character string control table, wherein the second entry comprises:
a translated character string that is a translation of the character string translated to the second language, the master-identifier associated with the character string, a second language identifier of the translated character string, the category of the user-interface element, the screen position of the user-interface element, and a positional information where the translated character string is recorded for being displayed on the user-interface element; and
wherein maintaining consistency comprises using the same master identifier for the entries corresponding to the character string and the translated character string to facilitate replacing the character string in the manual with the translated character string that has been translated into the second language.

19. A computer program product for supporting creation of a manual of a program product, the computer program product comprising a non-transitory computer readable medium having computer-readable program code embedded therein, which when executed by a computer processor, causes the computer processor to implement:
receiving, via an editor creating the manual, a start tag of a user-interface element of the program product for which the manual is being created;
in response to receipt of the start tag, activating an acquisition mode of a user-interface of the program product, wherein, in the acquisition mode, character strings of the user-interface are displayed with respective master-identifiers appended;
receiving a selection of a character string corresponding to the user-interface element;
recording, in the editor, adjacent to the start tag of the user-interface element, the character string and the master-identifier;
receiving, via the editor, an end tag of the user-interface element;
in response to receipt of the end tag, deactivating the acquisition mode of the user-interface of the program product;
receiving, via the editor, a description of the user-interface element;
detecting a category of the user-interface element, and a screen position of the user-interface element;
in response to receipt of the description, recording an entry in a screen character string control table, the entry comprising, the character string, the master-identifier associated with the character string, a language identifier of the character string, the category of the user-interface element, and the screen position of the user-interface element; and
maintaining consistency between the character string displayed on the user-interface element and in the manual.

20. The computer program product of claim 19, wherein the computer-readable program code embedded therein when executed by the computer processor, causes the computer processor to further implement:
receiving a translation request to translate the manual to a second language corresponding to a version of the program product in the second language;
in response to the translation request, creating a second entry in the screen character string control table, wherein the second entry comprises:
a translated character string that is a translation of the character string translated to the second language, the master-identifier associated with the character string, a second language identifier of the translated character string, the category of the user-interface element, the screen position of the user-interface element, and a positional information where the translated character string is recorded for being displayed on the user-interface element; and
wherein maintaining consistency comprises using the same master identifier for the entries corresponding to the character string and the translated character string to facilitate replacing the character string in the manual with the translated character string that has been translated into the second language.

* * * * *